United States Patent
Fay

(10) Patent No.: US 10,983,683 B2
(45) Date of Patent: *Apr. 20, 2021

(54) GROUP-BASED COMMUNICATION SYSTEM DYNAMIC GROUP-BASED COMMUNICATION INTERFACE FOCUSING

(71) Applicant: SLACK TECHNOLOGIES, INC., San Francisco, CA (US)

(72) Inventor: David Fay, Vancouver (CA)

(73) Assignee: Slack Technologies, Inc., San Francisco, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/399,809

(22) Filed: Apr. 30, 2019

(65) Prior Publication Data

US 2020/0348829 A1 Nov. 5, 2020

Related U.S. Application Data

(63) Continuation of application No. 16/399,741, filed on Apr. 30, 2019.

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06N 20/00* (2019.01);
(Continued)

(58) Field of Classification Search
None
See application file for complete search history.

(56) References Cited

U.S. PATENT DOCUMENTS 7,644,144 B1 1/2010 Horvitz et al.
9,600,297 B1 * 3/2017 Buyukkokten ....... G06F 3/0481
(Continued)

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(Continued)

*Primary Examiner* — Thanh T Vu
(74) *Attorney, Agent, or Firm* — Morrison & Foerster LLP

(57) ABSTRACT

Embodiments of the present disclosure provide methods, systems, apparatuses, and computer program products for managing one or more group-based communications and/or one or more group-based communication channels to cause rendering of a group-based communication interface. In some embodiments, a group-based communication system causes rendering of a group-based communication interface including a focus interface component, which may be used to receive a user focus selection input. The group-based communication system generates a focus value and identifies a focus threshold. The group-based communication causes rendering of the group-based communication interface based on whether the focus value satisfies the identified focus threshold. Embodiments further provide methods, systems, apparatuses, and computer program products for managing one or more user communications to cause rendering of a user communication interface. Some embodiments herein are configured to interfaces including a focus interface component enabling dynamic adjustment of focus thresholds/focus modes associated with a group-based communication interface.

20 Claims, 17 Drawing Sheets

(51) Int. Cl.
*H04L 12/18* (2006.01)
*G06N 20/00* (2019.01)
*G06F 3/0482* (2013.01)
*G06Q 10/10* (2012.01)

(52) U.S. Cl.
CPC .............. *H04L 12/1813* (2013.01); *G06F 2203/04803* (2013.01); *G06Q 10/107* (2013.01)

(56) References Cited

U.S. PATENT DOCUMENTS

| | | | |
|---|---|---|---|
| 9,940,394 | B1 | 4/2018 | Grant et al. |
| 2011/0307804 | A1* | 12/2011 | Spierer ................ G06Q 10/107 715/752 |
| 2012/0089698 | A1 | 4/2012 | Tseng |
| 2014/0279336 | A1* | 9/2014 | Eid ..................... G06Q 10/107 705/35 |
| 2018/0197144 | A1 | 7/2018 | Frank et al. |
| 2018/0212903 | A1 | 7/2018 | Rose et al. |
| 2018/0287982 | A1 | 10/2018 | Draeger et al. |
| 2019/0199606 | A1* | 6/2019 | Hasegawa ............. G06T 11/206 |
| 2019/0220541 | A1* | 7/2019 | Meling ................. G06F 16/335 |
| 2020/0076746 | A1* | 3/2020 | Penrose .............. H04L 12/1822 |
| 2020/0076759 | A1* | 3/2020 | Kwatra .................. H04L 51/32 |

OTHER PUBLICATIONS

Robert Hof, "Stewart Butterfield On How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 2 pages.
Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.
Internet Relay Chat, WIKIPEDIA, ,[online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
"Die, Email, Die! A Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—A New Communication System Based on Awareness and Text Communications-", FUJITSU Sci. Tech. J., 36, 2, (Dec. 2000) 154-161.

\* cited by examiner

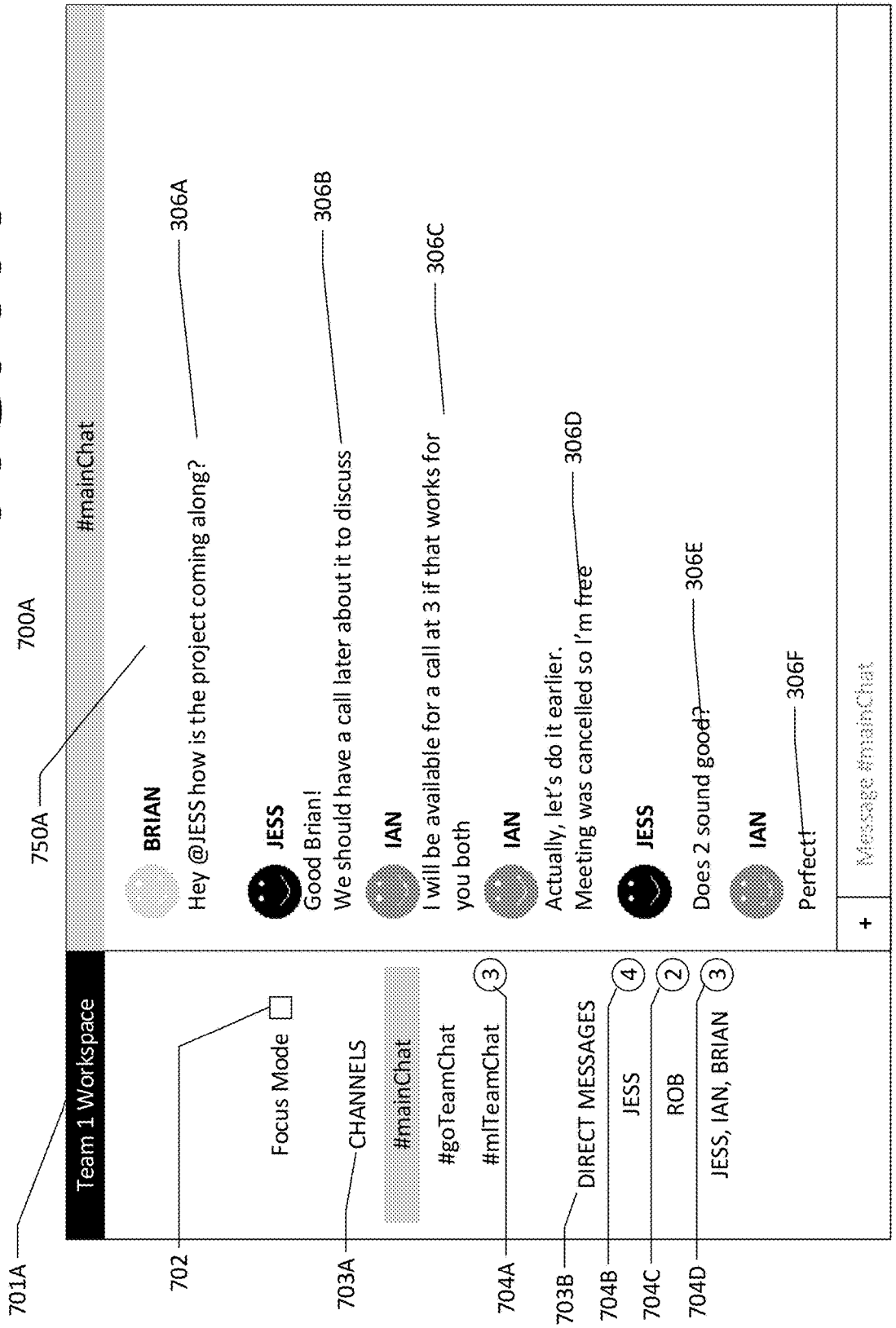

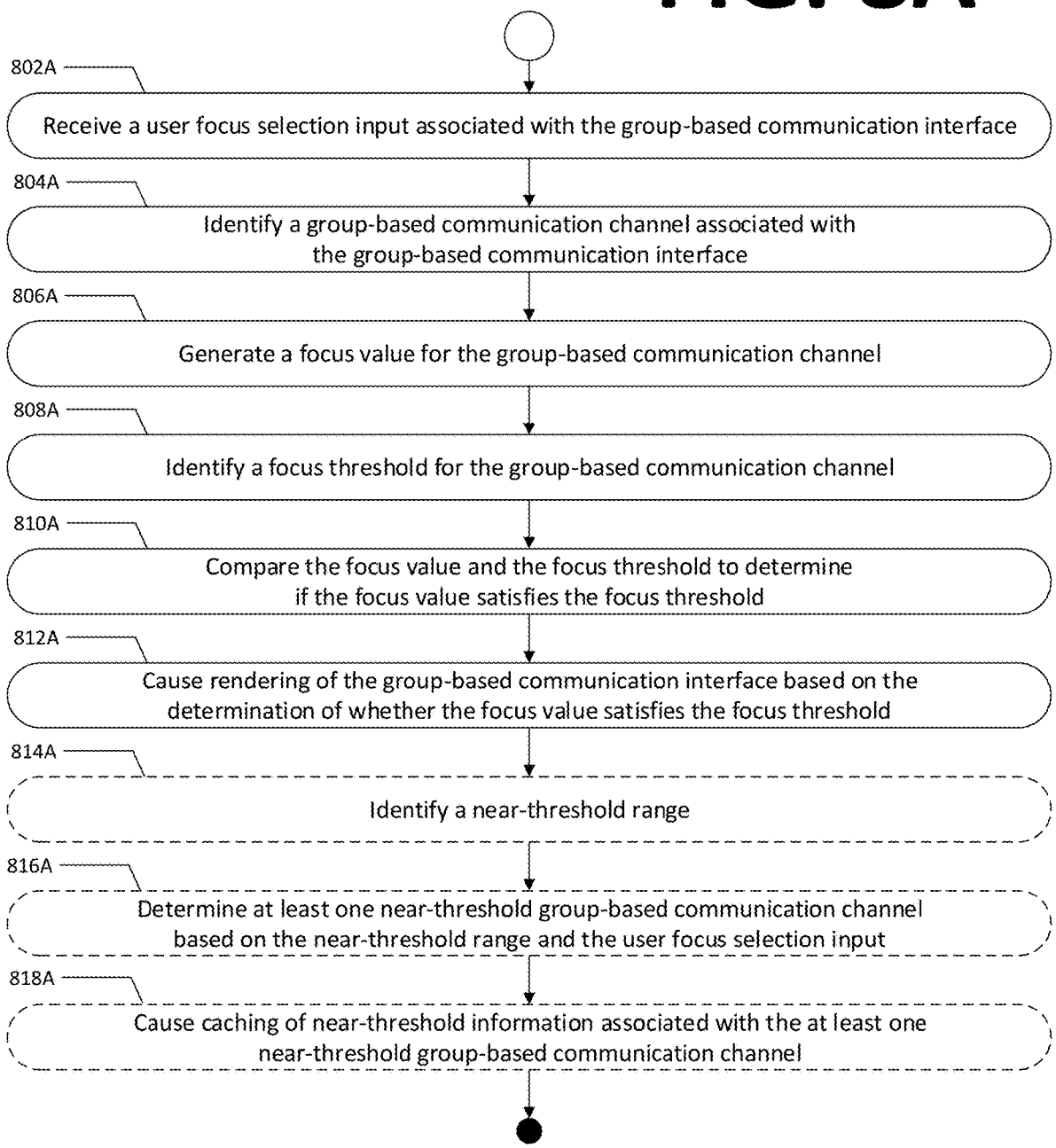

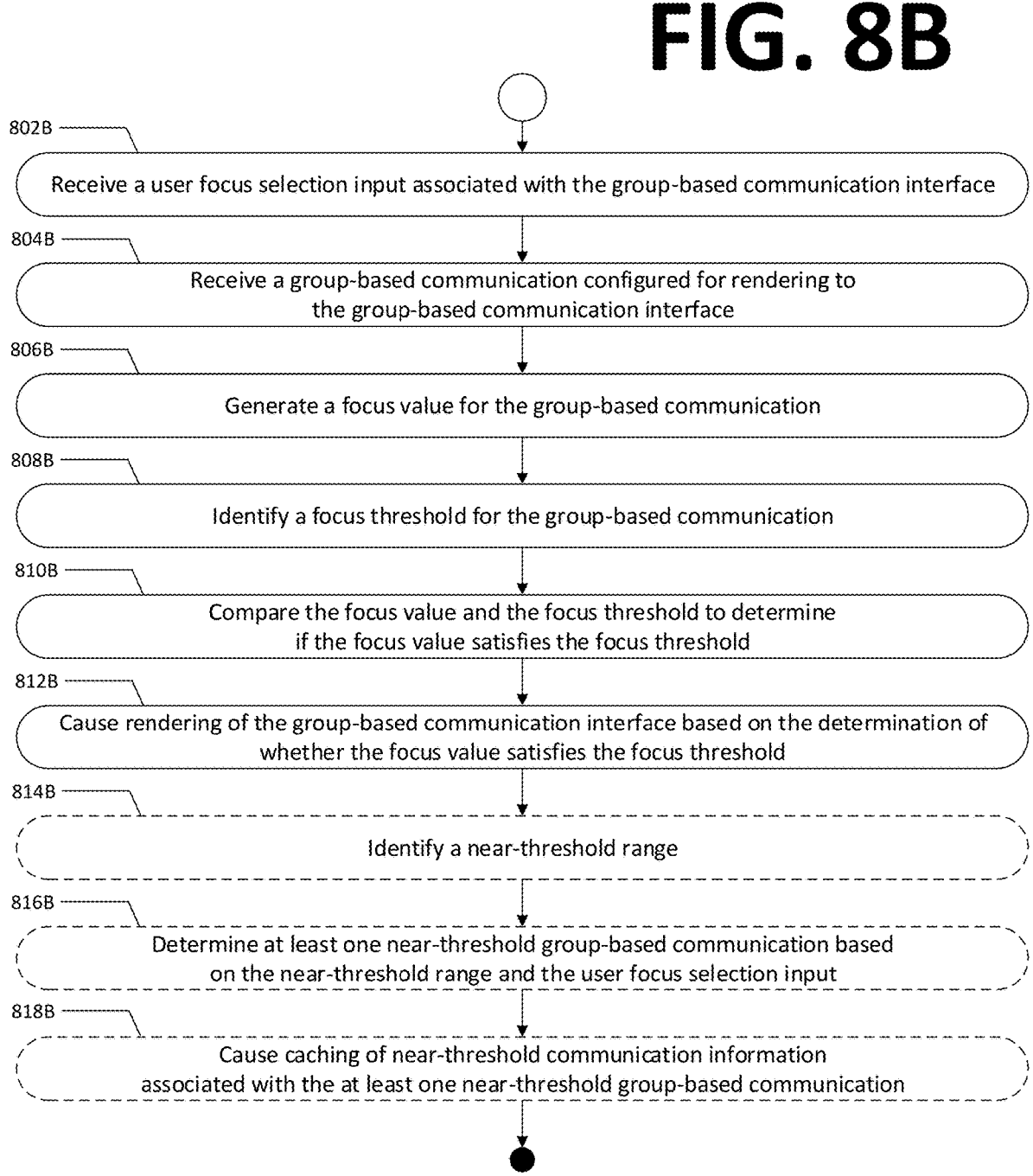

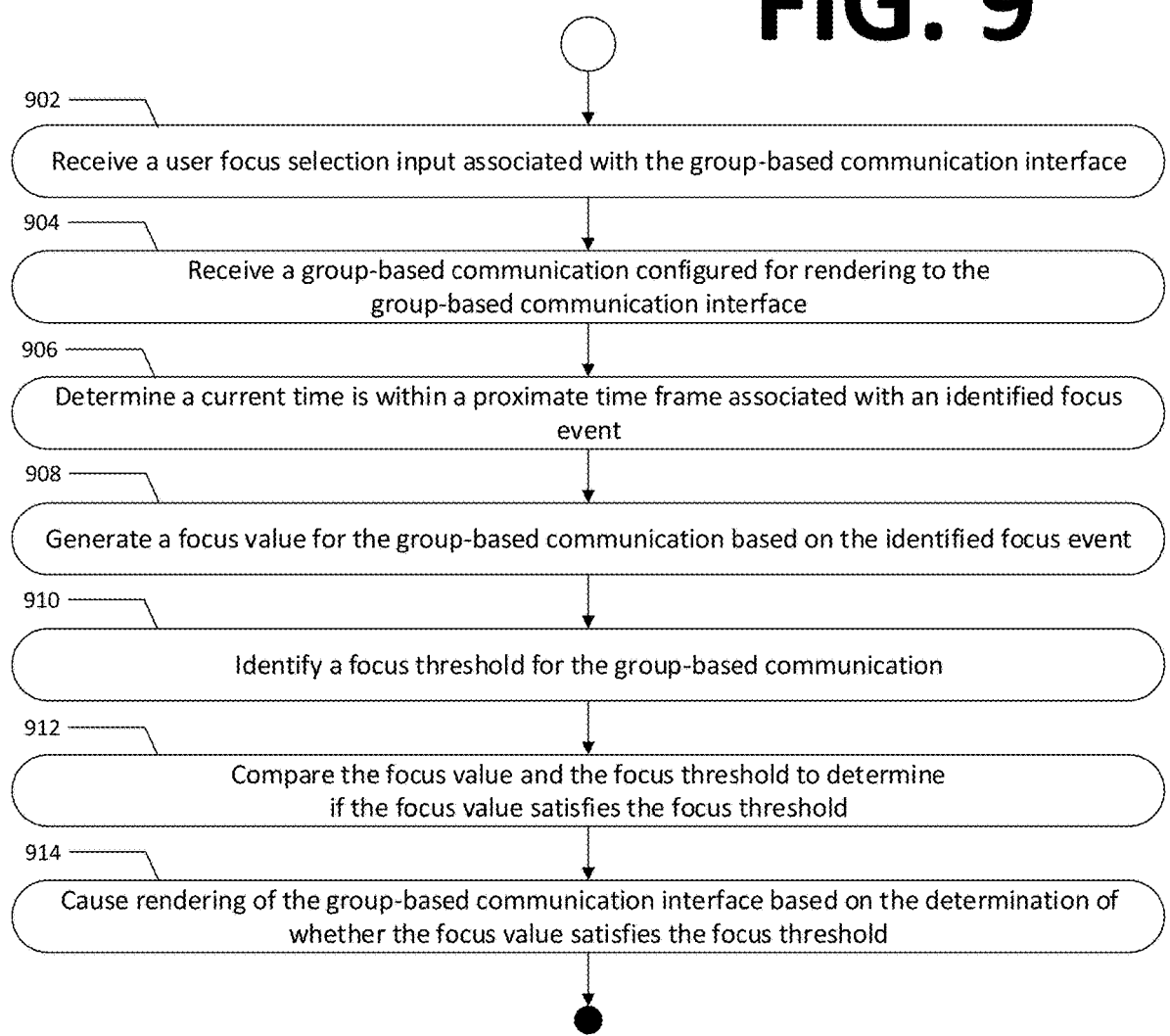

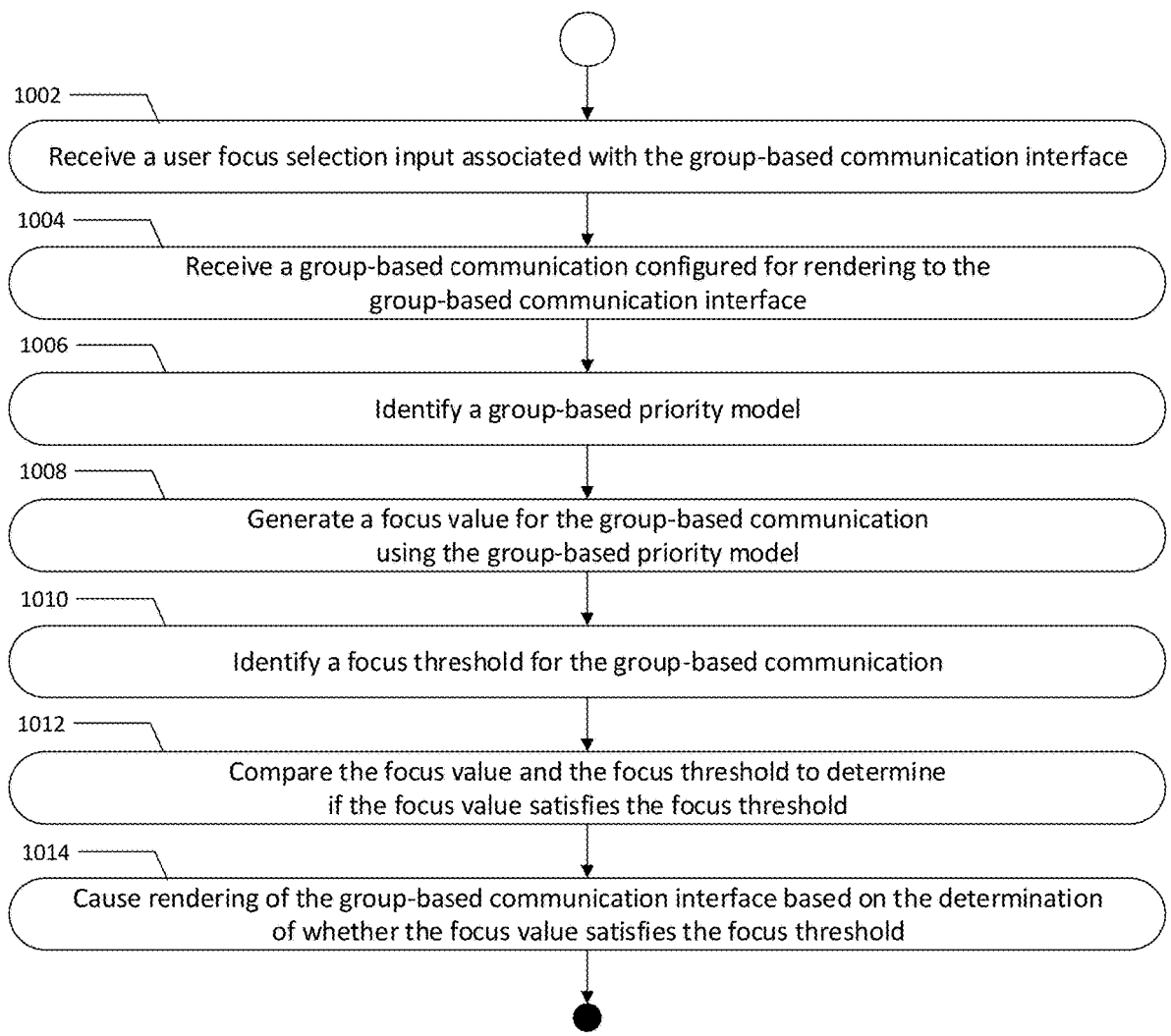

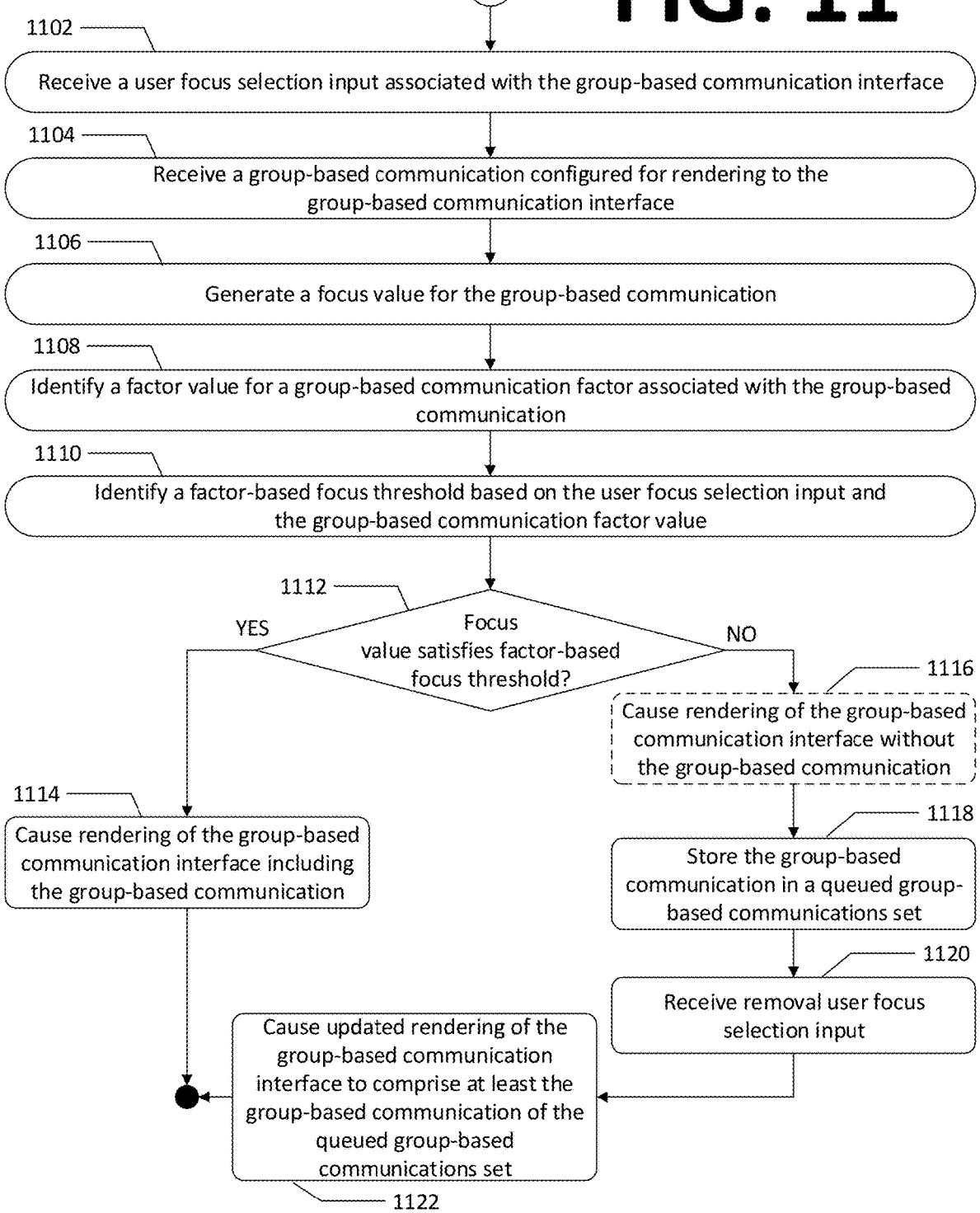

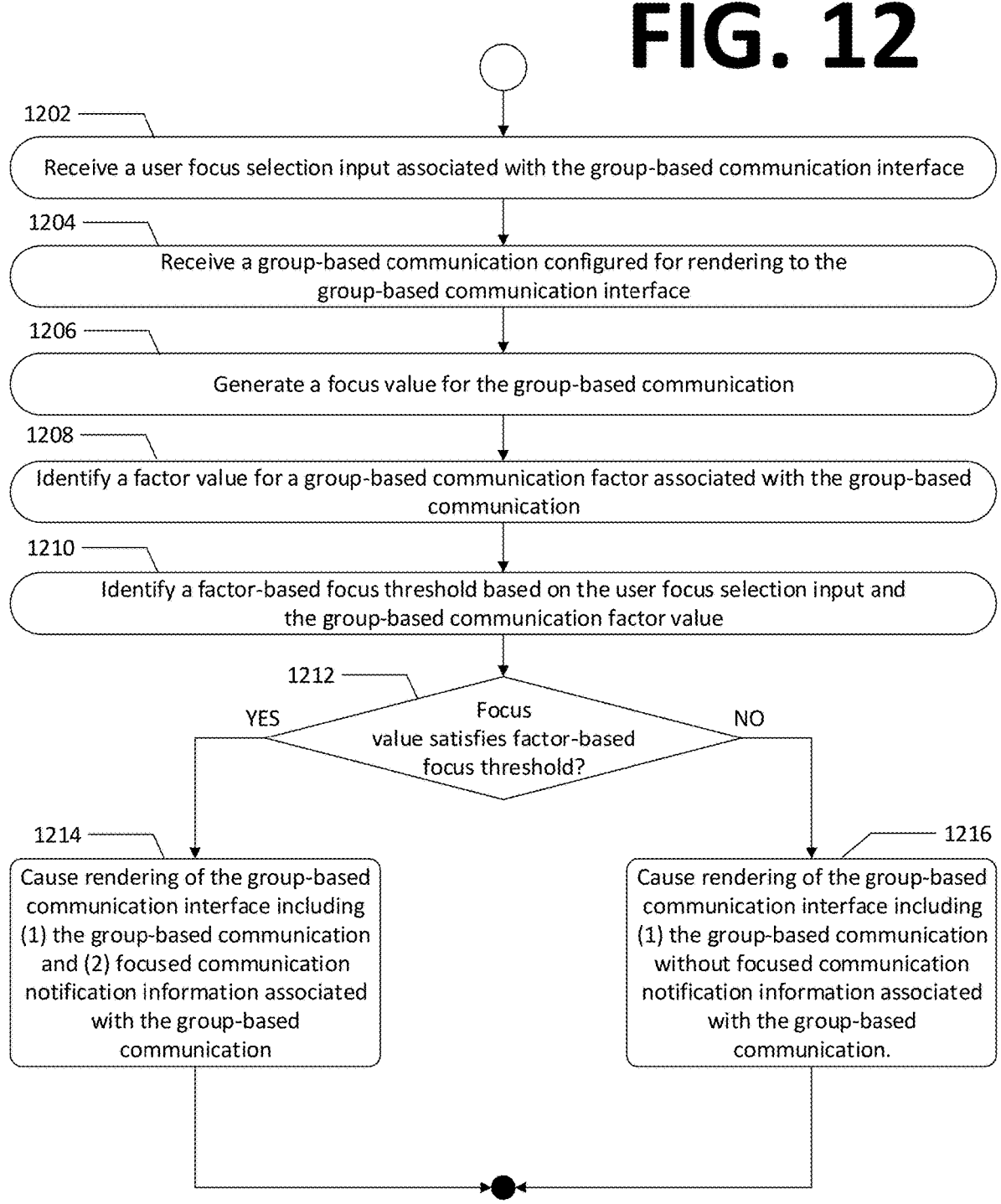

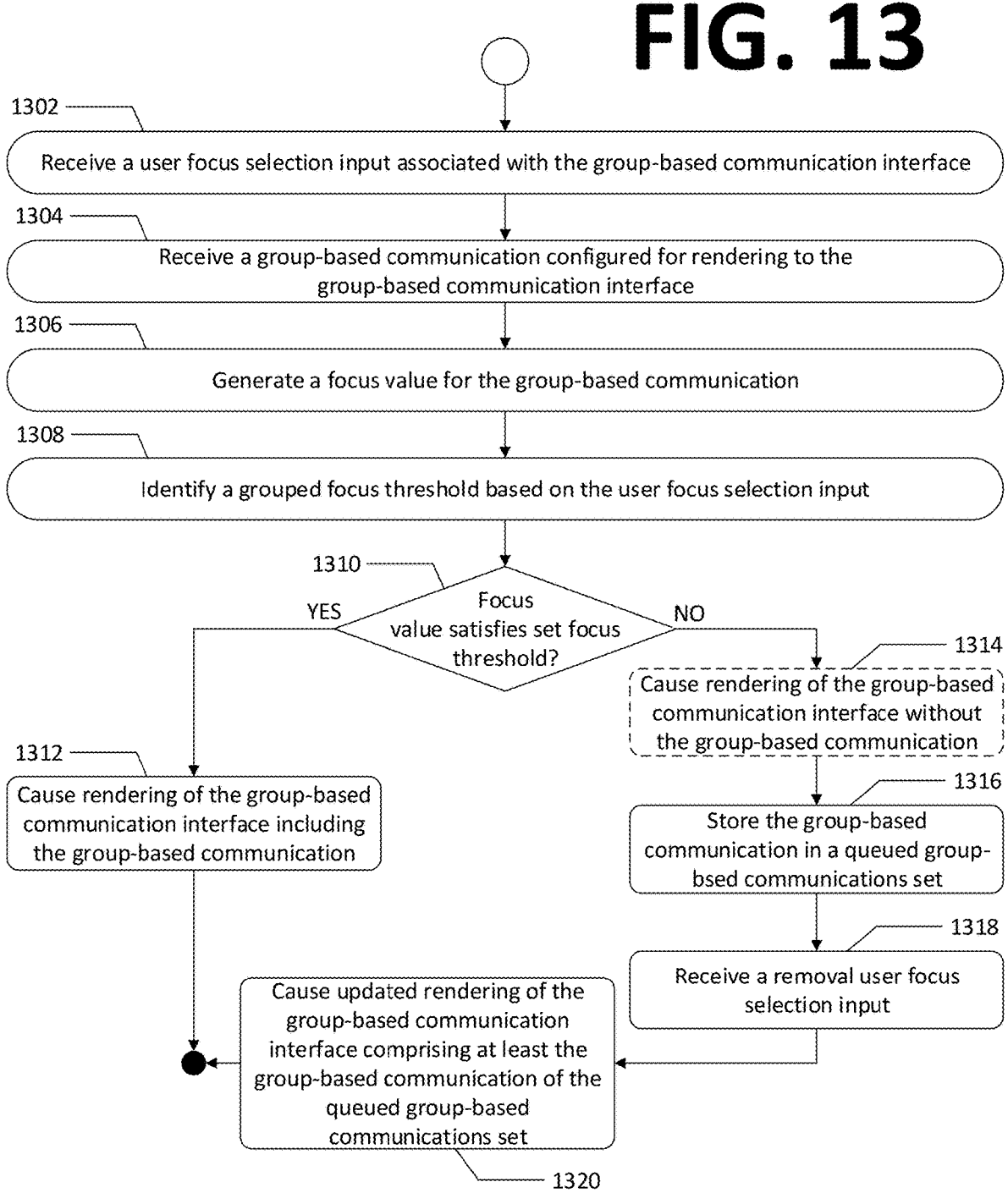

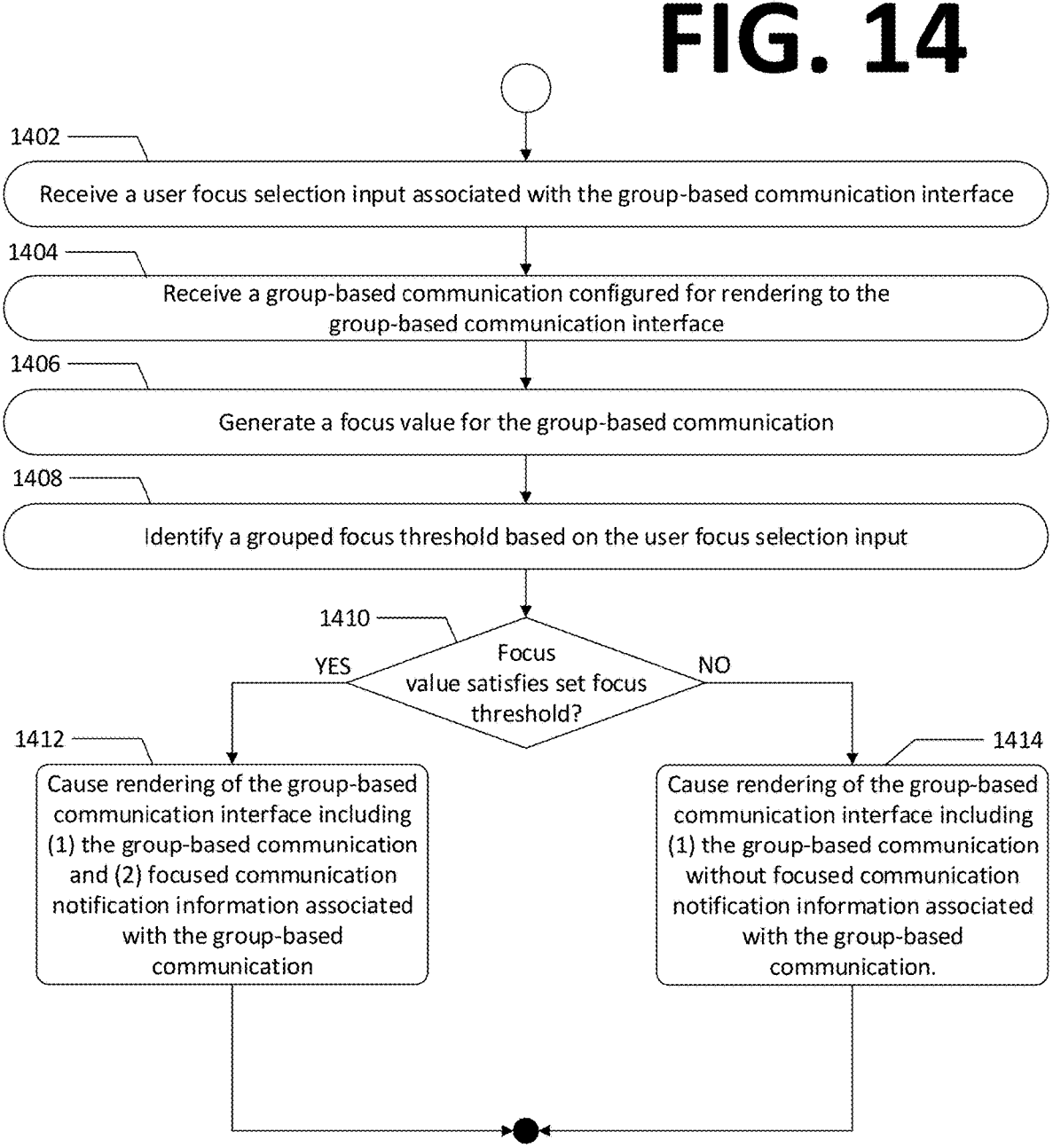

GROUP-BASED COMMUNICATION SYSTEM DYNAMIC GROUP-BASED COMMUNICATION INTERFACE FOCUSING

CROSS-REFERENCE TO RELATED APPLICATIONS

This application is a continuation of U.S. patent application Ser. No. 16/399,741, titled "GROUP-BASED COMMUNICATION SYSTEM DYNAMIC GROUP-BASED COMMUNICATION INTERFACE FOCUSING," filed Apr. 30, 2019, the entire contents of which are incorporated herein by reference.

TECHNOLOGICAL FIELD

Embodiments of the present disclosure relate, generally, to dynamically managing one or more group-based communications and/or group-based communication channels for rendering to a group-based communication interface, and more specifically, to receiving a user focus selection input via a focus interface component, generating one or more focus values, identifying a focus threshold based on the user focus selection input, and causing rendering of the group-based communication interface based on the focus value and the focus threshold.

BACKGROUND

Various communication systems facilitate communications between users of the communication system via a communication interface. Applicant has identified a number of deficiencies and problems associated with conventional communication systems and communication interfaces. Through applied effort, ingenuity, and innovation, Applicant has developed solutions that are included in embodiments of the present disclosure, many of which are described in detail herein.

BRIEF SUMMARY

In general, embodiments of the present disclosure provide methods, including computer-implemented methods, apparatuses, systems, computer program products, and/or the like for managing one or more group-based communications and/or group-based communication channels for rendering to a group-based communication interface.

In accordance with one aspect of the present disclosure, a group-based communication system for managing group-based communications for rendering to a group-based communication interface is provided for. The group-based communication system includes at least one memory and at least one processor having computer-coded instructions thereon. The computer-coded instructions cause the group-based communication system to receive a user focus selection input associated with the group-based communication interface in response to user engagement with at least one multi-value interface component; receive a group-based communication configured for rendering to the group-based communication interface; generate a focus value for the group-based communication; identify a focus threshold for the group-based communication based on the user focus selection input; compare the focus value and the focus threshold to determine if the focus value satisfies the focus threshold; and cause rendering of the group-based communication interface, including a side panel and/or content panel of the group-based communication interface, based on the determination of whether the focus value satisfies the focus threshold.

In accordance with another aspect of the present disclosure, a computer-implemented method for managing group-based communications for rendering to a group-based communication interface is provided. The computer-implemented method comprises receiving a user focus selection input associated with the group-based communication interface in response to user engagement with at least one multi-value interface component; receiving a group-based communication configured for rendering to the group-based communication interface; generating a focus value for the group-based communication; identifying a focus threshold for the group-based communication based on the user focus selection input; comparing the focus value and the focus threshold to determine if the focus value satisfies the focus threshold; and causing rendering of the group-based communication interface based on the determination of whether the focus value satisfies the focus threshold.

In accordance with another aspect of the present disclosure, a computer program product for managing group-based communications for rendering to a group-based communication interface is provided for. The computer program product may comprise at least one non-transitory computer readable storage medium having computer program instructions stored therein, the computer program instructions configured to, when executed by a processor, cause the processor to receive a user focus selection input associated with the group-based communication interface in response to user engagement with at least one multi-value interface component; receive a group-based communication configured for rendering to the group-based communication interface; generate a focus value for the group-based communication; identify a focus threshold for the group-based communication based on the user focus selection input; compare the focus value and the focus threshold to determine if the focus value satisfies the focus threshold; and cause rendering of the group-based communication interface, including a side panel and/or content panel of the group-based communication interface, based on the determination of whether the focus value satisfies the focus threshold.

Some embodiments further identify a focus value generation model and generate the focus value using the focus value generation model. In some embodiments, the focus value is generated based on a group-based communication sender, a group-based communication sender role, a group-based communication receiver role, a group-based communication channel identifier, and/or a group-based communication type. In some embodiments, the group-based communication system is caused to identify prior interaction data; train the focus value generation model based on the prior interaction data; and generate the focus value for the group-based communication using the trained focus value generation model.

Some embodiments further determine a current time is within a proximate time frame associated with an identified focus event; and generate the focus value for the group-based communication based on the focus event.

Some embodiments cause rendering of the group-based communication by, in a circumstance where the focus value satisfies the focus threshold, cause rendering of the group-based communication interface to comprise (1) the group-based communication and (2) focused communication notification information associated with the group-based communication; and in a circumstance where the focus value does not satisfy the focus threshold, cause rendering of the group-based communication interface to comprise the group-based communication without focused communication notification information associated with the group-based communication. In some embodiments, the group-based communication is caused to cause rendering of the group-based communication system by, in a circumstance where the focus value satisfies the focus threshold, cause rendering of the group-based communication to the group-based communication interface; and in a circumstance where the focus value does not satisfy the focus threshold, storing the group-based communication in a queued group-based communications set and causing rendering of the group-based communication interface, including a side panel and/or content panel of the group-based communication interface, without the group-based communication.

Some embodiments further receive a group-based communication set including the received group-based communication, and, for at least a second group-based communication in the group-based communication set, generate a second focus value for the second group-based communication; identify a second focus threshold for the second group-based communication; compare the second focus value and the second focus threshold to determine if the second focus value satisfies the second focus threshold; and cause rendering of the group-based communication interface, including a side panel and/or content panel of the group-based communication interface, based on the determination of whether the second focus value satisfies the second focus threshold.

Some embodiments further receive a second group-based communication; generate a second focus value for the second group-based communication; compare the second focus value and the second focus threshold to determine if the second focus value satisfies the second focus threshold; and cause updated rendering of the group-based communication interface based on the determination of whether the second focus value satisfies the second focus threshold.

Some embodiments further receive an updated user focus selection input associated with the group-based communication interface; receive a second group-based communication configured for rendering to the group-based communication interface; generate a second focus value for the second group-based communication; identify a second focus threshold for the second group-based communication based on the updated user focus selection input; compare the second focus value and the second focus threshold to determine if the second focus value satisfies the second focus threshold; and cause updated rendering of the group-based communication interface based on the determination of whether the focus value satisfies the focus threshold. In some embodiments, the group-based communication system is caused to receive a removal user focus selection input; and cause rendering of the queued group-based communications set to the group-based communication interface in response to receiving the removal user focus selection input.

Some embodiments further identify a near-threshold range; determine at least one near-threshold group-based communication based on the near-threshold range and the user focus selection input; and cause a client device to cache near-threshold communication information associated with the at least one near-threshold group-based communication.

In accordance with yet another aspect of the present disclosure, a group-based communication system for managing group-based communication channels for rendering to a group-based communication interface is provided for. The group-based communication system includes at least one memory and at least one processor having computer-coded instructions thereon. The computer-coded instructions cause the group-based communication system to receive a user focus selection input associated with the group-based communication interface in response to user engagement with at least one multi-value interface component; receive a group-based communication channel configured for rendering to the group-based communication interface; generate a focus value for the group-based communication channel; identify a focus threshold for the group-based communication channel based on the user focus selection input; compare the focus value and the focus threshold to determine if the focus value satisfies the focus threshold; and cause rendering of the group-based communication interface, including a side panel and/or content panel of the group-based communication interface, based on the determination of whether the focus value satisfies the focus threshold.

In accordance with another aspect of the present disclosure, a computer-implemented method for managing group-based communication channels for rendering to a group-based communication interface is provided. The computer-implemented method comprises receiving a user focus selection input associated with the group-based communication interface in response to user engagement with at least one multi-value interface component; receiving a group-based communication channel configured for rendering to the group-based communication interface; generating a focus value for the group-based communication channel; identifying a focus threshold for the group-based communication channel based on the user focus selection input; comparing the focus value and the focus threshold to determine if the focus value satisfies the focus threshold; and causing rendering of the group-based communication interface based on the determination of whether the focus value satisfies the focus threshold.

In accordance with another aspect of the present disclosure, a computer program product for managing group-based communication channels for rendering to a group-based communication interface is provided for. The computer program product may comprise at least one non-transitory computer readable storage medium having computer program instructions stored therein, the computer program instructions configured to, when executed by a processor, cause the processor to receive a user focus selection input associated with the group-based communication interface in response to user engagement with at least one multi-value interface component; receive a group-based communication channel configured for rendering to the group-based communication interface; generate a focus value for the group-based communication channel; identify a focus threshold for the group-based communication channel based on the user focus selection input; compare the focus value and the focus threshold to determine if the focus value satisfies the focus threshold; and cause rendering of the group-based communication interface, including a side panel and/or content panel of the group-based communication interface, based on the determination of whether the focus value satisfies the focus threshold.

In accordance with yet another aspect of the present disclosure, a user communication system for managing user communications for rendering to a user communication interface is provided for. The user communication system includes at least one memory and at least one processor having computer-coded instructions thereon. The computer-coded instructions cause the user communication system to receive a user focus selection input associated with the user communication interface in response to user engagement with at least one multi-value interface component; receive a user communication configured for rendering to the user communication interface; generate a focus value for the user communication; identify a focus threshold for the user communication based on the user focus selection input; compare the focus value and the focus threshold to determine if the focus value satisfies the focus threshold; and cause rendering of the user communication interface based on the determination of whether the focus value satisfies the focus threshold.

In accordance with another aspect of the present disclosure, a computer-implemented method for managing user communications for rendering to a user communication interface is provided. The computer-implemented method comprises receiving a user focus selection input associated with the user communication interface in response to user engagement with at least one multi-value interface component; receiving a user communication configured for rendering to the user communication interface; generating a focus value for the user communication; identifying a focus threshold for the user communication based on the user focus selection input; comparing the focus value and the focus threshold to determine if the focus value satisfies the focus threshold; and causing rendering of the user communication interface based on the determination of whether the focus value satisfies the focus threshold.

In accordance with yet another aspect of the present disclosure, a computer program product for managing user communications for rendering to a user communication interface is provided for. The computer program product may comprise at least one non-transitory computer readable storage medium having computer program instructions stored therein, the computer program instructions configured to, when executed by a processor, cause the processor to receive a user focus selection input associated with the user communication interface in response to user engagement with at least one multi-value interface component; receive a user communication configured for rendering to the user communication interface; generate a focus value for the user communication; identify a focus threshold for the user communication based on the user focus selection input; compare the focus value and the focus threshold to determine if the focus value satisfies the focus threshold; and cause rendering of the user communication interface based on the determination of whether the focus value satisfies the focus threshold.

In some embodiments, the multi-value interface component is a slider interface component or a plurality of slider interface components. In some embodiments, the focus threshold is a set focus threshold. In some embodiments, the focus threshold is a factor-based focus threshold. In some embodiments, the focus threshold is identified based on, at least, a time of day, a day of week, a date, and/or a focus event set.

BRIEF DESCRIPTION OF DRAWINGS

Figure 1:
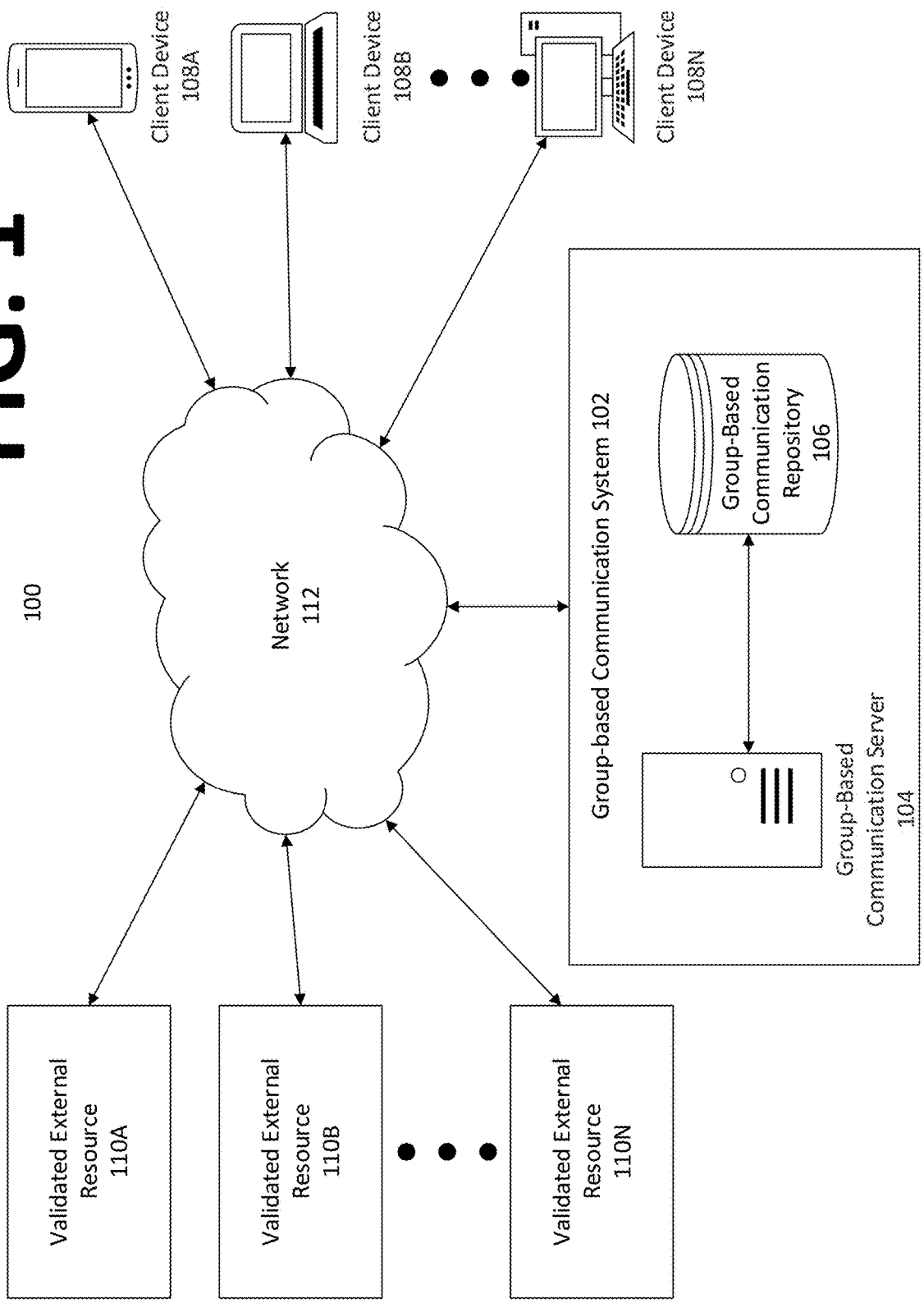
Figure 2:
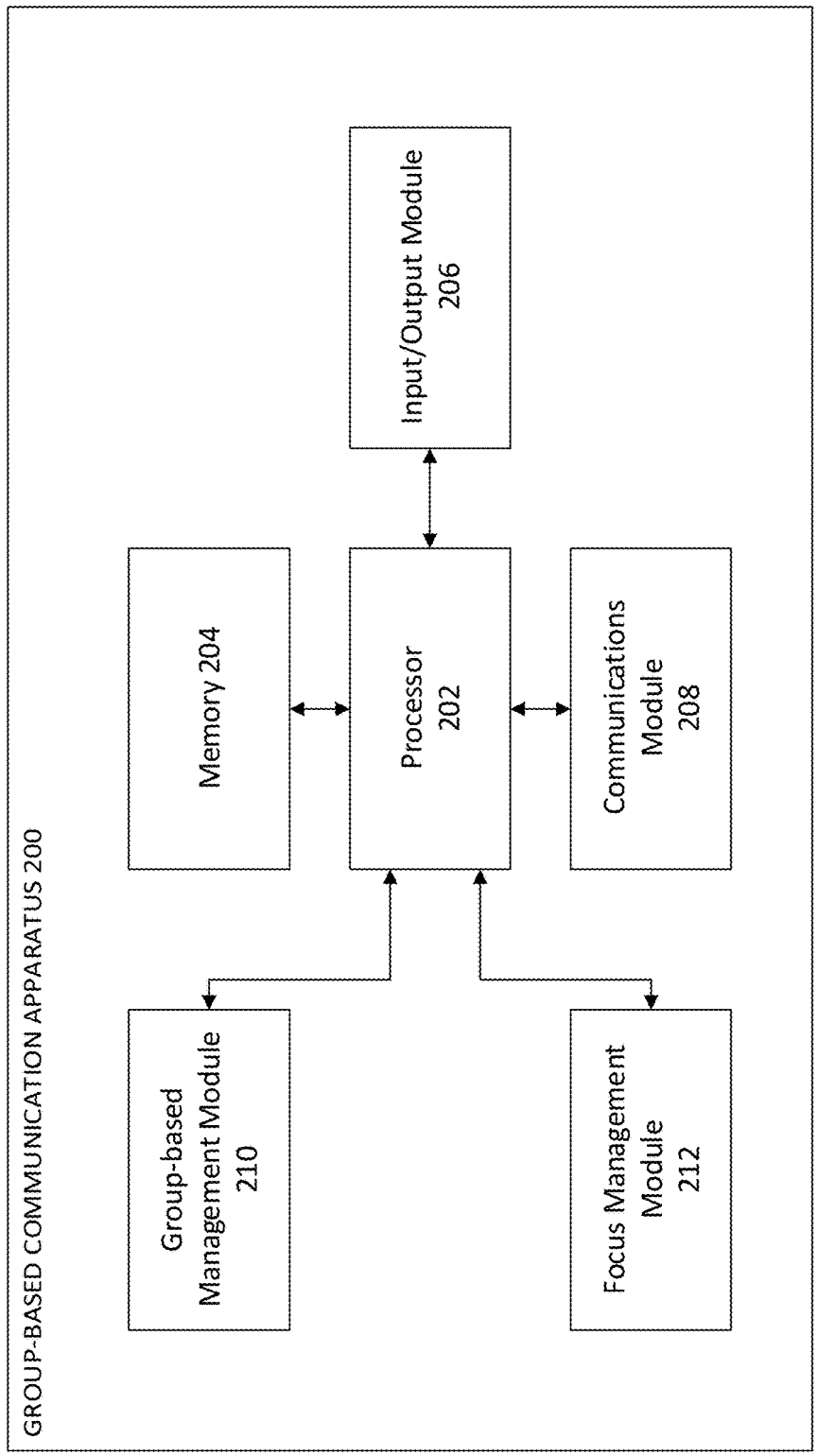
Figure 15:
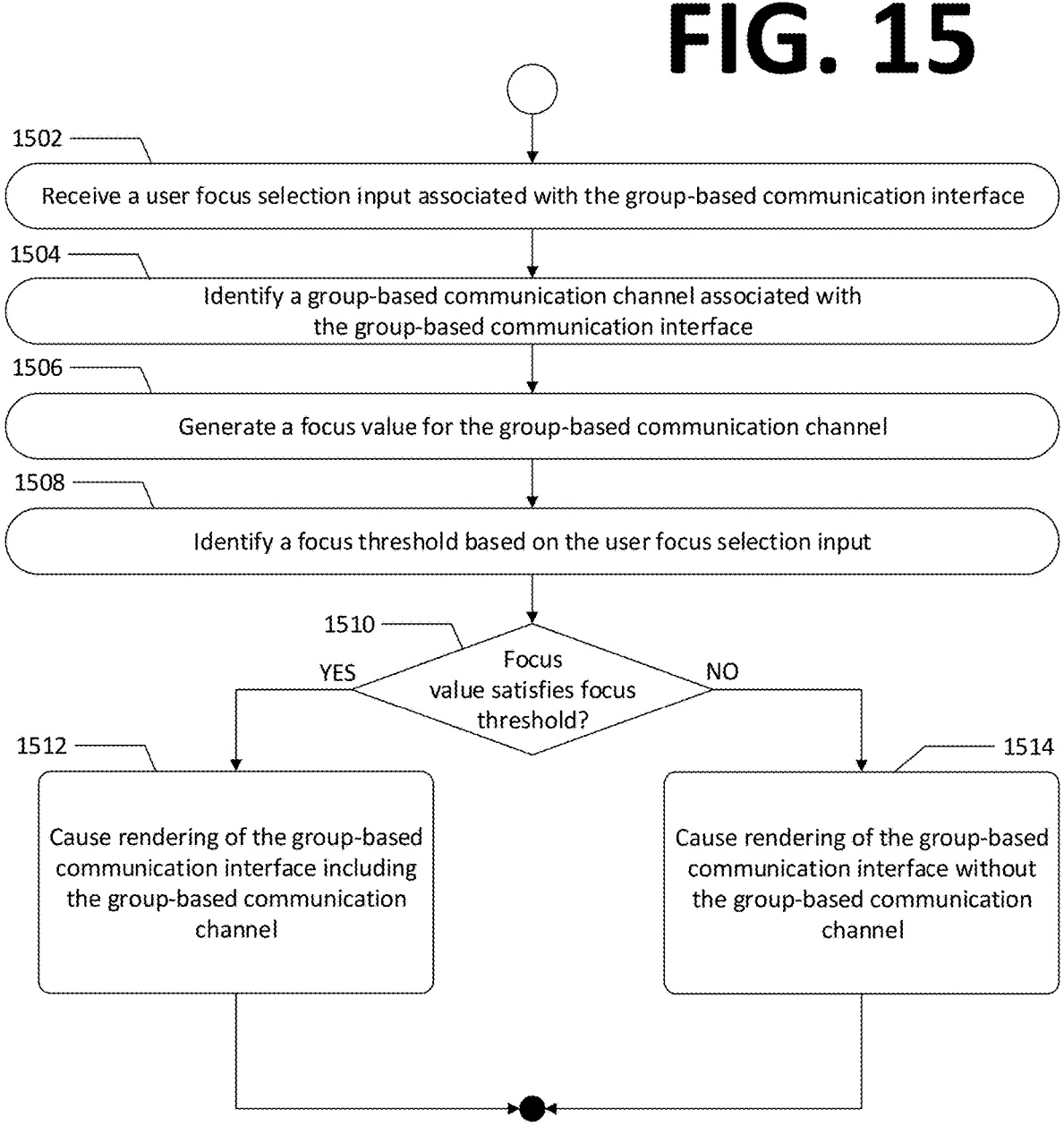

Having thus described certain example embodiments of the present disclosure in general terms, reference will now be made to the accompanying drawings, which are not necessarily drawn to scale, and wherein:

FIG. 1 illustrates an example system within which example embodiments of the present invention may operate;

FIG. 2 illustrates a block diagram showing an example device for use in a group-based communication system configured to manage group-based communications for rendering to a group-based communication interface, in accordance with example embodiments of the present disclosure;

FIGS. 3-7A and 7B illustrate example group-based communication interfaces in accordance with example embodiments of the present disclosure;

FIG. 8A illustrates a flowchart describing example operations for managing a group-based communication channel and causing rendering to a group-based communication interface, in accordance with some example embodiments of the present disclosure;

FIG. 8B illustrates a flowchart describing example operations for managing a group-based communication and causing rendering to a group-based communication interface, in accordance with some example embodiments of the present disclosure;

FIG. 9 illustrates a flowchart describing example operations for managing a group-based communication and causing rendering to a group-based communication interface based at least on an identified focus event, in accordance with some embodiments of the present disclosure;

FIG. 10 illustrates a flowchart describing example operations for managing a group-based communication and causing rendering to a group-based communication interface using a focus value generation model, in accordance with some embodiments of the present disclosure;

FIG. 11 illustrates a flowchart describing example operations for managing a group-based communication and causing rendering to a group-based communication interface based on a factor-based focus threshold, in accordance with some embodiments of the present disclosure;

FIG. 12 illustrates a flowchart describing example operations for managing a group-based communication and causing rendering to a group-based communication interface based on a factor-based focus threshold, in accordance with some embodiments of the present disclosure;

FIG. 13 illustrates another flowchart describing example operations for managing a group-based communication and causing rendering to a group-based communication interface based on a set focus threshold, in accordance with some embodiments of the present disclosure;

FIG. 14 illustrates a flowchart describing example operations for managing a group-based communication and causing rendering to a group-based communication interface based on a set focus threshold, in accordance with some embodiments of the present disclosure; and FIG. 15 illustrates a flowchart describing detailed example operations for managing a group-based communication channel and causing rendering to a group-based communication interface, in accordance with some example embodiments of the present disclosure.

DETAILED DESCRIPTION

Embodiments of the present disclosure now will be described more fully hereinafter with reference to the accompanying drawings, in which some, but not all, embodiments of the present disclosure are shown. Indeed, embodiments of the present disclosure may be embodied in many different forms, and should not be construed as limited to the embodiments set forth herein; rather, these embodiments are provided so that this disclosure will satisfy applicable legal requirements. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like. A user accesses a communication system (defined below) or a group-based communication system using a client device. Users referred to herein are discussed largely in connection with a client device enabled for communicating with a group-based communication system for accessing a group-based communication interface or a set of group-based communication interfaces. A user of a group-based communication system may be referred to as a "group-based user." In some embodiments, a group-based user is associated with a particular group-based user account.

"Group-based" is used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, users, etc., with specific groups of a group-based communication system as defined below.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers and client devices, and are further configured to engage external resources, including external email resources and validated external resources, as defined below.

The term "group-based communication server" refers to a software platform and associated hardware that is configured to manage access to the various group-based communication interfaces (defined below) of the group-based communication system. The group-based communication server is configured to access, maintain, and support application product logic of the group-based communication system and to access one or more data repositories such as a group-based communication repository.

The term "group-based communication interface" refers to a virtual communications environment configured to facilitate user interaction with a group-based communication system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined herein. A group-based communication interface, in some embodiments, includes a plurality of interface panels for organizing information associated with the group-based communication interface. For example, in some embodiments a group-based communication interface includes at least a side panel configured to include rendered group-based communication channels, and a content panel configured to include rendered group-based communications associated with a selected group-based communication channel.

The term "group-based communication interface account" refers to an entity or repository to which messages may be delivered in the group-based communication system and which is associated with a respective group-based communication interface. The group-based communication interface account may have an identifier, referred to as a group-based communication interface identifier, which identifies the group-based communication interface account and may comprise ASCII text, a pointer, a memory address, and the like. For instance, the group-based communication interface identifier may be an email address (e.g., comprising a local-part, an @ symbol, then a case-insensitive domain).

The term "group-based rendering request" refers to an electronic information package transmitted from a group-based communication system to a client device, where the transmission is configured to cause the client device to render a group-based communication interface specially configured based on the electronic information package. In some embodiments, a group-based rendering request includes one or more group-based communications (or equivalent information enabling rendering of the group-based communications) for rendering to a group-based communication interface. In some embodiments, a group-based rendering request includes group-based communication channels (or equivalent information enabling rendering of the group-based communication channels) for rendering to the group-based communication interface. Additionally or alternatively, in some embodiments, a group-based rendering request includes information identifying a group-based communication interface to be rendered. In some embodiments, a group-based rendering request further includes a client device identifier associated with the client device to receive the transmission (for example, an IP address associated with the client device), a transmission timestamp, and/or other additional information and/or metadata associated with the request.

The term "group-based caching request" refers to an electronic information package transmitted from a group-based communication system to a client device, where the transmission is configured to cause the client device to cache some, or all, information provided in the electronic information package. In some embodiments, a group-based caching request includes one or more group-based communication channel (or equivalent information) and/or corresponding multi-value interface component value at which the cached group-based communication channel is to be rendered. In other embodiments a group-based caching request includes one or more group-based communication (or equivalent information) and/or corresponding multi-value interface component value at which the cached group-based communication is to be rendered. In some embodiments, a group-based rendering request further includes a client device identifier associated with the client device to receive the transmission (for example, an IP address associated with the client device), a transmission timestamp, and/or other additional information and/or metadata associated with the request.

The terms "group-based user profile," "group-based user account," and "group-based user account details" refer to data, files, and other information associated with a user, including, for example, a user identifier, one or more group-based communication channel identifiers (defined below) associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user credentials, such as, for example, login information for the user including the user's username and password.

As used herein, the term "group-based communication channel" refers to a virtual communications environment or feed that is configured to display group-based communications posted by channel members (e.g., validated users associated with group-based user accounts that are authorized to access the environment using client devices) that are viewable only to the members of the feed. The format of the group-based communication channel may appear differently to different users of the group-based communication channel; however, in some embodiments, the content of the group-based communication channel (i.e., group-based communications) will be displayed to each member of the group-based communication channel. For instance, in some embodiments, a common set of group-based communications will be displayed to each member of the respective group-based communication channel such that the content of the group-based communication channel (i.e., group-based communications) will not vary per member of the group-based communication channel. In other embodiments, a member newly joining a group-based communication channel is only able to view subsequent group-based communications (as opposed to historical group-based communications transmitted associated with the group-based communication channel before the user joined). Group-based communication channels are generally topic-oriented, long-lasting channels as opposed to ad hoc ephemeral conversations in conventional messaging and communication apps.

The term "group-based communication channel type" refers to a description associated with the security or communication method and/or content for a group-based communication channel. In some embodiments, a group-based communication channel type is determined from a group identifier and a channel identifier associated with a group-based communication channel. In some embodiments, a group-based communication channel includes a group-based communication channel type identifier that uniquely indicates the group-based communication type associated with the group-based communication. In other embodiments, a group-based communication system determines, or can determine, a group-based communication channel type based on one or more other identifiers associated with the group-based communication, and/or the content of the group-based communication. For example, a group-based communication channel may be associated with a group-based communication channel type based on the group identifier and/or channel identifier (e.g., where certain channel identifiers are associated with group-based public channels, other channel identifiers are associated with group-based private channels, other channel identifiers associated with group-based single-user direct communication channels, and other channel identifiers associated with group-based multi-user direct communication channels, for example).

The term "group-based communication public channel" refers to a particular group-based communication channel type associated with a group-based communication channel having sufficient security provisions and/or permissions such that the channel is accessible to all members of a group-based communication interface.

The term "group-based communication private channel" refers to a particular group-based communication channel type associated with a group-based communication channel having sufficient security provisions and/or permissions such that the channel is accessible only to a subset of members of a group-based communication interface. In some embodiments, group-based communication private channels are accessible only to particular group-based user accounts, based on one or more factors associated with a group-based user accounts. For example, in some embodiments, the group-based communication private channel is accessible only to group-based user accounts having: one or more group-based communication user roles, and/or other group-based user account details.

The terms "group-based communication single-user direct channel" and "direct channel" refer to a particular group-based communication channel type associated with a group-based communication channel having sufficient security provisions and/or permissions such that the channel is accessible only to two particular members of a group-based communication interface based on group-based user account identifiers.

The terms "group-based communication multi-user direct channel" and "multi-user direct channel" refer to a particular group-based communication channel type associated with a group-based communication channel having sufficient security provisions and/or permissions such that the channel is accessible only to a particular subset of members of a group-based communication interface based on one or more group-based user account identifiers.

The term "direct channels" refers generally to one or more group-based communication single-user direct channels or one or more group-based communication multi-user direct channels.

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group-based channel factor" and "factor" refer to data, metadata, or other information included in or associated with a group-based communication channel. In some embodiments, each group-based communication channel includes a particular "factor value" for one or more group-based channel factors. In some embodiments, a set of factor values includes all possible factor values for a given group-based communication factor. In an example embodiment, a group-based communication is associated with group-based communication factors including one or more selected from the group of: group-based communication channel identifier, group-based communication channel type, group-based communication roles having sufficient permission to access the channel, and the like.

The terms "group identifier" or "team identifier" refer to one or more items of data by which an organizational group and/or corresponding group-based communication interface within a group-based communication system may be uniquely identified. For example, a group identifier may comprise ASCII text, a pointer, a memory address, and the like. In one embodiment, the group identifier associated with member users of a Slack Corporation workspace (i.e., a group-based communication interface) is 678912345.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a communication (e.g., access to the communication, such as having the communication return as part of search results in response to a search query, may be restricted to those users having the group identifier associated with their user profile). The group identifier may be used to determine context for the communication (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a communication (e.g., access to the communication, such as having the communication return as part of search results in response to a search query, may be restricted to those users having the group-based communication channel identifier associated with their user profile, or who have the ability to join the group-based communication channel). The group-based communication channel identifier may be used to determine context for the communication (e.g., a description of the group-based communication channel, such as a description of a project discussed in the group-based communication channel, may be associated with the group-based communication channel identifier).

The term "validated external resource" refers to a software program, application, platform, or service that is configured to communicate with the group-based communication system for providing an external, non-email service (i.e., not native to the group-based communication system) to a client device via a group-based communication interface. The validated external resource operates on a compiled code base or repository that is separate and distinct that which supports the group-based communication system. In some embodiments, the validated external resource may communicate with the group-based communication system, and vice versa, through one or more application program interfaces (APIs). In some embodiments, the validated external resource receives tokens or other authentication credentials that are used to facilitate secure communication between the validated external resource and the group-based communication system in view of group-based communication system network security layers or protocols (e.g., network firewall protocols).

The term "validated user data object" refers to structured or templatized data that is generated by and transmitted from a validated external resource to a group-based communication system. The validated user data object documents past, present, or future engagement of a user with the validated external resource and, thus, may be parsed by the group-based communication system to determine a user status at given time and information associated with actions performed by a user via the validated external resource. Example validated user data objects include: a user profile of the validated external resource, a user calendar object of the validated external resource, an operational workflow of the validated external resource, project management data of the validated external resource, project scheduling data of the validated external resource, client device location data captured by the validated external resource, finance management data of the validated external resource, office management data of the validated external resource, a combination thereof, and the like.

The term "external email resource" refers to a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The external email resource operates on a compiled code base or repository that is separate and distinct that which supports the group-based communication system. Example external email resources include Microsoft Office 365®, Gmail®, and Yahoo Mail®.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface.

The external email resource may also include programs, applications, platforms, or services configured to provide services related to providing email services. For example, external email resources configured in accordance with embodiments herein described include calendar and scheduling services. Such calendar and scheduling services are configured to provide one or more files containing one or more user data objects to the group-based communication system. For example, the group-based communication system may subscribe to an application program interface (API) of the external email resource that is configured to transmit one or more user data objects as defined below.

The term "single-user external email corpus" refers to a file object containing all email messages and user account information that is necessary for an external email resource to reconstruct an email account (including all associated calendar and scheduling services) associated with a single user. The single-user external email corpus may include email attachments, such as calendar invitations, received and sent by a user. The single-user external email corpus may be stored in a personal storage table (".pst") format. Some or all of the single-user external email corpus, such as the calendar and scheduling services, may be stored in an iCalendar (".ics") format or a vCalendar (".vcs") format.

The term "multi-user external email corpus" refers to a file object containing all email messages and user account information that is necessary for an external email resource to reconstruct email accounts (including all associated calendar and scheduling services) associated with multiple enterprise users. For example, an enterprise administrator may use a multi-user external email corpus to rebuild email accounts for employees of ACME Corporation. The multi-user external email corpus may include email attachments, such as calendar invitations, received and sent by the multiple user. The multi-user external email corpus may be stored in .pst format. Some or all of the multi-user external email corpus, such as the calendar and scheduling services, may be stored in an iCalendar (".ics") format or a vCalendar (".vcs") format.

The term "user data object" refers to structured or templatized data that is generated by and transmitted from an external email resource to a group-based communication system. The user data object documents past, present, or future engagement of a user with the external email resource in the form of email resource engagement data. Once email resource data has been extracted, parsed, or otherwise identified from one or more user data objects, it may be used by the group-based communication system to determine a user status at given time and an associated user status avatar. Example user data objects include a user profile of the external email resource, a user calendar object of the external email resource, a single-user external email corpus of the external email resource, a multi-user external email corpus of the external email resource, or the like.

The term "external resource" refers to a software program, application, platform, or service that is configured to communicate with the group-based communication system for providing an external service (i.e., not native to the group-based communication system) to a client device via a group-based communication interface. More particularly, an external resource may be either an external email resource or a validated external resource as described above.

The term "external resource user identifier" refers to one or more items of data by which a user (or user profile) of validated external resource or an external email resource may be uniquely identified by a group-based communication system. For example, an external resource user identifier may comprise American Standard Code for Information Interchange (ASCII) text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the validated external resource or the external email resource to which it is associated or may be structured in a format designated by the group-based communication system. Correlating one or more external resource user identifiers to a user account or user identifier of the group-based communication system allows the group-based communication system to link accounts from disparate validated external resources or external email resources with a selected group-based communication system user account. The external resource user identifier also may include information relating to the source of the external resource (e.g., the external resource user identifier may be used to identify both the user associated with the user status data object and whether the user status data object was provided by an external email resource or a validated external resource). In some embodiments, the external resource user identifier may be defined by the external resource. The external resource user identifier may include an integer identifier, a universally unique identifier, an email address, a random string, and/or the like. In such a case, the group-based communication server may receive the external resource user identifier during the open authorization (OAuth) process.

The term "group-based communication repository" refers to the location, such as a memory device, where one or more user activity data logs are stored. The group-based communication repository may be a dedicated device and/or a part of a larger repository. The group-based communication repository may be dynamically updated or be static. For example, the user activity data logs may be uploaded to the group-based communication repository simultaneously with the creation of the user activity data logs. Alternatively, the user activity data logs may not be uploaded simultaneously with their creation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of user activity data logs and associated engagement data.

The term "group-based communication" refers to messages, requests, file transfers, and external resource requests transmitted via a group-based communication system. A group-based communication includes a group identifier associated with a particular group-based communication interface for accessing the group-based communication, and a channel identifier associated with a particular group-based communication channel within the group-based communication interface. In some embodiments, group-based communications are associated with a group-based communication type further associated with the group-based communication channel type associated with the group-based communication channel for the group-based communication. For example, group-based communications may include group-based public channel communications, group-based private channel communications, group-based single-user direct communications, and group-based multi-user communications.

Additionally or alternatively, group-based communications may be associated with a group-based communication type based on content of the group-based communication. For example, an example group-based communication is associated with a group-based communication type of group-based tagged communication. Group-based tagged communications include a group-based user account identifier (or equivalent unique information) in the contents of the group-based communication. An example group-based tagged communication includes an @ symbol (or other identifier) followed by a group-based user account identifier, such as a username. A group-based tagged communication may also be associated with another group-based communication type. For example, a group-based communication transmitted associated with a particular group-based communication channel that also tags a group-based communication user account associated with a corresponding group-based communication interface may be a group-based channel communication and a group-based tagged communication.

Group-based communications may include various audio/visual requests. For example, a group-based communication includes a request to video conference, screen-share, audio conference/"call".

Some group-based communications include information associated with a validated external resource. An example group-based communication includes a text or picture file loaded from a validated external file management resource.

The term "group-based communication factor" refers to data, metadata, or other information included in or associated with a group-based communication for purposes of routing the group-based communication, configuring access to the group-based communication, or identifying sending/recipient user(s) associated with the group-based communication. In some embodiments, each group-based communication includes a specific "factor value" for one or more group-based communication factors. In some embodiments, a set of factor values includes all possible factor values for a given group-based communication factor. In an example embodiment, a group-based communication is associated with group-based communication factors including one or more selected from the group of: group-based communication channel identifier, group-based communication type, group-based communication sender or sender identifier, group-based communication sender role, and group-based communication subject.

The terms "group-based communication sender" and "group-based communication sender identifier" refers to an identifier or description that uniquely refers to a group-based user or corresponding group-based user account that originated a group-based communication. In some embodiments, the group-based communication sender identifier associated with a group-based communication uniquely refers to the group-based user that generated a group-based communication. In some embodiments, the factor value set associated with the group-based communication factor of group-based communication sender includes a unique identifier for each group-based user or group-based communication user account that may access a given group-based communication interface or workspace.

The term "group-based communication sender role" refers to an identifier or description of a group-based sender's access, privileges, or status within a given group-based communication interface or organizational group. In some embodiments, a group-based communication sender role includes a description that corresponds to a real-world position title associated with the group-based user in a corresponding organizational group. For example, a particular factor value of a group-based communication sender role may indicate that the sender of a group-based communication is a "Lawyer" at the organizational group associated with the group-based communication interface. Additionally or alternatively, in some embodiments, the factor value of a group-based communication sender includes permissions associated within a particular group-based communication interface or workspace, for example administrators, members, and/or similar roles.

The term "group-based communication type" refers to an identifier, set of identifiers, and/or description associated with the security or communication method for a group-based communication. In some embodiments, a group-based communication type is determined from a group identifier and a channel identifier associated with a group-based communication. In other embodiments, a group-based communication type is determined from a group identifier, a channel identifier, and communication contents associated with a group-based communication. In some embodiments, a group-based communication includes a group-based communication type identifier that uniquely indicates the group-based communication type associated with the group-based communication. In other embodiments, a group-based communication system determines, or can determine, a group-based communication type based on one or more other identifiers associated with the group-based communication, and/or the content of the group-based communication. For example, a group-based channel communication may be associated with a group-based communication type based on the group identifier and/or channel identifier (e.g., where certain channel identifiers are associated with group-based public channels, other channel identifiers are associated with group-based private channels, other channel identifiers associated with group-based single-user direct communication channels, and other channel identifiers associated with group-based multi-user direct communication channels, for example).

The term "user communication system" refers to a software platform and associated hardware that is configured to support and maintain functionality associated with transmitting user communications between various users, and associated functionality. User communication systems are organized into individual users and user sets, such that each user in a particular user set may communicate with other users within the particular user set via a respective user communication interface. An example communication system enables users to communicate outside of a defined user communication interface, such as by direct messaging between users or direct messaging to a group of users outside of a defined user communication interface.

The term "user communication server" refers to a software platform and associated hardware that is configured to manage access to the various user communication interfaces (defined below) of the user communication system. The user communication server is configured to access, maintain, and support application product logic of the user communication system and to access one or more data repositories such as a user communication repository.

The term "user communication interface" refers to a virtual communications environment configured to facilitate user interaction with a user communication system. Each communication interface is accessible and viewable to a set of users, for example users in a particular user set or users invited to join the user communication interface.

The term "user communication interface identity" refers to an entity or repository to which user communications may be delivered in the user communication system and which is associated with a respective user communication interface. The user communication interface may have an identifier, referred to as a user communication interface identifier, which identifies the user communication interface identity and may comprise ASCII text, a pointer, a memory address, and the like. For instance, the user communication interface identifier may be a unique string name of a group or a numerical unique identifier (such as a universal unique identifier).

The terms "user communication system user profile," "user communication system user account," and "user communication system user account details" refer to data, files, and other information associated with a user, including, for example, user communication interface identifiers associated with the user, a plurality of user communications, a plurality of emojis, a plurality of conversations, a plurality of conversation topics, an email address, a real name (e.g., John Doe), a username (e.g., jdoe), a password, a time zone, and the like. The user communication system user account details can include a subset designation of user credentials for the user communication system, such as, for example, login information for the user including the user's username and password.

The term "user communication repository" refers to the location, such as a memory device, where one or more user communications, user communication user profiles or details, and/or user communication interfaces are stored. The user communication repository may be a dedicated device and/or a part of a larger repository. The user communication repository may be dynamically updated or be static. For example, user communications uploaded to the user communication repository may be automatically routed to associated client devices (e.g., client devices associated with recipients of the user communication). Alternatively, the user communications may be routed to associated client devices based on other factors, such as based on time intervals (e.g., transmit to client device every 15 minutes), user initiation (e.g., user may press a button to retrieve user communications associated with their client device), or the like. The group-based communication repository may be encrypted in order to limit unauthorized access of data, including user communication system user account data and user communications.

The term "user communication" refers to inter-user messages, requests, and file transfers transmitted via a communication system. An example communication system is capable of transmitting user communications having various user communication types. Examples of user communications having various user communication types includes: direct communications, multi-user communications, interface communications, and tagged communications.

A direct communication is a user communication between two users of the communication system, and the direct communication is unrelated to a user communication interface. An example direct communication includes a sender identifier uniquely identifying the sending user account and a recipient identifier uniquely identifying the recipient user account.

A multi-user communication is a user communication between a user and multiple other users of the user communication system. An example multi-user communication includes a sender identifier uniquely identifying the sending user account, and multiple recipient identifiers that each uniquely identify a recipient user communication system user account.

An interface communication is a user communication between a user and all users of associated with a communication interface. An example interface communication includes a communication interface identifier, such that all users associated with the respective communication interface may access the communication.

A tagged communication is a user communication including a tagged user account in the communication contents of the user communication. For example, a tagged communication may include a user identifier, username, or other information associated with a tagged user account that indicates the user communication is associated with the tagged user account. A tagged communication may be of any user communication type (e.g., a direct communication, a multi-user communication, an interface communication, or the like).

The term "user communication factor" refers to data, metadata, or other information included in or associated with a user communication for purposes of routing the user communication, configuring access to the user communication, or identifying sending/recipient user(s) associated with the user communication. A user communication has at least one user communication factor. For a given user communication, the value of a user communication factor is referred to as a "factor value." For example, an example user communication has the user communication factors of user communication type (having a factor value of "user direct communication") and user communication sender (having a factor value of "jdoe"). A "set of factor values" includes all possible factor values for a given user communication factor. For example, for a user channel communication within a particular user communication interface, the set of factor values for the user communication factor of user communication sender is the set of all user communication system user accounts (or identifiers) that can communicate within the user communication interface.

The terms "user communication sender" and "user communication sender identifier" refers to an identifier or description that uniquely refers to a user communication system user or user communication system user account that originated a user communication. For example, the user communication sender identifier associated with a user communication uniquely refers to the user communication system user account that generated a user communication.

The term "user communication sender role" refers to an identifier or description of a user communication sender's access, privileges, or status within a given communication interface. In some embodiments, a user communication sender role indicates permissions associated with managing the corresponding user communication interface (e.g., a user communication interface owner, a user communication interface moderator or administrator, a user communication interface member, or the like).

The term "user communication type" refers to an identifier and/or description associated with the security or communication method for a user communication. In some embodiments, a user communication includes a communication type identifier that uniquely indicates the communication type associated with the user communication. Examples user communication types include a user channel communication, a user direct communication, and a user multi-user communication.

The term "focus value" refers to a data object or value that indicates a predicted importance of (1) a group-based communication, (2) group-based communication channel or (3) user communication, with respect to a corresponding recipient user/user account. In some embodiments, a focus value is associated with a group-based communication channel, and indicates the importance of the channel overall. In other embodiments, the focus value is associated with a group-based communication, and indicates the importance of that specific group-based communication. A focus value is a numerical, categorical, or descriptive representation of importance. A numerical focus value is, for example, associated with a "focus value minimum," which indicates the lowest possible importance to a corresponding user, and/or a "focus value maximum," which indicates a highest possible importance to a corresponding user. As a non-limiting example, a focus value for a given user communication is a numerical value between a focus value minimum of 0.0 and a focus value maximum of 10.0.

The term "prior interaction data" refers to historical data or information collected associated with user engagement, by a user associated with a particular [ ][ ] with a particular item rendered. representing prior engagement with a particular group-based communication user account and a The term "focus value generation model" including one or more algorithms or ranking models trained to output a focus value for (1) a group-based communication channel, (2) a group-based communication and/or (3) user communication. Some focus value generation models output a focus value associated for a group-based communication and/or user communication. Other focus value generation models output a focus value for a group-based communication channel. A focus value generation model may be trained by a group-based communication system or user communication system using data collected by the communication system, for example using prior interaction data associated with a particular user account or a group of user accounts. Examples of a focus value generation model include a co-ranking model, a statistical model, a machine learning model, a trainable classifier, a supervised learning model, and the like.

The term "focus threshold" refers to an importance cutoff value associated with notifying a user regarding received user communications. For example, in an example embodiment, a focused user interface only includes information associated with user communications with corresponding focus values above (or alternatively, below) a particular focus threshold. In some embodiments, a focus threshold is the output of a "focus thresholding model" including one or more ranking models or algorithms such as a co-ranking model, a statistical model, a machine learning model, a trainable classifier, a supervised learning model, and the like. In some embodiments, a focus value and a focus threshold are both numerical values.

In some embodiments, a focus threshold is a "factor-based focus threshold" associated with a particular factor value of a group-based communication factor associated with a group-based communication, or a factor value of a user communication factor associated with a user communication. For example, various factor-based focus threshold may be associated with the group-based communication factor of group-based communication type, such that each group-based communication must satisfy a corresponding factor-based focus threshold based on the factor value for group-based communication type associated with the group-based communication. It should be appreciated that in other embodiments, factor-based focus thresholds may be associated with various other group-based communication factors.

In some embodiments, a focus threshold is a "set focus threshold," where the set focus threshold is associated with a set of various factor values for one or more group-based communication factors. For example, a "set focus threshold" may apply to group-based communications having various factor values for the group-based communication factor of group-based communication type (e.g., a set focus threshold may apply to group-based channel and tagged communications, despite the fact that group-based channel communication and group-based tagged communication may be different factor values for group-based communication type). A user may create sets of group-based communication factors and/or factor values to associate the created sets with different set focus thresholds. For example, a user may create a set containing various factor values for the group-based communication factor of group-based communication sender, such that communications by all senders in the group are compared to the same set focus threshold. In other embodiments, a group-based communication system determines factor sets for a user. For example, a group-based communication system may create a single set for all factor values for all group-based communication factors, such that all group-based communications must satisfy a single set focus threshold to be determined important.

In some embodiments, a focus threshold is set between a "focus threshold minimum" and a "focus threshold maximum". In an example embodiment, a focus threshold minimum equals a corresponding focus value minimum. Alternatively or additionally, in some embodiments, a focus threshold maximum equals a corresponding focus value maximum. In other embodiments, a focus threshold minimum and/or focus threshold maximum are each equal to a value between the focus value minimum and a focus value maximum.

The term "mode" refers to a state of communication between a group-based communication system and a user via a client device that represents the user's focus level. A group-based or user communication system may support various "modes" indicating various levels of focus. For example, in an example embodiment, a group-based communication system supports at least an "exploratory mode" and a "focus mode." Exploratory mode represents a low level of focus, and the corresponding group-based or user communication system may identify one or more focus thresholds at a value such that the user is likely to receive more communications having focus values satisfying a corresponding focus threshold, and thus the user is likely to receive more communications/notifications associated with new communications than if the system was in focus mode.

In some embodiments, each mode is associated with a "focus threshold set" that refers to the one or more focus thresholds for group-based communications/user communications having various factor values for one or more group-based communication factors/user communication factors. An example group-based communication system stores a focus threshold set corresponding to each mode supported by the communication system. For example, a group-based communication system may store a focus threshold set associated with each mode in a group-based communication repository.

The term "focused communications set" refers to a limited set of user communications, where each user communication is associated with a focused value that satisfies at least one corresponding focus threshold. A focused communication set is a subset of a group-based communication set (or user communication set) received by a group-based communication system (or communication system) that contains one or more important group-based (or user) communications in the received set. For example, in an example embodiment, a group-based communication system identifies a set of new group-based communications associated with a particular user account, and generates a focused communications set including each group-based communication associated with a focus value that exceeds a corresponding focus threshold, such that the focused communications set may be used to cause rendering of an updated group-based communication interface.

The term "user focus selection input" refers to an indication, value, or other data transmitted from a client device to (1) a group-based communication system in response to engagement with a focus interface component rendered as part of a group-based communication interface, or (2) a user communication system in response to engagement with a focus interface component rendered as part of a user communication interface. A user focus selection input includes at least (1) a focus mode activation/deactivation indication, or (2) one or more component values associated with one or more multi-value interface component. In an example embodiment, a user focus selection input includes at least a slider component value associated with a slider interface component for identifying one or more focus thresholds.

The term "focus interface component" refers to an electronically generated interface object capable of being rendered to a client device and configured to transmit a user focus selection input in response to engagement. A focus interface component includes one or more sub-components configured to receive user engagement. In some embodiments, a group-based communication interface includes a focus interface component. In some embodiments, a focus interface component includes a single interface component. In other embodiments, a focus interface component includes a plurality of components. In some embodiments, the focus interface component (or subcomponents) are configured to be engaged with via the client device, for example in response to user engagement with the client device or via software executed by the client device.

An example focus interface component includes at least one slider component. In an example embodiment, a focus interface component includes a single slider interface component. Engagement with the single slider interface component is configured to transmit a user focus selection input, which includes one or more focus thresholds to be set based on the engagement with the single slider interface component, or a corresponding single slider component value. Each slider interface component is associated with a slider component value that indicates the setting of the slider within the component. For example, a slider component value of 0.5 may indicate the slider is in the middle of a slider interface component, with 0.0 representing the bottom of the slider interface component and 1.0 indicating the top of the slider interface component. Some embodiments are configured to convert a slider component value to a corresponding focus threshold value using one or more algorithms.

Another example focus interface component includes a plurality of slider interfaces, where each slider interface component in the plurality of slider interface components is configured to set one or more focus thresholds. For example, in an example embodiment, each slider interface component is associated with a focus threshold for a different communication type (e.g., a first slider associated with a group-based direct communication threshold and a second slider associated with a group-based tagged communication threshold, or a first slider associated with a first group-based communication channel and a second slider associated with a second group-based communication channel). It should be appreciated that in various embodiments including a plurality of slider interface components, each slider may be associated with various aspects of a group-based communication system. For example, each slider may be associated with a particular group-based user account within a particular group-based communication interface. Each slider may be associated with a particular group-based communication interface. Each slider may be associated with a particular group-based communication channel within a particular group-based communication interface. In some embodiments, engagement with one or more of the slider interface components transmits a user focus selection input, where the user focus selection input includes a slider component value set.

Another example focus interface component is a focus mode button component. In an example embodiment, a focus interface component includes a focus mode button component configured to toggle between a first low-focus threshold mode and a second high-focus threshold mode, such as toggling between an "exploratory mode" and a "focused mode." In some embodiments, a group-based communication system receives a "focus mode activation indication" in response to activation engagement with a focus mode button component via a client device. In some embodiments, a group-based communication system receives a "focus mode deactivation indication" in response to deactivation engagement with a focus mode button component via a client device, wherein a user focus selection input includes the focus mode deactivation indication.

A focus interface component may be embodied by one or more other interface components. In some embodiments, a focus interface component is embodied by one or more components including a dial component, a wheel component, a drop-down component, or the like. Additionally, a focus interface component may be embodied by one or more interface components of the same type, or multiple interface components having different types (e.g., a button interface component and a slider interface component). The particular examples set forth above are not to limit the scope and spirit of the disclosure herein.

The term "multi-value interface component" refers to an interface component capable of representing more than two values. Each value of a multi-value interface component represents a different focus level, focus modes, and/or component value associated with one or more focus thresholds. A slider interface component, for example, may be set to various positions corresponding to one of a plurality of slider component values. Additionally or alternatively, a dial interface component, wheel interface component, drop-down interface component, plurality of slider interface components, and/or the like, each may be referred to as a "multi-value interface component" to distinguish from a preference toggle component (e.g., an interface component having a binary toggled option, such as a component that only enables and/or disables a focus mode or focus threshold, such as an interface preference setting, or an interface component for muting a particular set of communications).

The term "focus event" refers to a scheduled or determined meeting, time period, or calendar event. During a focus event, a user is likely engaged with a defined group of users associated with the focus event, such that the user should likely not be disturbed with a user communication, or corresponding notification information, unless the user communication relates to is highly important or is associated with the focus event. Examples of focus events includes information received from validated external resources, such as information included in a single-user external email corpus or multi-user external email corpus such as calendar events, scheduled meetings, or other indications and/or determinations that a user is engaged in a particular task.

A focus event is associated with a focus event start time and a focus event end time. Additionally, in some embodiments, a group-based communication system receives or determines additional time associated with the focus event start time and/or after the focus event end time. For example, in an example embodiment, a group-based communication system receives or determines additional preparation time associated with a focus event, such that a focus event begins before a scheduled/determined focus event start time.

In an example embodiment, a group-based communication system generates a high focus value associated with user communications between users associated with a focus event within a pre-determined time period (e.g., communications between two users that have a meeting scheduled within an hour). In another example embodiment, during a focus event, a group-based communication system sets at least one focus threshold such that less user communications are associated with focus values that satisfy the threshold. In an example embodiment, a group-based communication system sets a low focus threshold associated with user communications determined to be associated with the focus event, and a high focus threshold associated with all other user communications.

The term "focus mode interface effect" refers to a specific visual effect that alters the rendering of a group-based communication interface, user interface, or a sub-element thereof. A group-based communication interface (or user interface) is rendered using a focus mode interface effect such that components of the group-based communication interface (or user interface) determined to be important are rendered visually distinct from components of the group-based communication interface (or user interface) associated with information determined to be unimportant. In some embodiments, a focus mode interface effect is applied only to important elements of a group-based communication interface or user communication interface. In other embodiments, a focus mode interface effect is applied only to unimportant elements of a group-based communication interface or user communication interface. In other embodiments yet, a first focus mode interface effect is applied to important elements, and a second focus mode interface effect is applied to unimportant elements of a group-based communication interface and/or user communication interface. Examples of focus mode interface effects include, but are not limited to, one or more selected from the group of: a font size, a font color, a font change, a background color change, a brightening effect (e.g., a glow, border, or other visual effect to draw a user's attention), a grey-out, a block-out, a predefined transparency, and an animation effect. In some embodiments, a focus mode interface effect may be applied to a group-based communication interface, a group-based communication channel, a group-based communication, a user communication interface, a user communication, an interface component associated with any combination thereof, or any combination of the preceding elements.

OVERVIEW

In a group-based communication system, users associated with group-based communication system user accounts may communicate with one another in a myriad of ways. For example, a group-based communication system user account may be a member of one or more group-based communication interfaces, each group-based communication interface dedicated to a particular organizational group or team including a specific group of group-based communication user accounts. For example, the group-based communication system user account may be linked, and/or otherwise associated, with one or more group-based communication interface accounts (or corresponding identifiers) that the group-based communication system user account ay access.

A particular user may be a member of various teams and corresponding group-based communication interfaces (often referred to as workspaces). Within the various group-based communication interfaces associated with a given user account, a user may receive tens, hundreds, thousands, or more group-based communications. This can quickly become overwhelming and/or distracting. Each group-based communication transmitted to the user may not be of equal importance or relevance to that user. While accessing a group-based communication system, a user may receive unimportant communications and/or corresponding notifications, which may distract the user from work or a task they wish to focus on. For example, a user may receive notifications associated with high-volume group-based communications activity in a group-based communication channel that the user is a member of but finds generally unimportant (e.g., the book-of-the-month channel) in the context of the user's busy work day. This issue is compounded when one considers that a user may be a member of several group-based communication interfaces, each having dozens of group-based communication channels. This could lead to a given user being notified of six or more arriving group-based communications in any given minute of the user's work day. Such constant distraction could greatly limit the user's productivity.

Muting or hiding all group-based communications and/or corresponding notifications transmitted to one or more group-based communication interfaces and/or group-based communication channels, or hiding one or more group-based communication channels completely, throws the good out with the bad and creates a high risk that important group-based communications will be missed.

Various embodiments of the present invention relate to dynamically focusing a group-based communication interface to filter important group-based communications and/or corresponding notification information from relatively unimportant noise or clutter. Embodiments additionally relate to group-based communication interfaces that are configured to enable focusing of the group-based communication interface using a focused interface component.

A user may set a focus level for a group-based communication interface using a focused interface component. Example focus levels may correspond with one or more focus thresholds that operate to limit information rendered to the group-based communication interface. Engagement of a focus interface component by the user causes transmission of a corresponding user focus selection input to a group-based communication system. The user focus selection input may include a selected focus mode, a focus mode activation/deactivation indication, or one or more component values associated with multi-value interface components set by the user.

The group-based communication system is configured to receive a group-based communication to be rendered to a user within the group-based communication interface or a group-based communications set including two or more group-based communications to be rendered to the user within the group-based communication interface. For example, the group-based communication may receive a new group-based communication (or new group-based communications in a group-based communications set) that is accessible to a particular user via a group-based communication system user account. Alternatively, the group-based communication system may receive a group-based communication (or group-based communications in a group-based communications set) that was previously received, so as to cause updated rendering of a group-based communication interface in response to engagement with a focus interface component.

The group-based communication system may generate a focus value representing the importance and/or relevance of a corresponding group-based communication. The group-based communication system utilizes the user focus selection input to identify one or more focus thresholds, and a focus value for a group-based communication must satisfy a corresponding focus threshold to be determined important. The group-based communication system causes rendering of the group-based communication interface including a limited set of information associated with group-based communications that the group-based communication system determines to be important, thus providing a user interface that is de-cluttered and less distracting while still providing a user with group-based communications likely to be important to them.

The user may engage or interact with a focus interface component rendered to the group-based communication interface to activate a focus mode and/or adjust their level of focus. In some embodiments, the focus interface component may be configured to enable the user to customize their focus level, for example, by including one or more multi-value interface components configured to enable the user to easily change their desired focus level to a specific and desired level. In some embodiments, multi-value interface components enable the user to advantageously customize one or more focus thresholds to better reflect a user's focus intentions than would be possible using rigid preference settings or rules. Additionally, multi-value interface components may be integrated in a group-based communication interface without requiring the user to navigate away from the group-based communication interface to a preferences interface, such that the user may dynamically adjust their focus level(s) without stopping their work or navigating away from relevant communications. The multi-value interface components may include easy to adjust user interface components, such as slider interface components, wheel interface components, dial interface components, drop-down interface components, or the like, for enabling quick and robust setting of one or more focus levels, and thus corresponding focus thresholds, associated with incoming group-based communications.

The group-based communication system may receive a corresponding user focus selection input that affects which information received by a group-based communication system is rendered to the group-based communications interface (e.g., which communications are rendered and/or what notifications/badges are rendered). The group-based communication system may cause rendering of a specific interface that includes information associated with group-based communications determined to be important, rather than including all received group-based communications regardless of importance.

The methods, apparatuses, systems, and computer program products described herein are directed to a group-based communication system that is configured to advantageously cause rendering of specific group-based communication interfaces having one or more focus interface components. Such focus interface components are configured to allow user selection of a focus level, which is used by the group-based communication system to filter incoming group-based communications and direct communications so that only those satisfying a given focus threshold are rendered to an associated group-based communication interface. The group-based communication system causes appropriate rendering of the group-based communication interface based on important group-based communications, such that the rendered group-based communication interface has information associated with important group-based communications and/or channels, rather than all received group-based communications and/or all group-based communication channels for a particular group-based communication interface.

The methods, apparatuses, systems, and computer program products described herein are further directed to a user communication system similarly configured to advantageously cause rendering of specific user communication interfaces having one or more focus interface components. The user communication system filters incoming user communications so that only user communications satisfying a given focus threshold are rendered to an associated user communication interface. The user communication system causes appropriate rendering of the user communication interface based on important user communications, such that the rendered user communication interface has information associated with important user communications rather than all received user communications.

Embodiments herein further enable users to customize their focus preferences in a robust and efficient manner using multi-value interface components that remain accessible to the user, allowing the user to adjust their experience without utilizing rigid preference settings that may be hidden in other interfaces. Embodiments of the present disclosure improve the user experience and conserve processing resources for client devices by limiting information to be rendered.

Technical Underpinnings

A group-based communication system is configured to configure, provide information for, and/or otherwise cause rendering of one or more group-based communication interfaces. The group-based communication system may include authenticated group-based user accounts associated with various group-based users. The group-based user may access the group-based communication system via a client device, for example during an authenticated session associated with a particular group-based user account. The group-based communication system may customize the group-based communication interfaces based on the group-based user account, and utilize the authenticated group-based user account to identify and/or provide group-based communications to which the group-based user account has access.

A group-based communication includes, or otherwise is associated with, various group-based communication factors for routing, enabling access to, or otherwise managing the group-based communication. A group-based communication includes a group identifier associated with the group-based communication interface within which users may access the group-based communication. Some group-based communications include a group-based communication channel identifier, such that the group-based communication is only accessible to users that may access a particular group-based communication channel within the group-based communication interface. Other group-based communications include a recipient identifier, or multiple recipient identifiers, uniquely identifying group-based communication system user accounts within the group-based communication interface having access to the group-based communication.

A group-based communication includes a group-based communication sender identifier that uniquely identifies a group-based communication system user account that originated the group-based communication (e.g., a group-based communication sender). The group-based communication system may include, manage, or otherwise access group-based communication user account details associated with the group-based communication sender, such as a group-based communication sender role, name, or the like. A user may access the group-based communication system through a client device for an authenticated session associated with a group-based communication system user account. The user may, access group-based communications specifically associated with their group-based communication system user account, for example group-based communications associated with group-based communication interfaces, group-based communication channels, and groups that the group-based communication system user account is associated with. Thus, the group-based communication system provides a customized and tailored experience for each user.

The group-based communication system may configure a group-based communication interface to include a focus interface component, and render the group-based communication interface including the focus interface component to the client device. The focus interface component may include one or more multi-value interface components, for enabling a group-based user to set a customized focus level that corresponds to one or more set focused thresholds. The focus interface component may be configured to transmit a user focus selection input upon engagement, for example to transmit a user focus selection input from the client device operated by the user to the group-based communication system upon user engagement with an interface component included in the focused interface component. The focus interface component may be engaged manually by the user of the client device, and utilized to indicate the user's desired focus level.

In some embodiments, a group-based communication system generates a focus value for a received group-based communication. The focus value represents an importance level associated with the group-based communication. The group-based communication may be determined important if the focus value for the group-based communication satisfies an applicable focus threshold. In some embodiments, various group-based communication factor values for one or more group-based communication factors are selected to form a particular factor value set. The particular factor value set may then be associated with a particular set focus threshold. Each group-based communication associated with a factor value in the particular factor value set must then satisfy the particular set focus threshold associated with that particular factor value set. For example, in one embodiment, all group-based communication factor values for all group-based communication factors are grouped, such that one set focus threshold applies to all group-based communications regardless of their factor values for each group-based communication factor. (e.g., the focus value for each group-based communication must satisfy the one set focus threshold).

In other embodiments, the focus value for a group-based communication must satisfy a factor-based focus threshold based on a factor value for a particular group-based communication factor associated with the group-based communication. For example, a first set factor threshold may be associated with a first factor value set that includes a subset of all factor values for group-based communication sender (e.g., UserA and UserB) and a second set factor threshold may be associated with a second factor value set that includes a second subset of factor values for group-based communication sender (e.g., UserC and UserD) within a particular group-based communication interface (e.g., where UserA, UserB, UserC, and UserD form all possible factor values for group-based communication sender within the group-based communication interface). In this example, if a group-based communication is determined to have a factor value for group-based communication sender that equals UserA, the identified set focus threshold would be the first set factor threshold. If a group-based communication is determined to have a factor value for group-based communication sender that equals UserD, the identified set focus threshold would be the second set factor threshold, because the system would determine the factor value for the group-based communication is within the second factor set associated with the second set factor threshold.

In some embodiments, a group-based communication system generates a focus value for a group-based communication channel. The focus value represents an importance level for group-based communications transmitted within group-based communication channel (e.g., based on a group-based communication channel identifier associated with the group-based communication). In some embodiments, a focus value for a group-based communication channel is generated based on an aggregate focus value of all group-based communications within the group-based communication channel. In other embodiments, the focus value for a group-based communication channel is generated based on the various group-based communication user accounts with access to, or that communicate within, the group-based communication channel (e.g., who is in the channel, who has permissions to post to the channel, what roles communicate within the channel, and the like).

In one embodiment, the focus interface component includes a slider interface component associated with adjusting a focus threshold, such as one set focus threshold associated with all group-based communications. In another embodiment, the focus interface component includes a plurality of slider interface components associated with adjusting various factor-based focus thresholds, such that a group-based communication must satisfy the factor-based focus threshold associated with a particular group-based communication factor for the group-based communication. Examples of group-based communication factors include, without limitation, a group-based communication sender, a group-based communication type, a group-based communication topic, a group-based communication subject, a group-based communication channel, or the like. A factor-based focus threshold may be associated with one or more group-based communication factor such that a group-based communication having a particular group-based communication factor must satisfy the corresponding factor-based focus threshold.

In yet another embodiment, the focus interface component includes a drop-down component associated with setting a focus level/mode, for example setting a focus mode to "low", "medium", or "high". In another embodiment, the focus interface component includes a dial component capable of setting a plurality of intermediate focus levels or modes.

In yet another embodiment, the focus interface component includes a focus button component associated with activating/deactivating a focus mode, such as toggling between a "focus mode" and an "exploratory mode." In some embodiments, the group-based communication system is configured to identify one or more focus thresholds using one or more focus thresholding models.

The group-based communication system may utilize the user focus selection input to determine if one or more group-based communications are important to the user. For example, the group-based communication system may generate a focus value for a group-based communication, which represents an estimated importance of that group-based communication to the user. The group-based communication system may utilize one or more focus value generation models, such as algorithms, machine learning models, and/or the like, to generate the focus value for a group-based communication. The group-based communication system may identify, collect, or otherwise retrieve prior interaction data associated with a particular group-based user or group-based user account. In some embodiments, the group-based communication system trains a focus value generation model to generate the focus value based on the prior interaction data. In some embodiments, the group-based communication system may utilize a trained focus value generation model to generate the focus value based on prior interaction data associated with the group-based user or group-based user account. For example, the group-based communication system may receive, track, determine, or otherwise identify data associated with the group-based communication user's interactions with prior group-based communications (e.g., which group-based communications the user quickly accessed and/or responded to, other group-based users/accounts the group-based user often communicates with, and the like).

The group-based communication system may also identify a focus threshold that a group-based communication must satisfy to be determined important. In some embodiments, the group-based communication system identifies a focus threshold based on the user focus selection input. Embodiments may utilize various types of focus thresholds. For example, in one example embodiment, the group-based communication system may identify one or more set focus threshold, such as a set focus threshold to be compared with each group-based communication regardless of group-based communication factors. In other embodiments, the group-based communication system may identify one or more factor-based focus thresholds. For example, a factor-based focus threshold may be identified for each group-based communication type, such that a group-based communication having a particular factor value for group-based communication type must satisfy the factor-based focus threshold corresponding to that factor value for group-based communication type to be determined important.

The group-based communication system may determine if the user is busy/focused, and thus set one or more focus thresholds as appropriate. For example, the group-based communication system may communicate with one or more validated external resources to identify a focus event, such as a meeting, scheduled call, or other event. For example, a group-based communication system user account accessing the group-based communication system may be associated with one or more validated external resources that manage focus events. The group-based communication system may identify an external resource user identifier and corresponding validated external resource, and utilize the identified external resource user identifier to retrieve an focus event information from the validated external resource, for example in the form of an external data object, single-user or multi-user external email corpus from the validated external resource, In some embodiments, the group-based communication system parses the focus event information received from the validated external resource to identify one or more focus event managed by the validated external resource. The group-based communication system may determine that the user is engaged in the focus event and should not be disturbed, and accordingly set one or more high focus thresholds such that the user is only notified regarding highly important group-based communications.

In an example embodiment, the group-based communication system identifies a set focus threshold based on information included in the received user focus selection input. In some embodiments, for example, the user focus selection input includes information associated with the focus interface component for use in identifying a focus threshold, such as a focus mode activation/deactivation indicator, or one or more slider interface values associated with various slider interface components.

For example, the group-based communication system may identify a set focus threshold, which may be compared with various group-based communications having various factor values for various group-based communication factors. Such embodiments enable the group-based communication system to generate focus values on an objective scale, such that focus values for group-based communications may be compared across group-based communications having various factor values for a given group-based communication factor.

Alternatively, the group-based communication system may identify one or more factor-based focus thresholds based on information included in the user focus selection input. A particular factor-based focus threshold may be associated with a particular group-based communication factor, for example a group-based communication type, such that group-based communications having the group-based communication type may be compared with the factor-based focus threshold to determine if the group-based communication is important. A user may set various factor-based focus thresholds using a plurality of interface components, for example a plurality of slider interface components. Such embodiments enable users to specifically tailor their focus level based on the factor values for various group-based communication factors with which the user most desires to engage (e.g., group-based communications of a certain group-based communication type, having a certain group-based communication sender, in a particular group-based communication channel, or the like).

The group-based communication system may identify a focus threshold, such as a grouped threshold or one or more factor-based focus thresholds, using one or more focus thresholding model(s). A focus thresholding model may include an algorithm, machine learning model(s), and/or the like, to generate or otherwise identify a focus threshold for a given user and/or group-based communication. In an example embodiment, the group-based communication system utilizes a trained focus thresholding model to identify a focus threshold based on at least the user focus selection input. In some embodiments, the focus thresholding model may also identify the focus threshold based on various other factors associated with the group-based communication (e.g., a group-based communication type, a group-based communication channel identifier associated with the group-based communication, and the like), a time, a day of the week, a date, and/or data associated with the group-based communication user's interactions or interaction trends with the group-based communication system (e.g., is the user usually focused at during the current time based on one or more selected from the group including time of day, day of week, or month, does the user engage more with group-based communications having a certain group-based communication type, and the like). The focus thresholding model may be embodied using various machine learning implementations, including one or more neural networks, regression models, classifiers, and/or the like.

The group-based communication system may configure and/or cause rendering of the group-based communication interface including important group-based communications and/or focused communication notifications associated with important group-based communications. The group-based communication system may cause rendering of the group-based communication interface such that the user is notified of information associated with group-based communications determined as important (e.g., by having a focus value that satisfies a corresponding focus threshold). In an example embodiment, the group-based communication system causes rendering of the group-based communication interface including only group-based communications determined as important (e.g., satisfying the corresponding focus threshold). Alternatively, in another embodiment, the group-based communication system causes rendering of the group-based communication interface including all group-based communications transmitted, but including a focused communication notification, or associated focused communication notification information configured to cause rendering of a focused communication notification, only for group-based communications determined to be important.

Embodiments of the present disclosure advantageously limit information rendered to the user to prevent the user from being unnecessarily distracted by unimportant communications received at a time of focus. Embodiments of the present disclosure enable users to customize their focusing using a focus interface component, thus enabling the user to readily and dynamically adjust their focus level without managing a preference set. Thus, embodiments of the present disclosure improve the user experience associated with accessing and utilizing services via a group-based communication system. Additionally, embodiments of the present disclosure advantageously conserve computer processing resources of client devices by limiting information to be rendered to via the client device.

System Architecture

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, or a computer workstation. Further, an example embodiment may be embodied by any of a variety of mobile terminals, such as a portable digital assistant (PDA), mobile telephone, smartphone, laptop computer, tablet computer, wearable device, or any combination of the aforementioned devices.

In this regard, FIG. 1 discloses an example computing system within which embodiments of the present disclosure may operate. FIG. 1 illustrates an overview for a system 100 configured for managing one or more group-based communication interfaces for rendering, and providing group-based communications between users.

The system 100 includes a group-based communication system 102, client devices 108A-108N, and validated external resources 110A-110N. The group-based communication system 102 may communicate with one or more of the client devices 108A-108N via a network, such as network 112. Group-based communication system 102 may communicate with one or more of the validated external resources 110A-110N through the same or another network. As illustrated, the group-based communication system 102 may communicate with one or more of the validated external resources 110A-110N via the network 112.

Group-based communication system 102 includes group-based communication server 104 and group-based communication repository 106. The group-based communication server 104 may be configured, via one or more software modules and/or hardware modules, to access the network 112 for communicating with one or more of the client devices 108A-108N and/or one or more of the validated external resources 110A-N. Additionally or alternatively, the group-based communication server 104 may be configured utilizing hardware modules, software modules, or a combination of hardware and software modules to perform one or more of the operations disclosed herein with respect to managing group-based communications and/or causing rendering group-based communication interfaces.

The group-based communication repository 106 may be configured to store group-based communication data, group-based user/account data, organization data, group-based communication interface data, and/or the like. For example, in some embodiments, the group-based communication repository is configured to store at least group-based communications associated with various group-based communication interfaces group-based communication channels and the like, such that an appropriate group-based communication interface may be rendered including one or more of the stored group-based communications. Additionally or alternatively, the group-based communication repository 106 may store group-based communication system user data for use in authenticating group-based communication system user accounts. For example, the group-based communication repository 106 may store user authentication credentials for a given group-based user account, trusted client devices for a given group-based user account, external resource access tokens for a given group-based user account, and/or the like, for enabling group-based communication services tailored to the particular user by accessing the validated external resource. In some embodiments, the group-based communication repository 106 includes one or more sub-repositories, cloud-based repositories, or the like.

Each of the client devices 108A-108N may be embodied by any number of known computing devices in the art. Examples of client devices include personal computers, laptops, desktops, computing terminals, smartphones, tablets, personal digital assistants, wearable devices, smart home devices, and the like. A client device may be configured to access the group-based communication system via a local application executed on the client device, such as a software application or executable. The group-based communication system 102 may communicate with one or more client device 108A-108N to receive input from a user, and/or render group-based communication interfaces to a user of the client device.

For example, in some embodiments, a user accesses the group-based communication system via a software application executed on one of the client devices 108A-108N. The software application may be provided by the group-based communication system 102, and/or a third-party system for downloading and/or installing software applications (e.g., an application store, not shown). The user account may validate user authentication credentials to begin an authenticated session associated with a particular group-based user account. During the authenticated session associated with the group-based user account, the user may, via the client device, access various functionality associated with the group-based communication system and accessible to the group-based user account. For example, the user may access one or more group-based communication interfaces and, within each group-based communication interface, one or more group-based communication channels. During the authenticated session associated with the group-based user account, the group-based communication system may receive information associated with the client device and/or the group-based user account from the client device. For example, the client device may transmit one or more of location data, authentication tokens and/or user account details for verification, and/or the like, to the group-based communication system 102. The group-based communication system 102 may cause rendering of one or more group-based communication interfaces to the client devices 108A-108N, which may be configured to perform rendering of the group-based communication interface. For example, the client device may receive a group-based rendering request generated and/or configured by the group-based communication system 102, to cause rendering of a specifically configured group-based communication interface, in accordance with embodiments described herein.

Each of the validated external resources 110A-110N represents an external system, resource, computer, or the like, that a user of a client device associated with a corresponding group-based communication system user account may access via the group-based communication system 102. For example, the group-based communication system 102 may access a validated external resource via one or more application programming interfaces (APIs). A validated external resource may provide a specific service via the group-based communication system 102. For example, validated external resource 110A may be a validated external email resource, calendaring and/or scheduling resource, or the like, which a user may access via the group-based communication system 102 to schedule meetings, events, tasks, or the like. A validated external resource may be embodied in a variety of ways and utilizing a variety of computing devices. For example, a validated external resource may be a computer or server remote from the group-based communication system 102 and accessible over the network 112 (e.g., over the Internet for example).

In some embodiments the group-based communication system 102 accesses a validated external resource utilizing an external resource user identifier stored by the group-based communication system 102, such as in group-based communication repository 106. The external resource user identifier may include, or otherwise be associated with and retrievable together with, an external resource access token associated with the validated external resource and/or group-based communication system user account. A group-based communication system 102 may store one or more external resource user identifiers including or associated with an external resource access token(s) to enable API requests to the validated external resource. In some embodiments, external resource access tokens may be associated with specific group-based user accounts, such that a particular group-based communication system user may access a validated external resource to retrieve, manage, or otherwise access information specifically associated with the particular user. For example, an external resource user identifier may be utilized to retrieve an external user data object from a validated external resource, the external user data object including focus event information associated with one or more focus events scheduled for a particular group-based communication user account associated with the external resource user identifier.

The group-based communication system 102 may be embodied by one or more computing systems, such as the apparatus 200 illustrated in FIG. 2. As illustrated in FIG. 2, the apparatus 200 may include a processor 202, a memory 204, an input/output module 206, a communications module 208, a group-based management module 210, and a focus management module 212. The apparatus 200 may be configured, using one or more of the module 202-212, to execute the operations described below.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with example embodiments of the present inventions.

In some embodiments, each of the modules 202-212 may be embodied by a combination of hardware and software for performing the operations described herein. In other embodiments, some of the module 202-212 may be embodied entirely by hardware. Further, in other embodiments, some of the modules 202-212 may be embodied entirely by software.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention when configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receiving signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The group-based management module 210 may be used to provide operations associated with managing group-based communications and corresponding group-based communication interfaces of the group-based communication system. In this regard, the group-based management module 210 may be configured for, in conjunction with other modules, a number of operations including, without limitation, accessing one or more repositories storing data associated with the group-based system (for example, stored data associated with group-based users, group-based communications, group-based communication interfaces, and/or the like), transmitting group-based communication to one or more clients devices, or generating transmissions configured to cause rendering of a group-based communication interface with appropriate information (e.g., only important group-based communications shown or only focused notification information for important group-based communications shown, as described herein). In some embodiments, the group-based management module 210 may also be used for generating and/or configuring one or more group-based communication interfaces. In some embodiments the group-based management module 210 may be configured for transmitting group-based communications between client devices associated with various group-based communication system user accounts. The group-based management module 210 may perform one or more of these operations utilizing one or more other modules, such as the processor 202, memory 204, communications module 208, and/or the like.

The focus management module 212 may be used to provide operations associated with determining, marking, or otherwise separating group-based communications into important communications and unimportant communications, using corresponding focus values and focus thresholds as described further herein. In this regard, the focus management module 212 may be configured for generating a focus value for a group-based communication, and/or a focus value for each group-based communication in a group-based communications set (e.g., a focus value per group-based communication). In some embodiments, the focus management module 212 may be configured for identifying one or more focus thresholds, for example a set focus threshold or a factor-based focus threshold. Additionally or alternatively, the focus management module 212 may be configured for comparing a focus value associated with a group-based communication and corresponding focus value, and performing and/or causing corresponding action in response to the comparison. In some embodiments, the focus management module 212 may be configured to perform one or more of the above operations utilizing one or more machine learning or algorithmic models. Additionally or alternatively, the focus management module 212 may perform one or more of these operations utilizing one or more other modules, such as the processor 202, memory 204, communications module 208, and/or the like.

Example Group-Based Communication Interfaces

FIGS. 3-7A and 7B illustrate example graphical user interfaces, specifically group-based communication interfaces, for managing group-based communications and group-based communication channels in accordance with example embodiments of the present disclosure. It should be appreciated that the illustrated group-based communication interfaces are illustrated by way of example, and the FIGS. 3-7 are not depicted to limit the scope and spirit of the disclosure herein. Furthermore, it should be appreciated that other communication systems that are not group-based may similarly perform operations within the scope of this disclosure and/or maintain graphical user interfaces within the scope of this disclosure. The embodiments discussed herein are not limited to group-based communication systems.

The group-based communication interface illustrated in FIGS. 3-7A and 7B include a focus interface component for enabling a user to "focus" the group-based communication interface. The focus interface component includes one or more graphic user interface components for transmitting a user focus selection input to the group-based communication system. The group-based communication system then "focuses" the group-based communication interface to display more limited information associated with group-based communications and/or group-based communication channels determined and/or otherwise identified as important by the group-based communication system. It should be appreciated that, in some embodiments, the focus interface component may include a single user interface component (e.g., a single slider interface component). In other embodiments, the focus interface component may include a plurality of user interface components (e.g., a plurality of slider interface components, or a single slider interface component and a button interface component) Similarly, in some embodiments the focus interface component includes multi-value interface components, and in other embodiments includes at least binary interface component for activating/deactivating a focus mode. The focus interface component illustrated in FIGS. 3-7A and 7B are illustrated by way of example, and are not to limit the scope and spirit of the disclosure herein.

Figure 3:
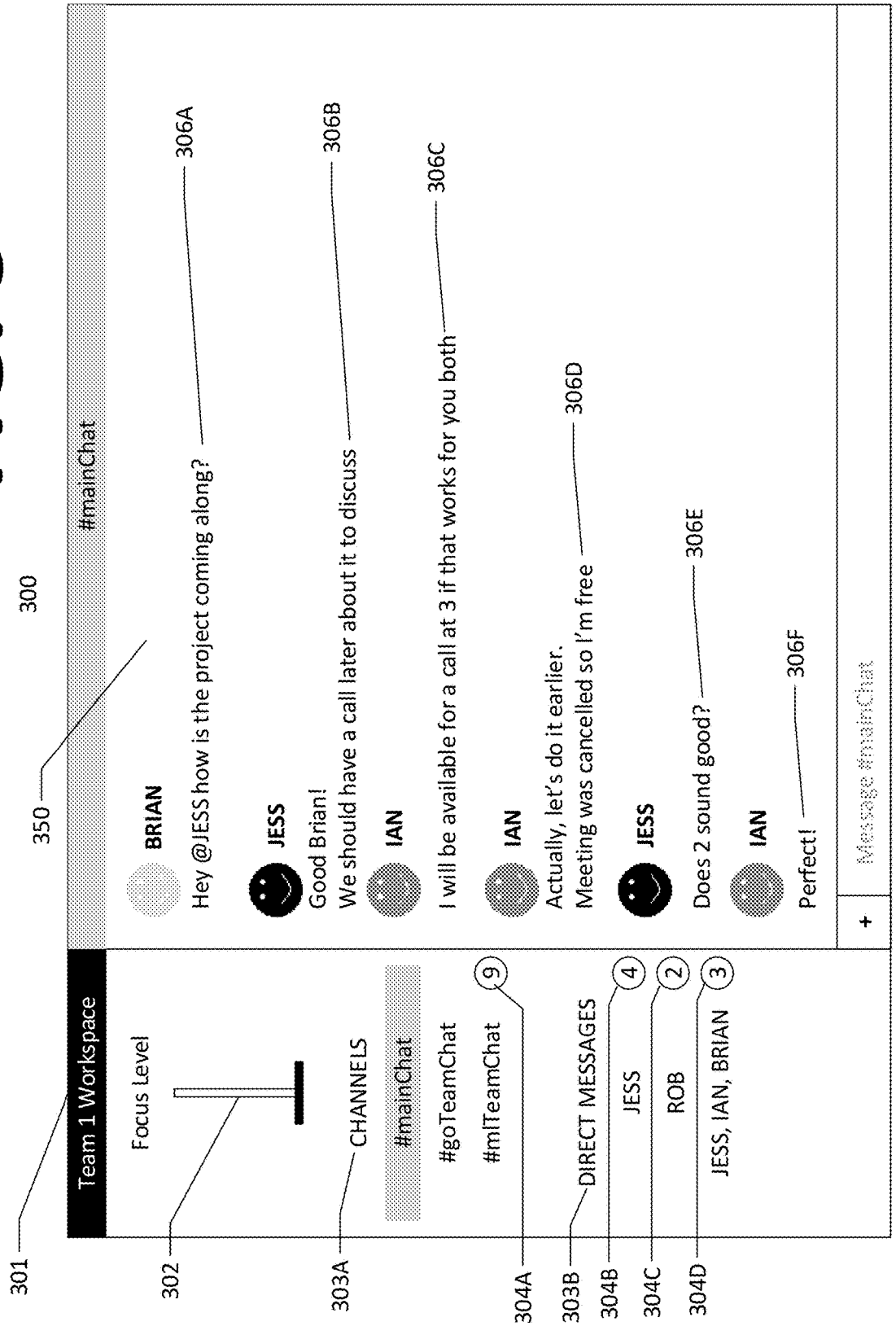

FIG. 3 illustrates an example group-based communication interface 300 including a single slider interface component 302, in accordance with some embodiments of the present disclosure. A group-based communication system, such as one embodied by apparatus 200, may cause rendering of the group-based communication interface 300, such as via transmission of one or more requests or information to a client device. The group-based communication interface 300, as illustrated, includes content panel 350 displaying a specific group-based communication channel (#mainChat), including a plurality of group-based communications 306A-306F associated with that group-based communication channel. As illustrated, group-based communication interface 300 also includes side panel 301 that includes a plurality of rendered group-based communication channels configured for accessing other group-based communication channels.

In group-based communication interface 300, the focus interface component includes slider interface component 302. In some embodiments, slider interface component 302 is configured to transmit a user focus selection input to the group-based communication system in response to engagement with the slider interface component 302. The user focus selection input may include a slider component value, representing the position of the slider within the component. The user focus selection input may also indicate that focus mode was activated (e.g., the slider has been moved past an activation point, for example moved above the bottom of the component, or moved above the bottom 10% of the component) or that focus mode was deactivated/another mode, such as "exploratory mode," was activated (e.g., the slider has been moved past a deactivation point, for example moved to the bottom of the component, or moved below an activation point such as the bottom 10% of the component). Additionally or alternatively, the user focus selection input may include a slider component value that represents the position of the slider in the slider interface component 302.

The group-based communication system may be configured to determine one or more focus thresholds based on the user focus selection input received. For example, in an example embodiment, the group-based communication system receives a user focus selection input including a slider component value between 0.0 and 1.0, which indicates the position of the slider interface component 302. The group-based communication system may be configured to identify a focus threshold based on the slider component value, for example using a focus thresholding model or algorithmic transformation. The focus threshold identified by the group-based communication may be utilized to determine if one or more group-based communications is important. In other embodiments, the group-based communication system may retrieve, or otherwise determine one or more focus thresholds based on the received user focus selection input.

For example, in some embodiments, the group-based communication system may identify a set focus threshold based on the user focus selection input. In some embodiments, all group-based communications are compared to a single set focus threshold, regardless of the group-based factors for each group-based communication. IN such embodiments, each group-based communication must be associated with a focus value that satisfies the single set focus threshold to be determined important. The group-based communication system may extract a multi-value interface component value from the user focus selection input, such as a slider component value associated with the slider interface component 302 illustrated in FIG. 3, for use in identifying a focus threshold (e.g., a set focus threshold or a factor-based focus threshold).

Each focus threshold may be associated with a threshold minimum and a threshold maximum, which indicates the lowest and highest value that may be associated with the focus threshold (e.g., 0.0 and 10.0 in an example embodiment). In an example embodiment, a focus threshold is identified based on a received slider component value, such that the slider component value and corresponding identified focus threshold are lower (e.g., closer to 0.0 and 0.0, respectively) when the slider interface component is set to a low position (e.g., slider is near the bottom of the component), and the slider component value and corresponding identified focus threshold are higher (e.g., closer to 1.0 and 10.0, respectively) when the slider interface component is set to a higher position (e.g., slider is near the top of the component).

In some embodiments, the slider interface component 302 is configured to receive user engagement for adjusting the slider position. For example, the slider interface component may be set by a user touch, a user mouse click, speech input, or the like. Additionally or alternatively, in some embodiments, the slider interface component 302 may be set automatically, such as by a determination performed by a corresponding group-based communication system. In an example embodiment, the group-based communication system may set a default slider position for the slider interface component 302, such as a default slider position based on a determined focus level for the user. For example, the group-based communication system may utilize a machine learning model to determine a predicted focus level for the user at a given time, and set the slider interface component 302 accordingly by default. The group-based communication system may, for example, utilize a machine learning model that generates an estimated focus level for a group-based user based on one or more selected from the set including a time of day, a day of the week, a date, a focus event set, prior interaction data representing the user's interaction with group-based communications, and the like.

The group-based communication interface 300 includes a plurality of communication notifications 304A-304D, which in the illustrated embodiment are rendered to the side panel 301, but in other embodiments may be rendered to another portion of the group-based communication interface 300. Each of the communication notifications 304A-304D indicates the user has received an important group-based communication in another group-based communication channel. As illustrated each of the plurality of communication notifications 304A-304D may be associated with a corresponding group-based communication channel. For example, communication notification 304A, as illustrated, is associated with the group-based communication channel #mlTeamChat. Communication notification 304A indicates to the user the number of group-based communications determined important that were received in the corresponding group-based communication channel. In the illustrated example, group-based communications may be likely to satisfy a corresponding focus threshold set based on the slider interface component 302, because the slider interface component is set to a very low position. In some embodiments, the slider interface component 302 may be set below a focus mode activation point, and thus the group-based communication interface 300 may include notification information associated with all received group-based communications, or may include notification information based on a corresponding user notification preference information.

Figure 4:
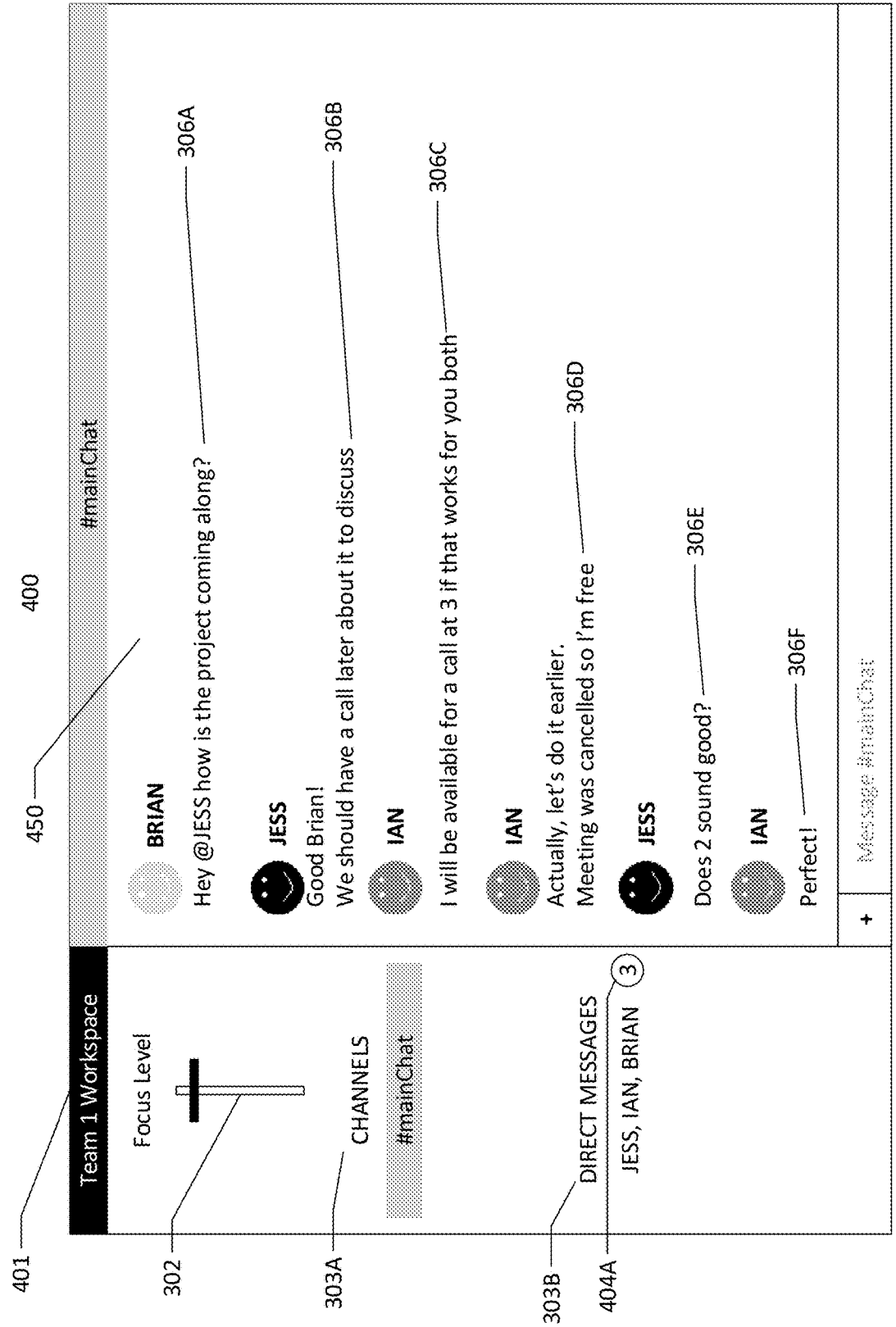

An embodiment group-based communication system may cause rendering of group-based communication interface 400 as illustrated in FIG. 4 after receiving a user focus selection input, for example in response to user engagement with the slider interface component 302. The group-based communication interface 300 may dynamically transition to group-based communication interface 400 in response to engagement with the slider interface component 302.

As illustrated in FIG. 4, the slider interface component 302 is set to a higher position, for example in response to user engagement with the slider interface component 302, or in response to a determination by a corresponding group-based communication system. The high position of the slider interface component 302 may transmit a user focus selection input to a corresponding group-based communication system, such that the group-based communication system identifies a high focus threshold according to the user focus selection input. The group-based communication system may then generate corresponding notification information associated with group-based communications with corresponding focus values that satisfy a corresponding focus threshold.

As illustrated in FIG. 4, group-based communication interface 400 includes side panel 401 that has been focused based on group-based communication channels determined to be important. Side panel 401 does not include public/private channels list 303A and direct channels list 303B does not include rendered group-based communication channels/user interface components for accessing group-based communication channels considered unimportant. The side panel 401 includes only user interface components associated with a single group-based communication channel in channels list 303A (which may be a public or private channel) and a single group-based communication multi-user direct channel in direct channels list 303B (e.g., the currently accessed group-based communication channel and a particular group-based multi-user direct channel determined important). A corresponding group-based communication system may have generated focus values for the group-based communication channel, direct communications, or group, which do not satisfy a corresponding focus threshold. Alternatively, a corresponding group-based communication system may have generated focus values for the group-based communications within the group-based communication channel, direct communications, or group, and determined that all group-based communications do not satisfy their corresponding focus threshold. In other embodiments, the group-based communication interface 400 may render user interface components for accessing group-based communication channels, direct communications, and groups that are determined unimportant, but render them in a manner that indicates them as inaccessible or otherwise unimportant. For example, unimportant group-based communication channels may be rendered greyed-out or with a pre-determined transparency. In the illustrated embodiment, the content panel 450 is rendered including the same group-based communications 306A-306F.

A group-based communication system may determine that a particular group-based communication channel is unimportant based on various parameters, such as the group-based communications within the channel, the users associated with the channel, permissions associated with the channel, and the like. For example, the group-based communication system may determine that group-based communication channel "#goTeamChat" is associated with social communications rather than work communications, and thus generate a low focus value for this group-based communication channel that does not satisfy an applicable focus threshold. The group-based communication system may determine that the user does not interact with group-based communication channel "#mlTeamChat", and thus generate a focus value for this group-based communication channel that does not satisfy an applicable focus threshold.

Group-based communication interface 400 includes only a single focused communication notification 403A associated with a single group-based communication multi-user channel (as compared to group-based communication interface 300). A corresponding group-based communication system may determine that group-based communications in the group-based communication multi-user direct channel between Jess, Ian, and Brian are of high importance, and thus generate focus values for these group-based communications that satisfy a corresponding focus threshold. The group-based communication system may generate the focused communication notification 404A after determining that three group-based communications in the multi-user direct channel between Jess, Ian, and Brian are of high importance and un-accessed, and thus cause rendering of the focused communication notification 404A in the group-based communication interface 400.

By reducing the information rendered (e.g., to only include focused communication notifications and user interface components associated with important group-based communications/group-based communication channels or groups), the user may not be distracted by unimportant group-based communications. The accessibility of the slider interface component 302 further enables the user to easily alter their focus level as the user's day progresses. For example, such embodiments enable the user to lower their focus level and allow communications of varying importance to be rendered during breaks or other times where focus is not necessary, and quickly adjust their focus level higher to limit unimportant information during work periods. Embodiments reduce user distraction, improves user experience, and conserves processing power by limiting the generation of focused communication notification information.

In a particular embodiment, the user may set the slider interface component 302 to a low position representing a low focus level. The group-based communication system may then cause rendering of the group-based communication interface 300, including user interface components associated with a plurality of group-based communication channels, direct communications, and groups, and a plurality of focused communication notifications associated with low-importance group-based communications (as illustrated in FIG. 3). A user may then set the slider interface component 302 to a high position representing a high focus level. The group-based communication system may then cause rendering of the group-based communication interface 400, including only a single focused communication notification associated with high-importance group-based communications (as illustrated in FIG. 4), and dynamically transition from group-based communication interface 300 to group-based communication interface 400.

In some embodiments, one or more of the group-based communications 306A-306F may be determined unimportant and not rendered (not shown) based on the slider interface component 302. For example, group-based communication 306F, if determined unimportant (e.g., associated with a focus value that does not satisfy a corresponding focus threshold) the content panel 450 of the group-based communication interface 400 may be rendered without the group-based communication 306F. In some embodiments, one or more group-based communications (e.g., one or more group-based communications received in a group-based communication set, or a first and second received group-based communication) may be valued and the side panel 401 and/or content panel 450 rendered accordingly.

Figure 5:
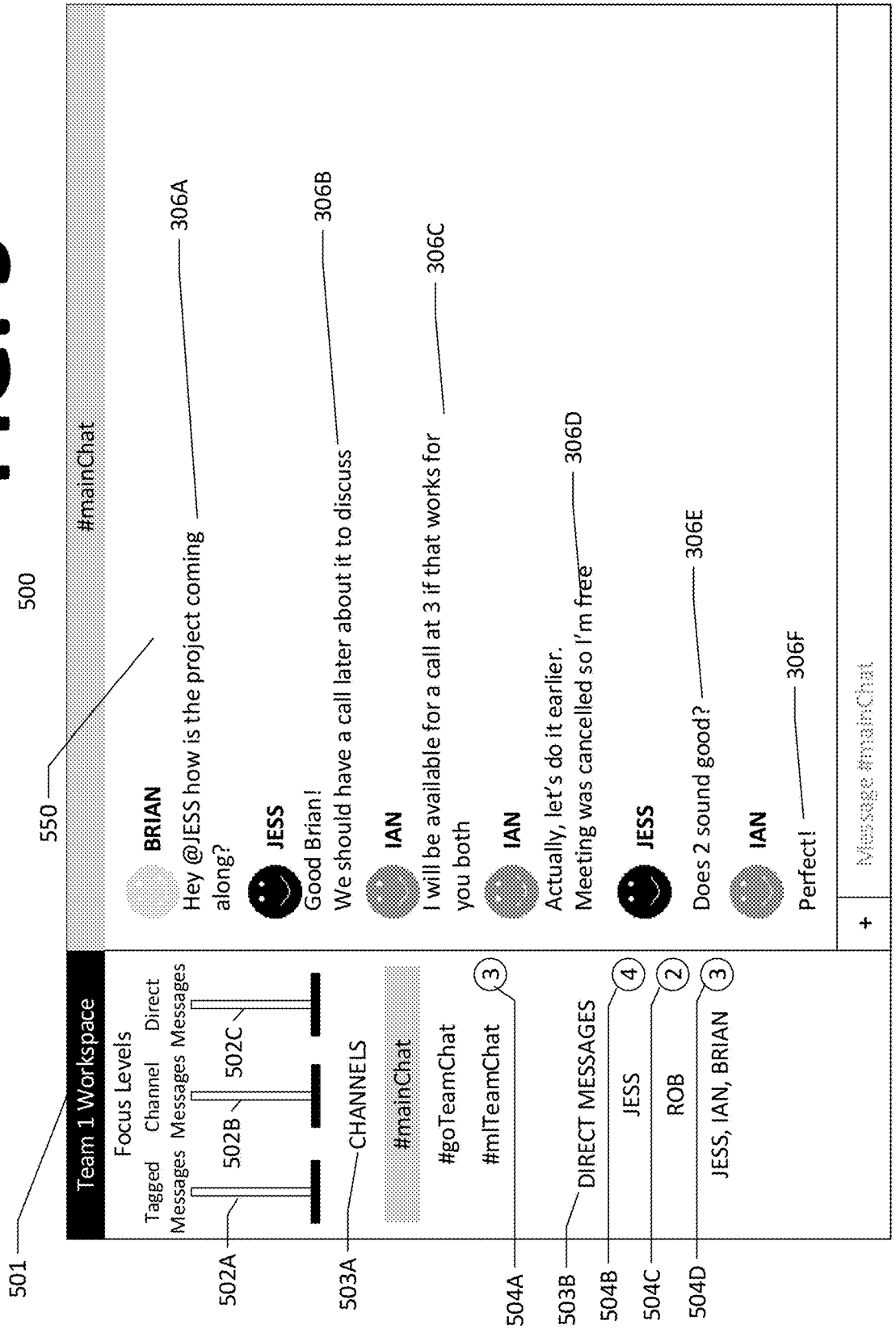

FIG. 5 illustrates another embodiment group-based communication interface 500, in accordance with some embodiments of the present disclosure. The group-based communication interface 500 may be generated and/or configured by a group-based communication system, such as a group-based communication system embodied by apparatus 200, and transmitted to a client device for rendering. The group-based communication interface 500, as illustrated, depicts a specific group-based communication channel (#mainChat), including a plurality of group-based communications 306A-306F associated with the group-based communication channel. It should be appreciated that the other illustrated group-based communication channels similarly may be associated with one or more group-based communications. As illustrated, group-based communication interface 500 also includes a side panel 501 including a plurality of rendered group-based communication channels configured for accessing other group-based communication channels. It should be appreciated that each of the plurality of other group-based communication channels may include group-based communications similarly constructed to the group-based communications 306A-306F, with different group-based communication channel identifiers, or the like, for associating the group-based communications with the other channel. Group-based communication interface 500 further includes content panel 550 that contains the group-based communications within (or associated with) the currently selected group-based communication channel (e.g., "#mainChat"). Specifically, the content panel is configured to render the group-based communications 306A-306F.

In group-based communication interface 500, the focus interface component includes a plurality of slider interface components, specifically slider interface components 502A-502C. The slider interface components 502A-502C may be configured to receive user engagement, such that a corresponding group-based communication system may receive a user focus selection input in response to engagement with one or more of the slider interface components 502A-502C. The user focus selection input may include a slider interface component value set, the slider interface component value set including a slider interface component value associated with each of the slider interface components 502A-502C. It should be appreciated that the focus interface component may be rendered in a myriad of locations in the interface 500, such as anywhere in the side panel 501 or content panel 550.

In some embodiments, each of the slider interface components 502A-502C is associated with a particular subset of group-based communications. For example, as illustrated in FIG. 5, each slider interface component may be associated with a corresponding group-based communication factor, such as a group-based communication type. Slider 502A may be associated with tagged group-based communications (e.g., group-based communications that include in the communication contents a tagged group-based communication system username, an @ or another symbol along with a user identifier, or the like), slider 502B may be associated with other group-based channel communications, and slider 502C may be associated with all other group-based communications (e.g., group-based communications in direct and/or multi-user direct channels). An example group-based communication system may identify one or more focus thresholds based on a user focus selection input including a slider component value set that represents the position of slider interface components 502A-502C. For example one or more factor-based focus thresholds may be determined based on the slider component value of each of the slider interface components 502A-502C. Additionally or alternatively, the user focus selection input may indicate that focus mode was activated (e.g., one or more of the sliders have been moved past an activation position, e.g., moved above a bottom position) or that focus mode was deactivated (e.g., one or more of the sliders has been moved past a deactivation point, e.g., move to a bottom position). In some embodiments, deactivation of a focus mode may be referred to as an "exploratory mode" for the group-based communication system. The group-based communication system may be configured to determine that a focus mode has been activated/deactivated based on the user focus selection input, for example by determining one or more multi-value interface component values does or does not satisfy an activation point.

The group-based communication system may be configured to identify one or more focus thresholds based on the user focus selection input received. For example, in an example embodiment, the group-based communication system receives a focus selection input including a slider component value set, which includes a slider component value for each slider interface component, for example of the slider interface components 502A-502C in the illustrated example. In some embodiments, the slider component value for each slider interface component is between 0.0 and 1.0, which indicates the position of the slider in the associated slider interface component. The user focus selection input may also include a factor value for a particular group-based communication factor, such as group-based communication type, associated with each slider component value. The factor value associated with a given slider interface component value is used to identify a focus threshold, such as a factor-based focus threshold, associated with group-based communications similarly associated with that factor value. For example, as illustrated, the slider interface components 502A-502C are associated with various factor values for the group-based communication factor of group-based communication type. The slider component value of slider interface component 502A may be associated with group-based tagged communications and may be used to identify a focus threshold that group-based tagged communications must satisfy, the slider component value of slider interface component 502B associated with group-based channel communications and may be used to identify a focus threshold that group-based channel communications (e.g., other than group-based tagged communications) must satisfy, and the slider component value of slider interface component 502C associated with other group-based communications (e.g., group and direct communications) and may be used to identify a focus threshold that other group-based communications must satisfy. A user focus selection input may include each of these slider component values in a key-value pair associated with the corresponding factor value.

The group-based communication system may be configured to identify, retrieve, or otherwise determine one or more focus thresholds based on the received slider component values and/or factor values. For example, in one example embodiment, a group-based communication system may be configured to identify a factor-based focus threshold for each group-based communication based on the factor value for group-based communication type associated with the group-based communication. For example, a group-based communication system may receive a group-based communication and identify the factor value for a specific group-based communication factor (e.g., whether the group-based communication is a group-based channel communication, a group-based direct communication, a group-based tagged communication, or the like). The group-based communication system may then extract information from the user focus selection input based on the identified group-based communication factor value, and identify a factor-based focus threshold based on the extracted information. For example, the group-based communication system may extract a multi-value interface component value from the user focus selection input that corresponds to the determined group-based communication factor value, and utilize the extracted multi-value interface component value to identify an appropriate factor-based focus threshold for the group-based communication.

It should be appreciated that illustrations and descriptions of group-based communication type as a group-based communication factor is a non-limiting example of one group-based communication factor for which a plurality of multi-value interface components may be rendered. In other embodiments, the plurality of multi-value interface components may be associated with a different group-based communication factor. For example, in another embodiment, the plurality of multi-value interface components may be associated with a group-based communication factor of group-based communication channel identifier, where each multi-value interface component is associated with a particular group-based communication channel identifier (e.g., a multi-value interface component for group-based communications having a group-based channel identifier factor value representing #mainChat, a second multi-value interface component for group-based communications having a group-based channel identifier factor value representing #goTeamChat, and a third multi-value interface component for group-based communications having a group-based channel identifier factor value representing #mlTeamChat). In another embodiment, the plurality of multi-value interface components may be associated with a group-based communication factor of group-based communication sender, where each multi-value interface component is associated with a particular group-based user for a particular group-based interface or organization (such that group-based communications may be compared with a factor-based focus threshold based on the group-based communication sender factor value for the group-based communication). In another embodiment, the plurality of multi-value interface components may be associated with a group-based communication factor of group-based communication sender role, where each multi-value interface component is associated with a particular group-based communication sender role (e.g., a multi-value interface component for group-based communications having a group-based communication sender role of Engineer, a second multi-value interface component for group-based communications having a group-based communications having a group-based communication sender role of Executive, and so forth). It should be appreciated that the various multi-value interface components may be rendered associated with any group-based communication factor associated for group-based communications.

In some embodiments, each focus threshold may be associated with a threshold minimum and a threshold maximum, which indicates the lowest and highest value that may be associated with the focus threshold (e.g., 0.0 and 10.0 in an example embodiment). In an example embodiment, a focus threshold is identified such that the slider component value and corresponding identified focus threshold are lower (e.g., closer to 0.0 and 0.0, respectively) when the slider for the slider interface component is set to a low position (e.g., slider is near the bottom of the component), and the slider component value and corresponding identified focus threshold are higher (e.g., closer to 1.0 and 10.0, respectively) when the slider interface component is set to a higher position (e.g., slider is near the top of the component).

In some embodiments, each of the slider interface components 502A-502C is configured to receive user engagement for adjusting the slider position within the respective component. For example, each of the slider interface components may be set by a user touch, a user mouse click, speech input, or the like. Additionally or alternatively, in some embodiments, one or more of the slider interface components 502A-502C may be set automatically, such as by a determination performed by a corresponding group-based communication system. In an example embodiment, the group-based communication system may set a default slider position for each of the slider interface components 502A-502C, such as a default slider position for each component based on a determined focus level for the user, as described above with respect to FIG. 3.

The group-based communication interface 500 includes a plurality of focused communication notifications 504A-504D. Each of the focused communication notifications 504A-504D indicates the user has received an important group-based communication in another group-based communication channel (e.g., group-based communication public/private channels in channels list 503A and direct channels in list 503B). As illustrated, each of the plurality of focused communication notifications 504A-504D may be associated with a corresponding group-based communication channel. For example, communication notification 504A, as illustrated, is associated with the group-based communication channel #mlTeamChat in channels list 503A. Communication notification 304A indicates to the user the number of group-based communications determined important that were received in the corresponding group-based communication channel. In the illustrated example, group-based communications may be likely to satisfy a corresponding factor-based focus threshold set based on the slider interface components 502A-502C, because the slider interface components are set to a very low position. In some embodiments, the slider interface components 502A-502C may be set at a position that does not satisfy a focus mode activation position (e.g., below a focus mode activation position), and thus the group-based communication interface 500 may include notification information associated with all received and un-accessed group-based communications, or may include notification information based on a corresponding user notification preference information.

Figure 6:
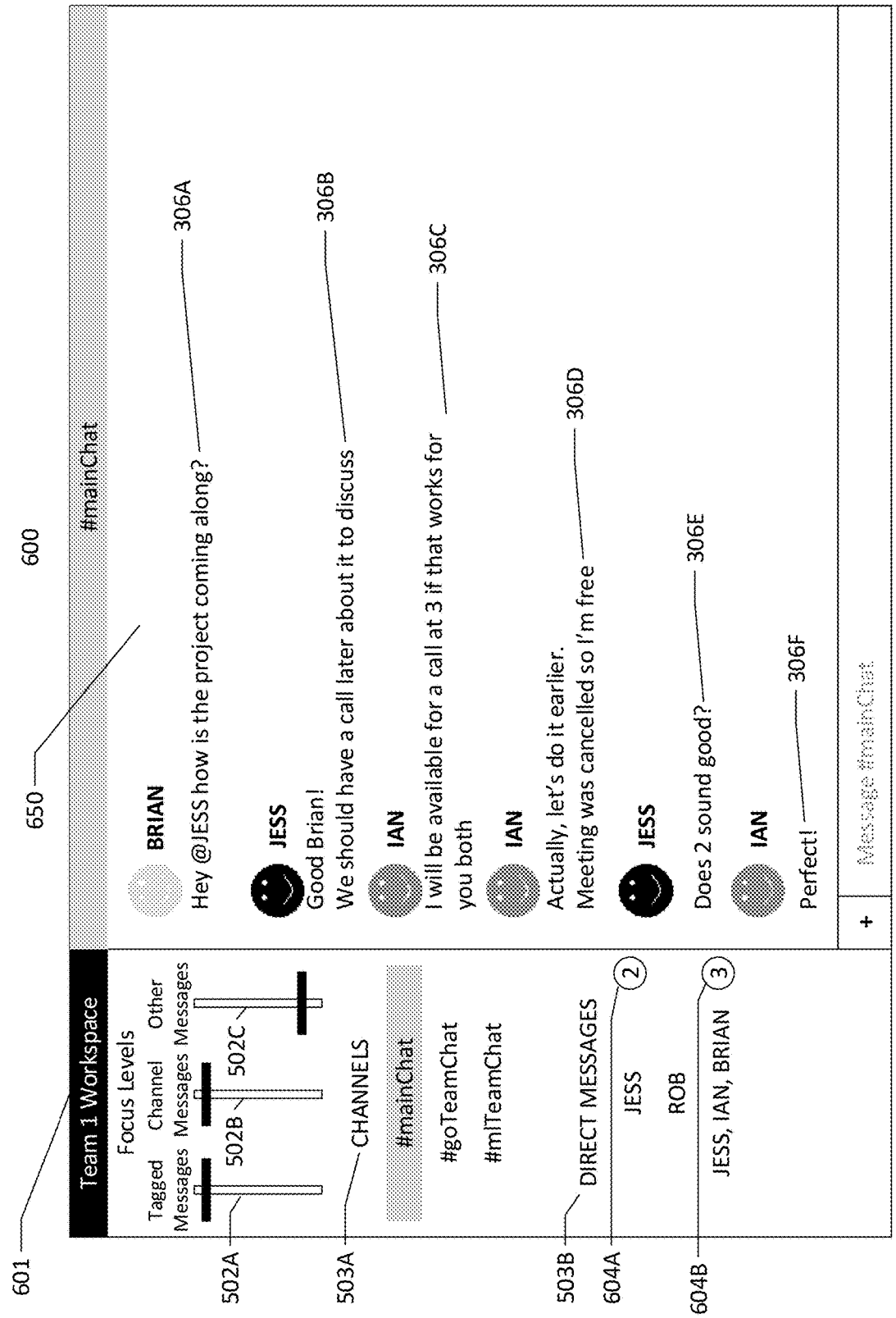

In an embodiment of the present disclosure, a group-based communication system may cause rendering of group-based communication interface 600 as illustrated in FIG. 6 after receiving a user focus selection input, for example in response to user engagement with one or more of the slider interface components 502A-502C.

As illustrated in FIG. 6, the slider interface components 502A-502C are set to a higher position, with slider interface components 502A and 502B set towards the top of their corresponding slider interface component. The slider interface components 502A-502C may be set in response to user engagement with each of the slider interface components 502A-502C, or in response to a determination by a corresponding group-based communication system. A corresponding group-based communication system may receive a user focus selection input including the slider component values for each of the slider interface components 502A-502C and a corresponding group-based communication type. The group-based communication system may identify one or more focus thresholds, such as a factor-based threshold for each of the three group-based communication types associated with slider interface components 502A-502C, based on the received user focus selection input. As illustrated, the group-based communication system may identify a high focus threshold for group-based communications associated having a factor value of tagged communications or channel communications for the factor of group-based communication type (as indicated by the high slider position of slider interface components 502A and 502B), and a low focus threshold for group-based communications having a factor value of direct communication for the factor of group-based communication type (as indicated by the low slider position of slider interface component 502C). The group-based communication system may then generate corresponding focused communication notification information associated with group-based communications with corresponding focus values that satisfy a corresponding focus threshold.

The group-based communication interface 600 illustrated in FIG. 6, for example, includes a focused side panel 601 that includes focused communication notifications 604A and 604B. The corresponding group-based communication system may determine that no group-based channel communications or tagged communications have been received associated with any group-based communication channel that are important, or in other words the group-based communication channels, and/or group-based communications within the channels, are associated with a focus value that does not satisfy a corresponding focus threshold. The group-based communications transmitted in each channel include group-based channel communications and/or tagged communications, and thus are associated with high focus thresholds indicated by the high position of the sliders in slider interface components 502A and 502B. Accordingly, no group-based communications or channels may have satisfied their corresponding focus threshold, and no focused communication notifications are rendered associated with the group-based communication channels.

In some embodiments, one or more of the group-based communications 306A-306F may be determined unimportant based on the slider interface components 502A-502C, and not rendered (not shown). For example, group-based communication 306F, if determined unimportant (e.g., associated with a focus value that does not satisfy a corresponding focus threshold) the content panel 650 of the group-based communication interface 600 may be rendered without the group-based communication 306F. In some embodiments, one or more group-based communications (e.g., one or more group-based communications received in a group-based communication set, or a first and second received group-based communication) may be valued and the side panel 601 and/or content panel 650 rendered accordingly.

In some embodiments, one or more of the group-based communication channels in channels list 503A and direct channels in list 503B may be determined unimportant based on the slider interface components 502A-502C, and not rendered to the side panel 601 (not shown). For example, if the group-based communication channel "#goTeamChat" is determined unimportant (e.g., associated with a focus value that does not satisfy a corresponding focus threshold), then the side panel 601 of the group-based communication interface 600 may be rendered without the group-based communication channel. In some embodiments, one or more group-based communication channels (e.g., one or more group-based communication channels received in a group-based communication channel set, or a first and second received group-based communication channel) may be valued and the side panel 601 and/or content panel 650 rendered accordingly.

Focused communication notifications 604A and 604B are instead associated with the other communications such as group and direct communications, specifically group-based communications transmitted from group-based communication system user Jess, and group-based communications transmitted to a group including group-based communication system users Jess, Rob, Ian, and Brian. The group-based communications corresponding to the focused communication notifications 604A and 604B are associated with a factor value for group-based communication type that is associated with the slider component 502C. The required importance to satisfy a corresponding factor-based focus threshold (e.g., a focus threshold associated with group-based communications having a factor value associated with group-based communication type other than tagged or channel communication) is low, as indicated by the position of the slider interface component 502C. The group-based communication system may determine that only group-based group and direct communications satisfy their corresponding focus thresholds, which are low, and cause rendering of focused communication notification information associated only with such group-based communications. Notification information may be rendered in many forms, for example focused notification information in the form of badge notifications 604A and 604B. It should be appreciated that notification information of an existing notification may be altered to reflect only important group-based communications. For example, in FIG. 5, the notification badge 504B (associated with group-based direct communications from user Jess) indicates four important group-based communications, while in FIG. 6 the corresponding notification badge 604A indicates two important group-based communications (e.g., two other group-based communications were determined unimportant). In other embodiments, group-based communication channel, multi-user communication, or direct communication, determined unimportant or having no important group-based communications may be made inaccessible and/or hidden or otherwise visually affected to indicate they are unimportant (e.g., greyed out).

In a particular embodiment, a group-based communication system may, by default, position the slider interface components 502A-502C to a low position representing a low focus level and setting one or more focus thresholds that require lower focus values to satisfy. The group-based communication system may cause rendering of the group-based communication interface 500 including a plurality of focused communication notifications associated with low-importance group-based communications (as illustrated in FIG. 5). A user may then engage with one or more of the slider interface components 502A-502C to adjust them to a high position representing a high focus level, and the group-based communication system may then cause rendering of the group-based communication interface 600, including different focused communication notifications associated with important group-based communications determined based on the user focus selection input transmitted in response to the engagement with the plurality of slider interface components (as illustrated in FIG. 6), and dynamically transition from group-based communication interface 500 to group-based communication interface 600.

By reducing the rendered notifications to only include focused communication notifications, rather than notifications for each group-based communication or for group-based communications deemed unimportant, such embodiments enable the user to focus on important communications when they desire to by using a focus interface component. In some embodiments, a slider interface component may be provided for each factor value of communication type, group-based communication type, or the like. Such embodiments enable the user to customize their notification experience, and allows them to effectively transition to focus on information that the user indicates is important based on communication type. It should be appreciated that, in other embodiments, different communication types may be used, and thus embodiments may include an alternative number of slider interface components. It should also be appreciated that, in some embodiments, slider interface components may be associated with criterion other than communication type. For example, a slider interface component may be provided for each group-based communication channel/group, each group-based communication sender/group-based user. each group-based communication team/workspace, or the like. A plurality of slider interface components may be provided to a user for enabling specific customization of a user's focus preferences.

In other embodiments, a plurality of slider interface components is rendered associated with one or more group-based communication channels. A group-based communication system may receive a user focus selection input including a slider interface component value set for the plurality of slider interface components, each of the slider interface component values associated with one or more group-based communication channel of a corresponding group-based communication interface. In a particular example, a slider interface component may is rendered associated with each group-based communication channel, such that the slider interface component. In response to engagement with one or more of the plurality of slider interface components, a group-based communication system may receive a user focus selection input that includes a plurality of slider component values, each slider component value associated with its corresponding group-based communication channel. The group-based communication system may receive, retrieve, or otherwise identify a group-based communication channel, and generate a focus value for the received group-based communication channel. The group-based communication system may identify a focus threshold for the group-based communication channel based on the slider component value associated with the group-based communication channel. The group-based communication system may determine whether the focus value for the group-based communication channel satisfies the corresponding focus threshold, and cause rendering based on the determination.

For example, a group-based communication system may render a group-based communication interface including a slider interface component associated with each of the group-based communication channels having corresponding interface components in channels list 503A and each of the group-based communication multi-user direct channels/single-user direct channels having corresponding interface components in direct channels list 303B. A user may adjust the position of the slider in each of the plurality of slider interface components. In response, the group-based communication system receives a user focus selection input including a slider component value associated with each of the plurality of slider interface components. The group-based communication system may then receive, retrieve, or otherwise identify a group-based communication channel. For example, the group-based communication system may receive a first group-based communication channel (e.g., #mainChat in FIG. 5) as the group-based communication system iterates through each group-based communication channel to determine appropriate rendering (as described herein). The group-based communication system generates a focus value associated with the group-based communication channel (as described further herein). The group-based communication system may identify a focus threshold for the group-based communication channel. For example, the group-based communication system may identify a focus threshold for the group-based communication channel based on the slider component value associated with the received group-based communication channel in the user focus selection input.

The group-based communication system may then determine whether the focus value for the group-based communication channel satisfies the corresponding identified focus threshold, and cause rendering of a group-based communication interface based on the determination. For example, if the group-based communication system determines the focus value satisfies the focus threshold (such as by exceeding the focus threshold), the group-based communication system may cause rendering of a group-based communication interface including the group-based communication channel via a rendered interface component (e.g., an interface component for accessing the group-based communication channel may be rendered in the public/private channels list 503A or direct channels list 503B). If the group-based communication system determines the focus value does not satisfy the focus threshold, the group-based communication system may cause rendering of the group-based communication interface not including the group-based communication channel. In such a circumstance, an interface component for accessing the group-based communication channel is not rendered, and accordingly the group-based communication channel may remain inaccessible to a user until focus mode is deactivated, or a removal/updated user focus selection input is later received such that the group-based communication system determines the group-based communication channel satisfies a newly identified focus threshold based on the removal/updated user focus selection input.

In some embodiments, for a group-based communication channel, a group-based communication system causes rendering of the group-based communication channel using an interface visual effect that indicates the group-based communication channel was determined unimportant (e.g., did not satisfy a corresponding focus threshold). For example, in some embodiments, each group-based communication channels is rendered with a predefined transparency to indicate to the user that the channel was determined unimportant. Alternatively, unimportant group-based communication channels may be rendered greyed-out, blocked-out, or otherwise differentiated from important group-based communication channels.

FIG. 7A illustrates an example group-based communication interface 700A including a focus button component 702, in accordance with some embodiments of the present disclosure. The group-based communication interface 700A may be generated and/or configured by a group-based communication system, such as a group-based communication system embodied by apparatus 200, and transmitted to a client device for rendering. The group-based communication interface 700A, as illustrated, depicts a specific group-based communication system channel (#mainChat in channels list 703A), including a plurality of group-based communications 306A-306F associated with the group-based communication channel. It should be appreciated that group-based communications (not depicted) may be associated with the other illustrated group-based communication channels. As illustrated, the group-based communication interface 700A also includes a side panel 701A including a plurality of rendered group-based communication channels including user interface components configured for accessing other group-based communication channels (e.g., remaining channels in public/private channels list 703A and direct channels list 703B).

In group-based communication interface 700A, the focus interface component includes a focus button component 702. The focus button component 702 may be configured to receive engagement, such that a corresponding group-based communication system receives a user focus selection input in response to engagement with the focus button component. The user focus selection input may represent, for example, that a focus mode has been toggled, activated, deactivated, or the like.

In some embodiments, the focus button component is configured to transmit a user focus selection input to the group-based communication system, where the user focus selection input represents whether focus mode has been activated/deactivated. The group-based communication system may identify one or more focus thresholds based on the user focus selection input. For example, when the user focus selection input indicates that focus mode has been activated, the group-based communication system may utilize one or more focus thresholding models identify one or more focus thresholds corresponding to a focus mode. The focus thresholding model(s) may be based on one or more selected from a group comprising a time, a day of week, a date, a focus event set, or the like. The focus thresholding model(s) may represent a determination of the focus level for the group-based user at a given time, and additionally or alternatively may be based on prior interaction data for the user. For example, a focus thresholding model may determine, utilizing prior interaction data, that a user is usually focused and/or busy at the current time, and thus set one or more high focus thresholds (e.g., only highly important communications satisfy the threshold).

In some embodiments, for example, when the user focus selection input indicates that focus mode has been deactivated, the group-based communication system may utilize one or more focus thresholding models identify one or more focus thresholds corresponding to another mode, such as an exploratory mode. The group-based communication system may store a default focus threshold set associated with a given group-based user, such that one or more focus thresholds may be set based on the default focus threshold set upon deactivation of a focus mode. In some embodiments, a default focus threshold set is based on a user preference set.

The group-based communication interface 700A includes side panel 701A, including a plurality of group-based communication channels associated with a plurality of focused communication notifications 704A-704D. Each of the focused communication notifications 704A-704D indicates the user has received an important group-based communication in another group-based communication channel. As illustrated, each of the focused communication notifications 704A-704D indicates the user has received at least one important group-based communication in another group-based communication channel. As illustrated, each of the plurality of focused communication notifications 704A-704D may be associated with a corresponding group-based communication channel. For example, focused communication notification 704A, as illustrated, is associated with the group-based communication channel #mlTeamChat. Focused communication notification 704A indicates to the user the number of group-based communications determined important that were received in the corresponding group-based communication channel.

Figure 7B:
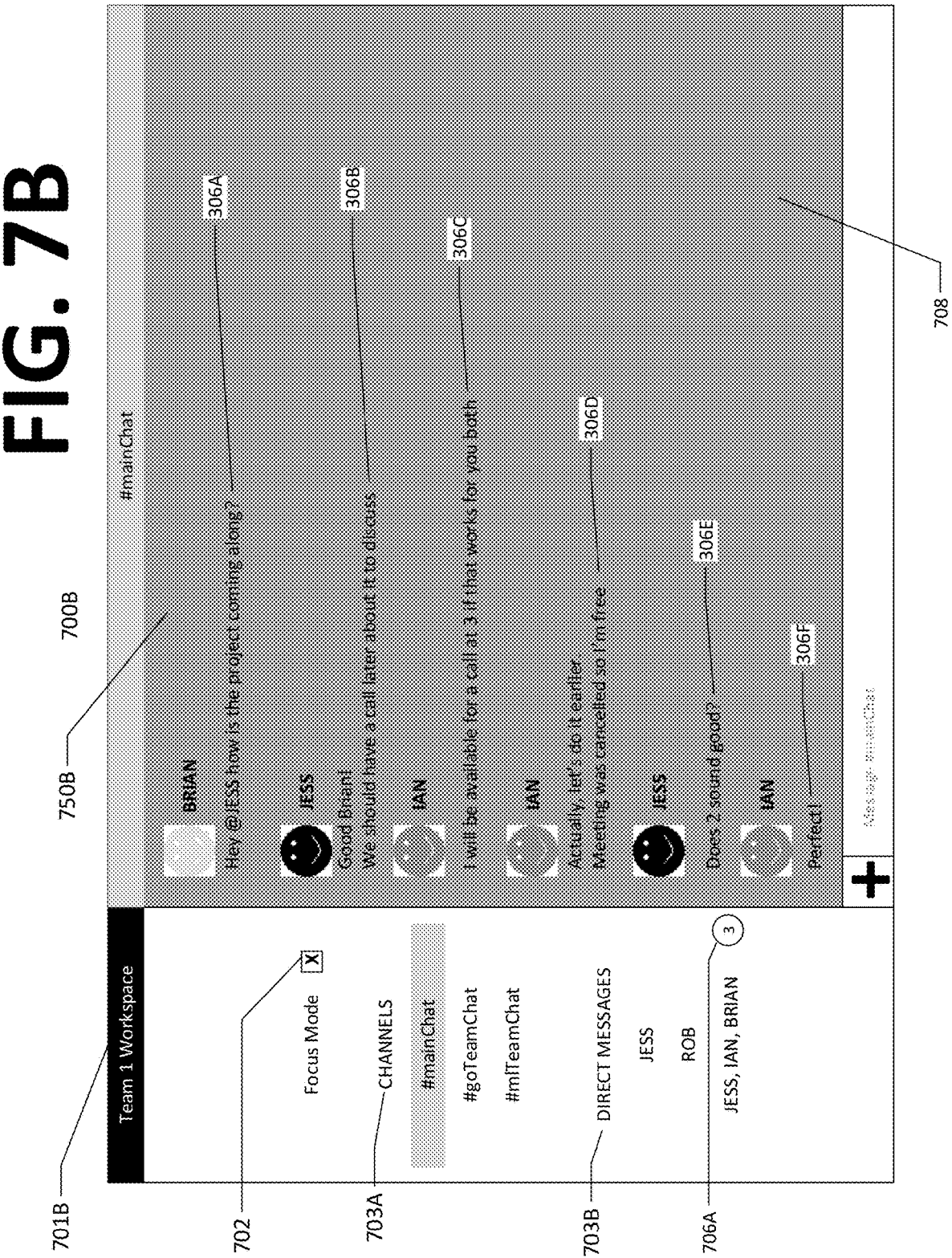

In an embodiment of the present disclosure, a group-based communication system may cause rendering of the group-based communication interface 700B as illustrated in FIG. 7B after receiving a user focus selection input, for example in response to user engagement with the focus button component 702. In some embodiments, the group-based communication system causes rendering of group-based communications based on the user focus selection input. In other embodiments, the group-based communication system causes rendering of interface components associated with group-based communication channels, multi-user communication channels, and/or direct communication channels based on the user focus selection input (not shown).

In some embodiments, one or more of the group-based communications 306A-306F may be determined unimportant based on the mode, and corresponding user focus selection input, associated with the focus button component 702, and thus the group-based communication may not be rendered (not shown). For example, if the group-based communication 306F is determined unimportant (e.g., associated with a focus value that does not satisfy a corresponding focus threshold) the content panel 750B of the group-based communication interface 700 may be rendered without the group-based communication 306F. In some embodiments, one or more group-based communications (e.g., one or more group-based communications received in a group-based communication set, or a first and second received group-based communication) may be valued and the side panel 701 and/or content panel 750 rendered accordingly.

In some embodiments, one or more of the group-based communication channels in channels list 703A and direct channels in list 703B may be determined unimportant based on the mode, and corresponding user focus selection input, associated with the focus button component 702, and thus the group-based communication may not be rendered (not shown). For example, if the group-based communication channel "#goTeamChat" is determined unimportant (e.g., associated with a focus value that does not satisfy a corresponding focus threshold), then the side panel 701B of the group-based communication interface 700B may be rendered without the group-based communication channel. In some embodiments, one or more group-based communication channels (e.g., one or more group-based communication channels received in a group-based communication channel set, or a first and second received group-based communication channel) may be valued and the side panel 701B and/or content panel 750B rendered accordingly.

As illustrated in FIG. 7B, the focus button component 702 indicates to the user that focus mode is active. A corresponding group-based communication system may receive a user focus selection input in response to engagement with the focus button component 702 that indicates or represents activation of focus mode. The group-based communication system may identify one or more focus thresholds, for example using one or more focus thresholding models based on various factors, such as time of day, date, prior interaction data, and the like. The group-based communication system may, for each group-based communication, generate a focus value. The group-based communication system may also generate focused communication notification information associated with the group-based communications with focus values that satisfy the identified focus threshold(s). The group-based communication system may then cause rendering of the focused communication notifications, for example as part of the group-based communication interface.

The group-based communication interface 700B illustrated in FIG. 7B, for example, may represent a focused version of the group-based communication interface 700A. The group-based communication interface 700B includes side panel 701B that includes a focused communication notification 706A associated with a single important group. A corresponding group-based communication system may have determined that all other group-based communications transmitted (such as those in the group-based communication channel #mlTeamChat, direct communications from Jess, and direct communications from Rob) did not satisfy applicable focus thresholds. The group including Jess, Rob, Ian, and Brian includes several group-based communications deemed important, and thus focused communication notification 706A indicates these communications have been received and is rendered to notify the user.

To indicate to the user that focus mode is activated, group-based communication interface 700B is affected by a focus mode interface effect, specifically focus mode interface effect 708. In some embodiments, a group-based communication interface may be affected by a focus mode interface effect that visually alters some or all of the group-based communication interface. The focus mode interface effect may indicate to the user when a focus mode is active. In the illustrated group-based communication interface 700B, the focus interface effect is represented by a background change effect that alters the background of a portion of the group-based communication interface. In other embodiments, a focus mode interface effect may alter the background color, visual, image, or the like, of a portion or entirety of a group-based communication interface. Alternatively or additionally, in some embodiments, a focus mode interface effect includes a rendered focus mode indication label indicating to the user that focus mode is active. In other embodiments, a focus mode interface effect includes a focus mode interface effect applied to one or more of the rendered group-based communications, for example group-based communications 306A-306F, that alters the size, font, or look of the affected group-based communication based on whether the group-based communication is important. For example, in some embodiments, unimportant group-based communications may be rendered as unreadable (e.g., greyed or blocked out), or may be rendered with transparent text. In other embodiments, important group-based communications may be rendered as visually unique to draw the user's attention (e.g., with larger font, with a glow/other visual effect, and/or the like, or a combination thereof). Such embodiments enable the user to readily detect they are in focus mode and deactivate focus mode when desired.

It should be appreciated that a focus mode interface effect may be applied in other group-based communication interfaces as well, including those with other focus interface components. In some embodiments, a focus mode interface effect may be determined based on one or more slider component values. For example, a focus mode interface effect may be applied to a group-based communication interface when a particular slider interface component is set above a focus mode activation position, and not applied when below the focus mode activation position. Alternatively or additionally, in some embodiments, a focus mode interface effect may differ based on one or more corresponding slider component values (e.g., background color may change based on the slider position(s) of one or more slider interface components).

The focus button component allows a user to reduce the rendered notifications to only include focused communication notifications, rather than notifications for each group-based communication or for group-based communications deemed unimportant. Thus, embodiments enable the user to focus on important communications when they desire to do so, and enables users to easily change between focused and unfocused/exploratory modes.

In other embodiments, alternative focus interface components may be presented as part of a group-based communication interface. For example, in another embodiment, a focus interface component includes a drop-down component including one or more focus levels. The drop-down component may include human-readable descriptions of focus levels (e.g., "focused" and "exploratory", or "low focus"/"medium focus"/"high focus", or the like). The drop-down component, alternatively or additionally, may include numerical representations of focus levels (e.g., 1 through 10, where 1 represents exploratory/unfocused mode, and 10 represents focused/working mode). The illustrated and described focus interface components are examples, and are not to limit the spirit or scope of the disclosure.

Other embodiments include user communication interfaces configured in a similar manner to the group-based communication interfaces in FIGS. 3-7B. For example, a user communication interface may include a focus interface component for limiting user communications rendered to the user communication interface. In some embodiments, notification information is rendered only for user communications determined to be important. User communication systems may generate focus values and/or identify focus thresholds for user communications based on user communication factors similar to those described above.

Example Operations for Managing Group-Based Communications

FIGS. 8A/B-15 illustrate example operations for managing one or more group-based communications and causing rendering of the one or more group-based communications and/or corresponding notification information to a group-based communication interface, in accordance with example embodiments of the present disclosure. It should be appreciated that the illustrated operations may be performed in various orders, and in some embodiments may include alternative or additional operations from those illustrated. The operations illustrated with respect to FIGS. 8A/B-15 are illustrated by way of example, and the scope and spirit of the disclosure is not limited to the specific processes depicted. In some embodiments, some or all of the operations illustrated in FIGS. 8A/B-15 may be performed by a group-based communication system for performing a computer-implemented process. For example, an embodiment group-based communication system may be embodied by apparatus 200, and include means for performing the operations described below with respect to the FIGS. 8A/B-15.

It should also be appreciated that, in some embodiments, the operations described herein are similarly performed by a user communication system not configured with group-based functionality. For example, a user communication system may generate a focus value for a user communication, identify a focus threshold for a user communication, and cause rendering of a user communication interface based on a determination of whether the focus value satisfies the focus threshold, in a manner similar to that described below with respect to FIGS. 8A/B-15. The scope and spirit of the disclosure is not limited to group-based communication systems.

In some embodiments, one or more of the steps illustrated and described below with respect to any of the FIGS. 8A/B-15 may be optional. In the illustrated embodiments, dashed lines may indicate optional blocks representing optional operations. It should be appreciated that, in some embodiments, the optional blocks are performed. In other embodiments, the optional blocks are not performed, unless otherwise indicated as such.

FIG. 8A illustrates an example process for managing a group-based communication and causing rendering to a group-based communication interface, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 802A, the apparatus 200 includes means, such as processor 202, communications module 208, focus management module 212, and/or the like, configured to receive a user focus selection input associated with the group-based communication interface. The apparatus 200 may receive the user focus selection input in response to user engagement with a focus interface component rendered to the group-based communication interface. The user focus selection input may represent a desired focus level for the user, such as a focus level specifically set by the user or determined by the group-based communication system, the client device, or a third-party system.

In some embodiments, the user focus selection input includes a slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input.

In other embodiments, the user focus selection input includes a slider component value set, for example corresponding to a plurality of slider interface components. Additionally or alternatively, in some embodiments, the user focus selection input includes a group-based communication channel associated with each received slider component value. For example, a user focus selection input may include a slider component value set including one or more slider component values and the group-based communication channel associated with each of the slider component values. The user focus selection input may include a group identifier and/or channel identifier for each group-based communication channel, and a corresponding multi-value interface component value associated with the factor value in a key-value pair.

In some embodiments, a slider interface component is presented for each group-based communication type, such that a user may transmit a user focus selection input for use in identifying and/or setting a focus threshold for each group-based communication channel. The group-based communication system may receive a user focus selection input including a slider component value set where each slider component value in the slider component value set is associated with a particular group-based communication channel. In other embodiments, the slider interface components are associated with each of these group-based communication channel types generally (e.g., a first slider for group-based communication public channels, a second slider for group-based communication private channels, a third slider for group-based communication single-user direct channels, and a fourth slider for the group-based communication multi-user direct channels).

In some embodiments, a slider interface component is rendered for adjusting a set focus threshold for a set of group-based communications grouped based on certain sets of group-based communication channels. In some embodiments, a set focus threshold is associated with each group-based communication channel, such that each group-based communication channel must satisfy the same set focus threshold (for example, regardless of group-based communication channel type). In other embodiments, group-based communication channels are combined into sets by the user or by the group-based communication system. For example a first slider interface component may be associated with adjusting a set focus threshold associated with a user-created set of group-based direct communication channels that the user or group-based communication system identified as work-related, while a second slider interface component may be associated with adjusting a set focus threshold associated with a second user-created set of group-based direct communication channels that the user or group-based communication system identified as social/personal.

In some embodiments, the user focus selection input includes a focus mode activation/deactivation indication, which represents that the user has activated/deactivated focus mode. The group-based communication system may identify, retrieve, or otherwise determine one or more corresponding focus threshold(s) in response to activation/deactivation. For example, in an example embodiment, a group-based communication system uses a focus thresholding model to identify a focus threshold, where the focus thresholding model comprises a machine learning or algorithmic model for identifying one or more focus thresholds based on a group-based communication user's interaction with the group-based communication system.

At block 804A, the apparatus 200 includes means such as communications module 208, processor 202, group-based management module 210, and/or the like, to identify a group-based communication channel associated with the group-based communication interface. The group-based communication interface may be associated with various group-based communication channels, which the group-based communication system may identify and/or receive in a group-based communication channel set. The group-based communication system may identify and/or receive a group-based communication channel from the group-based communication channel set one at a time, for example to generate a focus value for the group-based communication channel as described below. A group-based communication channel includes, or is otherwise associated with, one or more identifiers for uniquely identifying the channel within the associated group-based communication interface having a corresponding group identifier.

In some embodiments, at block 804A, the apparatus 200 receives a set of group-based communication channels including all group-based communication channels for a particular group-based communication interface. In some embodiments, the group-based communication system performs the operations disclosed herein for some or all of the group-based communication system channels received in the set of group-based communication channels. For example, an example group-based communication system may generate a set of focused group-based communication channels including only group-based communication channels that the group-based communication system determines important, and cause rendering of the group-based communication interface based on the set of focused group-based communication channels.

At block 806A, the apparatus 200 includes means such as focus management module 212, processor 202, and/or the like, to generate a focus value for the group-based communication channel. In some embodiments, the apparatus is configured to generate the focus value using a focus value generation model, such as a machine learning model. The apparatus 200 may generate the focus value based on information included in, or otherwise associated with, the group-based communication channel. For example, the focus value may be based on the various group-based communications within the group-based communication channel. In other embodiments, the focus value may be based on the group-based communication user accounts associated with the group-based communication channel (e.g., users permissioned to access the channel, users permissioned to communication within the channel, group-based roles of the users within the channel, or the like). Additionally or alternatively, the apparatus 200 may generate the focus value based on prior and/or future interaction data, for example information associated with a user's prior interactions with the group-based communication channel (e.g., how often the user interacts with the channel), with other users in the group-based communication channel (e.g., how often the users interact, whether the user often ignores or does not respond to communications from the group-based communication sender, whether the user engages with the group-based communication sender in multiple groups or group-based communication channels, and the like), future interaction data (e.g., whether the group-based communication channel is associated with an upcoming focus event, such as a meeting or presentation), and the like.

Additionally or alternatively, in some embodiments, the focus value is based on at least location data associated with a client device to which the group-based communication interface is to be rendered. For example, in some embodiments, location data associated with the client device may be received at an earlier step (for example, at block 802A along with the user focus selection input or as part of the user focus selection input). Additionally or alternatively, the group-based communication system may store location data with the client device, for example in a database such as the group-based communication repository 106, and retrieve the location data upon receiving the user focus selection input. The location data may include, but is not limited to, GPS data, address data, or the like associated with the client device.

The location data may be utilized to identify group-based communication channels likely to be important to the group-based user account accessing the group-based communication system based on the location data. For example, in some embodiments, the location data may indicate the client device is accessing the group-based communication system from a particular GPS location, address, region, zip code, country, state, or the like. The group-based communication system may retrieve stored location data associated with various other group-based user accounts in the group-based communication interface, for example the group-based communication system may retrieve stored location data from the group-based communication repository 106. Based on the stored location data retrieved by the group-based communication system, the group-based communication system may determine one or more proximate group-based user accounts that are considered proximate to the location data received from the client device accessing the group-based communication system. For example, the retrieved location data may indicate that another group-based user account accessed (or usually accesses) the group-based communication system from a nearby location (e.g., other group-based user accounts associated with stored location data that is within a threshold distance from the location data associated with the client device accessing the group-based communication system). Based on the stored location data, the group-based communication system may generate a higher focus value for group-based communication channels that are associated with the proximate group-based user accounts (e.g., group-based communication channels that one or more proximate group-based user accounts is permissioned to access, group-based communication channels that one or more proximate group-based user accounts actively transmit group-based communications within, and the like).

A focus value generation model may be configured to generate a focus value for the group-based communication channel based on one or more of the above parameters. For example, in some embodiments, a focus value generation model may be trained based on prior interaction data associated with the group-based user account accessing the group-based communication system. The prior interaction data may include logs of the user account's accessing the group-based communication channel, group-based communications within the channel, interactions with other group-based user accounts in the channel, or the like.

At block 808A, the apparatus 200 includes means, such as focus management module 212, processor 202, and/or the like, to identify a focus threshold for the group-based communication channel. In some embodiments, the focus threshold is identified based on at least the user focus selection input. In some embodiments, the user focus selection input includes a single interface component value associated with a corresponding focus interface component. For example, the user focus selection input may include a slider component value associated with a slider position of a slider interface component, a dial component value associated with a dial position of a dial interface component, a drop-down value associated with a drop-down selection of a drop-down interface component, or the like.

In some embodiments, the focus threshold is a set focus threshold. The set focus threshold may be associated with every group-based communication channel, such that the focus value for a given group-based communication channel must satisfy the set focus threshold. In other embodiments, the set focus threshold is associated with a set of group-based communication channels created by the group-based communication system and/or user. For example, a user may create a set of group-based communication channels that are social and a second set of group-based communication channels that are work-related, such as by creating the sets via a particular interface provided by the group-based communication system including all group-based communication channels associated with a particular group-based communication interface. Each created set of group-based communication channels may be associated with a multi-value interface component in a plurality of multi-value interface components, where the plurality of multi-value interface components forms a focus interface component as part of a group-based communication interface rendered via the client device accessing the group-based communication system. The received user focus selection input may include a multi-value interface component value set that includes a plurality of the multi-value interface component values, each multi-value interface component value associated with a set of group-based communication channels and/or a corresponding with a particular set focus threshold.

In other embodiments, the focus threshold is a factor-based focus threshold identified based on a group-based channel factor associated with the group-based communication channel. The user focus selection input may include a multi-value interface component value corresponding to various factor values for a factor (e.g., whether the object is a group-based communication channel, permissions associated with the group-based communication channel, and the like). Each multi-value interface component value corresponds to a corresponding multi-value interface component in a focus interface component rendered to a group-based communication interface. For example, in a particular embodiment, the group-based communication system renders a group-based communication interface including a slider interface component for each group-based communication channel associated with the group-based communication interface. The group-based user may set a slider position within each slider interface component, corresponding to the user's desired focus level for each group-based communication channel. The group-based communication system may receive a user focus selection input including a slider component value associated with each group-based communication channel. The user focus selection interface may be received after a user releases the slider, or at a pre-determined time instance (e.g., every 0.5 seconds). The group-based communication system may identify a focus threshold based on the received slider component value(s).

At block 810A, the apparatus includes means, such as focus management module 212, processor 202, and/or the like, to compare the focus value and the focus threshold to determine if the focus value satisfies the focus threshold. In some embodiments, the focus value satisfies the focus threshold if the focus value exceeds the focus threshold. In other embodiments, the focus value satisfies the focus threshold if the focus value is equal to or exceeds the focus threshold. In other embodiments still, the focus value satisfies the focus threshold if the focus value is below the focus threshold. In other embodiments, the focus value satisfies the focus threshold if the focus value is below or equal to the focus threshold.

At block 812A, the apparatus 200 includes means, such as input/output module 206, communications module 208, processor 202, and/or the like, to cause rendering of the group-based communication interface based on the determination of whether the focus value satisfies the focus threshold. In some embodiments, the apparatus causes a client device to render the group-based communication interface including the received group-based communication channel when the focus value satisfies the focus threshold, and does not render the group-based communication channel, multi-user, or direct communication when the focus value does not satisfy the focus threshold. In some embodiments, the group-based communication system may cause rendering of unimportant group-based communication channels with a focus mode interface effect indicating that such group-based communication channels are unimportant (e.g., they may be greyed-out, boxed-out, or rendered with a predefined transparency). Unimportant group-based communication channels may be inaccessible such that the user cannot view group-based communications within the group-based communication channel.

The group-based communication interface may be rendered including at least side panel and a content panel. Additionally, in some embodiments, the group-based communication interface may be rendered including a flex panel that includes information associated with additional functionality for the group-based communication interface (e.g., search, file management, and the like). In some embodiments, for example, an apparatus/system causes rendering of the group-based communication interface by causing rendering of the side panel of the group-based communication interface including the group-based communication channel in a circumstance where the focus value satisfies the focus threshold. In some embodiments, for example, an apparatus/system causes rendering of the group-based communication interface by causing rendering of the side panel of the group-based communication interface without including the group-based communication channel in a circumstance where the focus value does not satisfy the focus threshold.

In some embodiments, the apparatus causes rendering of the group-based communication interface by configuring and/or transmitting a group-based rendering request to a client device, causing the client device to render the group-based communication interface. In some embodiments, the group-based rendering request may include group-based communication channel information only if the group-based communication was determined important (e.g., if the focus value satisfied the focus threshold). In other embodiments, the group-based rendering request includes all group-based communication channels, and marks whether each is important or unimportant to facilitate appropriate rendering.

At optional block 814A, the apparatus 200 includes means, such as focus management module 212, processor 202, and/or the like, to identify a near-threshold range. The near-threshold range may represent a numerical deviation from the focus threshold. Group-based communication channels having focus values that do not satisfy the focus threshold but do fall within the near-threshold range may not be important yet, but may be cached as likely to become important soon based on slight changes in the focus level of the group-based user. In some embodiments, the group-based communication system embodied by the apparatus 200 may pre-determine the near-threshold range. In other embodiments, the apparatus 200 may determine the near-threshold range, for example using prior interaction data associated with the user.

At optional block 816B, the apparatus 200 includes means, such as focus management module 212, processor 202, and/or the like, to identify at least one near-threshold group-based communication channel, based on the near-threshold range and the user focus selection input. In some embodiments, the group-based communication channel identified at block 804A may be determined as near-threshold despite not having a sufficient focus value to be determined important for purposes of causing rendering at block 812A. In other embodiments, a second group-based communication channel may be identified, retrieved, and/or received, and determined as near-threshold.

At optional block 818A, the apparatus 200 includes means, such as communications module 208, processor 202, and/or the like, that is configured to cause caching of near-threshold communication information associated with the at least one near-threshold group-based communication channel. The cached near-threshold information may include information that allows for efficiently rendering the group-based communication interface including the cached near-threshold information, for example, the group identifier and/or channel identifier associated with the group-based communication channel, and/or a focus interface component value at which the near-threshold information should be rendered, or the like. The apparatus may configure and/or transmit a group-based communication caching request to the client device at block 818A to cause the client device to cache the near-threshold information. In other embodiments, the group-based communication system caches the near-threshold information associated with the near-threshold group-based communication channel.

FIG. 8B illustrates an example process for managing a group-based communication and causing rendering to a group-based communication interface, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 802B, the apparatus 200 includes means, such as processor 202, communications module 208, focus management module 212, and/or the like, that is configured to receive a user focus selection input associated with the group-based communication interface. The apparatus 200 may receive the user focus selection input in response to user engagement with a focus interface component rendered to the group-based communication interface. The user focus selection input may represent a desired focus level for the user, such as a focus level specifically set by the user or determined by the group-based communication system, the client device, or a third-party system.

In some embodiments, the user focus selection input includes a slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input.

In other embodiments, the user focus selection input includes a slider component value set, for example corresponding to a plurality of slider interface components. Additionally or alternatively, in some embodiments, the user focus selection input includes a group-based communication factor associated with each received slider component value. For example, a user focus selection input may include a slider component value set including one or more slider component values and the factor value for group-based communication type (or another group-based communication factor) associated with each of the slider component values, such as when one slider interface component is provided for a set of group-based communication types. The user focus selection input may include the factor value for a given group-based communication factor which the slider interface component is associated with (e.g., factor values for group-based communication type, group-based communication sender, or the like) and a corresponding multi-value interface component value associated with the factor value in a key-value pair.

In some embodiments, a slider interface component is presented for each group-based communication type, such that a user may transmit a user focus selection input for use in identifying and/or setting a factor-based focus threshold for each factor value of group-based communication type. The group-based communication system may receive a user focus selection input including a slider component value set where each slider component value in the slider component value set is associated with a particular factor value for group-based communication type. In other embodiments, the slider interface components are associated with another group-based communication factor, and thus each corresponding slider component values in the slider component value set is similarly associated with a different group-based communication factor. For example, in some embodiments a slider interface component and corresponding slider component value is associated with a group-based communication sender, group-based communication role, group-based communication channel, or the like.

In some embodiments, a slider interface component is rendered for adjusting a set focus threshold for a set of group-based communications grouped based on certain group-based communication factors. In some embodiments, a set focus threshold is associated with each group-based communication regardless of the various group-based communication factors, such that each group-based communication must satisfy only one set focus threshold. In other embodiments, group-based communications are grouped based on one or more group-based communication factors or factor values. For example a first slider interface component may be associated with adjusting a first set focus threshold for group-based direct communications and group-based multi-user communications, while a second slider interface component may be associated with adjusting a second set focus threshold for group-based channel communications and group-based tagged communications. In other embodiments, each set focus threshold may be associated with a factor value set generated based on input from the user (e.g., one or more factor values selected by a user to be a first factor value set and associated with a first set focus threshold, and one or more other factor values selected by a user to be in a second factor value set and associated with a second set focus threshold). For example, a group-based user may create a group of group-based communications having certain group-based communication factors (e.g., all communications sent in a user selected set of channels, all communications sent by a user selected set of senders, all communications sent with a user selected set of topics). One or more slider interface components may be presented for the group-based user to manage corresponding group-based focus threshold(s) based on the creation of group-based communications that are grouped based on certain group-based communication factors.

In some embodiments, the user focus selection input includes a focus mode activation/deactivation indication, which represents that the user has activated/deactivated focus mode. The group-based communication system may identify, retrieve, or otherwise determine one or more corresponding focus threshold(s) in response to activation/deactivation. For example, in an example embodiment, a group-based communication system uses a focus thresholding model to identify a focus threshold, where the focus thresholding model comprises a machine learning or algorithmic model for identifying one or more focus thresholds based on a group-based communication user's interaction with the group-based communication system.

At block 804B, the apparatus 200 includes means such as communications module 208, processor 202, group-based management module 210, and/or the like, to receive a group-based communication configured for rendering to the group-based communication interface. The group-based communication may include various group-based communication factors, such as a group identifier, channel identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 804B, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set. For example, an example group-based communication system may generate a focused communications set including group-based communications from the group-based communications set that the group-based communication system determines important, and cause rendering of the group-based communication interface based on the focused communications set.

At block 806B, the apparatus 200 includes means such as focus management module 212, processor 202, and/or the like, to generate a focus value for the group-based communication. In some embodiments, the apparatus is configured to generate the focus value using a focus value generation model, such as a machine learning model. The apparatus 200 may generate the focus value based on information included in, or otherwise associated with, the group-based communication. For example, the focus value may be based on one or more group-based communication factors associated with the group-based communication. Additionally or alternatively, the apparatus 200 may generate the focus value based on prior and/or future interaction data, for example information associated with a user's prior interactions with the communication sender (e.g., how often the users interact, whether the user often ignores or does not respond to communications from the group-based communication sender, whether the user engages with the group-based communication sender in multiple groups or group-based communication channels, and the like), the user's prior interactions with communications in the group-identifier (e.g., whether the user ignores or does not respond to communications within the group/group-based communication channel associated with the group-based communication), future interaction data (e.g., whether the group-based communication sender and the group-based user are scheduled in a meeting within a predetermined period of time from the current time/date), and the like.

Additionally or alternatively, in some embodiments, the focus value is based on at least location data associated with a client device to which the group-based communication interface is to be rendered. For example, in some embodiments, location data associated with the client device may be received at an earlier step (for example, at block 802B along with the user focus selection input or as part of the user focus selection input). Additionally or alternatively, the group-based communication system may store location data with the client device, for example in a database such as the group-based communication repository 106, and retrieve the location data upon receiving the user focus selection input. The location data may include, but is not limited to, GPS data, address data, or the like associated with the client device.

The location data may be considered as a factor, for example by a focus value generation model, to generate the focus value. For example, the location data may be utilized to determine if the received group-based communication is likely to be important to the group-based user account accessing the group-based communication system. For example, in some embodiments, the location data may indicate the client device is accessing the group-based communication system from a particular GPS location, address, region, zip code, country, state, or the like. The group-based communication system may retrieve stored location data associated with various other group-based user accounts in the group-based communication interface, for example the group-based communication system may retrieve stored location data from the group-based communication repository 106. Based on the stored location data retrieved by the group-based communication system, the group-based communication system may determine one or more proximate group-based user accounts that are considered proximate to the location data received from the client device accessing the group-based communication system. For example, the retrieved location data may indicate that another group-based user account accesses the group-based communication from a nearby location (e.g., other group-based user accounts associated with stored location data that is within a threshold distance from the location data associated with the client device accessing the group-based communication system). Based on the one or more proximate group-based user accounts associated with the location data, the group-based communication system may generate a higher focus value for group-based communications that are associated with the proximate group-based user accounts (e.g., group-based communications having a group-based communication sender that is one of the proximate group-based user accounts, group-based communications associated with a group-based communication channel that a proximate group-based user account often communicates within).

In other embodiments, a focus value is generated for a group-based communication channel. The focus value may be based on one or more group-based communications associated with the group-based communication channel. For example, a focus value may be generated for a group-based communication channel based on an aggregate of all focus values for the group-based communications associated with the channel (e.g., having a channel identifier associated with the group-based communication channel). Alternatively, for example, a focus value may be generated for a group-based communication channel based on metadata or other information associated with the group-based communication channel, such as the group-based communication user accounts/roles permissioned to access the channel, group-based communication user accounts/roles permissioned to communicate within the channel, a topic associated with the channel (e.g., is the channel a social-related channel or a work-related channel), and the like.

At block 808B, the apparatus 200 includes means, such as focus management module 212, processor 202, and/or the like, to identify a focus threshold for the group-based communication. In some embodiments, the focus threshold is identified based on at least the user focus selection input. In some embodiments, the user focus selection input includes a single interface component value associated with a corresponding focus interface component. For example, the user focus selection input may include a slider component value associated with a slider position of a slider interface component, a dial component value associated with a dial position of a dial interface component, a drop-down value associated with a drop-down selection of a drop-down interface component, or the like. In some embodiments, the apparatus identifies a single set focus threshold based on the received user focus selection input, such that each group-based communication must satisfy the set focus threshold.

In other embodiments, the focus threshold is a set focus threshold. A set focus threshold may be associated with a particular set of factor values for one or more group-based communication factors, such that group-based communications having the group-based communication factor values associated with the set must satisfy the particular set focus threshold. In an example embodiment, the set focus threshold may be associated with a set of group-based communication factors including all possible factor values, such that the focus value for a given group-based communication must satisfy the set focus threshold regardless of the factor values for the group-based communication factors of the group-based communication. In other embodiments, a user may create a set of factor values to associate with a set focus threshold. For example, the group-based communication system may cause rendering of a group-based communication interface where a user may create a set for different group-based communication channels, such that different sets of group-based communications having different group-based communication channel identifiers will be compared with different set focus thresholds.

In some embodiments, the set focus threshold is identified based on multiple group-based communication factors and/or factor values selected by the user or the group-based communication system, and the corresponding group-based communication factor values associated with the group-based communication received at, before, or after block 804B. The group-based communication system may, for example based on the user focus selection input and/or stored sets of factor values, identify an interface component value included in the user focus selection input associated with the group-based communication. The user focus selection input may include various key-value pairs, each key value pair including multiple group-based communication factor values and a corresponding multi-value interface component value. In some embodiments, a user focus selection input includes a single multi-value interface component value and information indicating that the single multi-value interface component value is associated with a single set focus threshold for each group-based communication regardless of group-based communication factor values. The apparatus may identify the set focus threshold using the corresponding interface component value, for example using a focus thresholding model, an algorithmic model, or other transformation.

In other embodiments, the focus threshold is a factor-based focus threshold identified based on a group-based communication factor associated with the group-based communication received at block 804B. The user focus selection input may include a multi-value interface component value corresponding to various factor values for a given group-based communication factor (e.g., one or more group-based communication types). Each multi-value interface component value corresponds to a corresponding multi-value interface component in a focus interface component rendered to a group-based communication interface. For example, in a particular embodiment, the group-based communication system renders a group-based communication interface including a slider interface component for each group-based communication channel associated with the group-based communication interface. The group-based user may set a slider position within each slider interface component, corresponding to the user's desired focus level for each group-based communication channel. The group-based communication system may receive a user focus selection input including a slider component value associated with each group-based communication channel or group-based communication channel identifier. The user focus selection interface may be received after a user releases the slider, or at a pre-determined time instance (e.g., every 0.5 seconds). The group-based communication system may identify a factor-based focus threshold based on the group-based communication channel (or group-based communication channel identifier) associated the group-based communication received at block 804B using the corresponding slider component value associated with the group-based communication channel (or group-based communication channel identifier) included in the user focus selection received at block 802B.

At block 810B, the apparatus includes means, such as focus management module 212, processor 202, and/or the like, to compare the focus value and the focus threshold to determine if the focus value satisfies the focus threshold. In some embodiments, the focus value satisfies the focus threshold if the focus value exceeds the focus threshold. In other embodiments, the focus value satisfies the focus threshold if the focus value is equal to or exceeds the focus threshold. In other embodiments still, the focus value satisfies the focus threshold if the focus value is below the focus threshold. In other embodiments, the focus value satisfies the focus threshold if the focus value is below or equal to the focus threshold.

At block 812B, the apparatus 200 includes means, such as input/output module 206, communications module 208, processor 202, and/or the like, to cause rendering of the group-based communication interface based on the determination of whether the focus value satisfies the focus threshold. In some embodiments, the apparatus causes a client device to render the group-based communication interface including the group-based communication when the focus value satisfies the focus threshold, and does not render the group-based communication when the focus value does not satisfy the focus threshold. In some embodiments, the group-based user may have an unimportant group-based communication (e.g., group-based communication not having a focus value that satisfies a corresponding focus threshold) withheld from rendering so as to not distract the group-based user. In other embodiments, the apparatus causes a client device to render the group-based communication interface including the group-based communication, and including focused notification information associated with the group-based communication when the focus value satisfies the focus threshold, and not when the focus value does not satisfy the focus threshold. In some embodiments, the group-based communication interface includes all received group-based communications, but only includes focused notification information for the group-based communications determined important, to draw the attention of the group-based user to the important group-based communication.

The group-based communication interface may include at least side panel and a content panel. Additionally, in some embodiments, the group-based communication interface may be rendered including a flex panel that includes information associated with additional functionality for the group-based communication interface and/or selected group-based communication channel (e.g., search, file management, and the like). In some embodiments, for example, an apparatus/system causes rendering of the group-based communication interface by causing rendering of the content panel of the group-based communication interface including the group-based communication in a circumstance where the focus value satisfies the focus threshold. In some embodiments, for example, an apparatus/system causes rendering of the group-based communication interface by causing rendering of the content panel of the group-based communication interface without including the group-based communication in a circumstance where the focus value does not satisfy the focus threshold.

In some embodiments, the apparatus causes rendering of the group-based communication interface by configuring and/or transmitting a group-based rendering request to a client device, causing the client device to render the group-based communication interface. In some embodiments, the group-based rendering request may include no group-based communication information if the group-based communication was determined unimportant (e.g., if the focus value did not satisfy the focus threshold). In some embodiments, the group-based rendering request may include the group-based communication, or equivalent information, and additional information for facilitating appropriate rendering of the group-based communication or notification information associated with the group-based communication. For example, in some embodiments, the group-based rendering request includes focused notification information generated by the apparatus embodying the group-based communication system. In some embodiments, the group-based rendering request includes an importance flag that indicates whether the group-based communication is important, for example based on whether the focus value was determined to satisfy the corresponding focus threshold.

In some embodiments, the group-based communication interface is rendered with user interface components accessing for group-based communication channels only if the group-based communication channel is important or includes an important group-based communication. For example, the group-based communication interface may hide user interface components for accessing unimportant group-based communication channels (e.g., group-based communication channels associated with focus values that do not satisfy a corresponding focus threshold). such that the group-based communication interface is rendered without such user interface components. For example, a group-based communication system may cause rendering of a group-based communication interface not including user interface components associated with unimportant group-based communication channels. In other embodiments, the group-based communication interface is rendered with one or more user interface components for accessing unimportant group-based communication channels, where the user interface components are rendered with a visual affect indicating that they are inaccessible. For example, a group-based communication system may cause rendering of a group-based communication interface, including user interface components associated with group-based communication channels that are determined unimportant as transparent, greyed-out, or otherwise differentiated from channels determined important. Alternatively or additionally, important group-based communications may be rendered with a focus mode interface effect.

At optional block 814B, the apparatus 200 includes means, such as focus management module 212, processor 202, and/or the like, to identify a near-threshold range. The near-threshold range may represent a numerical deviation from the focus threshold. Group-based communications having focus values that do not satisfy the focus threshold but do fall within the near-threshold range may not be important yet, but may be cached as likely to become important soon based on slight changes in the focus level of the group-based user. In some embodiments, the group-based communication system embodied by the apparatus 200 may pre-determine the near-threshold range. In other embodiments, the apparatus 200 may determine the near-threshold range, for example using prior interaction data associated with the group-based user account accessing the group-based communication system.

At optional block 816B, the apparatus 200 includes means, such as focus management module 212, processor 202, and/or the like, to identify at least one near-threshold group-based communication based on the near-threshold range and the user focus selection input. In some embodiments, the group-based communication received at block 804B may be determined as near-threshold despite not having a sufficient focus value to be determined important for purposes of causing rendering at block 812B. In other embodiments, a second group-based communication may be received, retrieved, and/or identified, and determined as near-threshold.

At optional block 818B, the apparatus 200 includes means, such as communications module 208, processor 202, and/or the like, that is configured to cause caching of near-threshold communication information associated with the at least one near-threshold group-based communication. The cached near-threshold information may include information that allows for efficiently rendering the group-based communication interface including the cached near-threshold information, for example, the group identifier associated with the group-based communication, a focus interface component value at which the near-threshold information should be rendered, or the like. The apparatus may configure and/or transmit a group-based communication caching request to the client device at block 818B to cause the client device to cache the near-threshold communication information. In other embodiments, the group-based communication system embodied by the apparatus caches the near-threshold information, for example on a server.

Caching near-threshold information on the client device also provides advantages in maintaining a responsive, positive user experience. Using the cached near-threshold information, a group-based communication information can be transitioned to include the near-threshold information (or corresponding focused communication notification information) without contacting the group-based communication system should the user further adjust one or more focus thresholds, for example using a focus interface component. By caching at the client device, networking resources are conserved by minimizing the data transmitted between the client device and the group-based communication system. In some embodiments, the client device may request a cache update from the group-based communication system, and only receive group-based communication information if the cached information is out of date (e.g., the information has changed or new group-based communications or corresponding information was received). The cache update may be requested at regular intervals (e.g., every X minutes, every time the user re-accesses the application, or the like).

In other embodiments, the group-based communication system caches the near-threshold communication information. The group-based communication system may retrieve the cached near-threshold communication information when an updated user focus selection input is received that indicates a lower focus level (for example, a removal user focus selection input), and cause rendering of the cached near-threshold communication information. Such caching by the group-based communication system enables the group-based communication system to quickly cause updated rendering while minimizing hardware requirements on the client device, enabling the device to devote such memory space to other processes and tasks.

It should be appreciated that, in some embodiments, one or more of the blocks 802-812 are repeated for managing a second group-based communication. For example, the group-based communication system may receive an updated user focus selection input associated with the group-based communication interface, which represents a new focus level set by the user. The group-based communication system may receive a second received group-based communication or group-based communications set, and generate a second focus value for the second group-based communication. The group-based communication system may then identify a focus threshold for the group-based communication. If an updated focus selection input was received, the group-based communication system may identify a second focus threshold for the second group-based communication based on the updated focus selection input. Otherwise, the group-based communication system may identify a second focus threshold for the second group-based communication based on the last received user focus selection input (e.g., the same user focus selection input used to identify the focus threshold associated with the first group-based communication). The group-based communication system may compare the second focus threshold and the second focus value to determine if the second focus value satisfies the second focus threshold, and cause rendering of the group-based communication interface based on the determination of whether the second focus values satisfies the second focus threshold.

In some embodiments, similar operations to the operations illustrated by blocks 802B-818B are performed with respect to a user communication system, user communication interface, and user communication. For example, a user focus selection input may be received associated with a user communication interface, and a user communication may be received for rendering to the user communication interface. A focus value may be generated for the user communication, for example based on one or more user communication factors associated with the user communication and/or prior interaction data. A user communication system may generate the focus value for the user communication using a focus value generation model, and information and/or data stored in, or otherwise associated with, one or more user communication system user accounts (e.g., information associated with a sender user account, or information associated with a user communication system user account accessing the user communication system for an authenticated session). A focus threshold may be identified for the user communication, for example based on the received user focus selection input, the received user communication, prior interaction data, and the like. A user communication system may then cause rendering of the user communication interface based on a determination of whether the focus value satisfies the focus threshold, for example by comparing the focus value and the focus threshold. The user communication interface may be rendered, for example, such that unimportant user communications are not rendered, or are rendered visually distinct so as to make them not distracting (e.g., greyed-out, blocked-out, or sufficiently transparent). Alternatively, user communications may be rendered, but the user communication interface may be rendered such that focused notification information is only rendered associated with important user communications. It should be appreciated that such embodiments may function similarly based on information associated with user communications.

FIG. 9 illustrates a flowchart describing example operations for managing a group-based communication and causing rendering to a group-based communication interface based at least on an identified focus event, for example performed by a group-based communication system embodied by the apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 902, the apparatus 200 includes means, such as processor 202, communications module 208, focus management module 212, and/or the like, to receive a user focus selection input associated with the group-based communication interface. The apparatus 200 may receive the user focus selection input in response to engagement with a focus interface component rendered to the group-based communication interface, for example from a client device. The user focus selection input may represent a desired focus level for the user, such as a focus level specifically set by the user or determined by the group-based communication system, the client device, or a third-party system.

In some embodiments, the user focus selection input includes a slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input. In some embodiments, user focus selection input is transmitted upon user engagement with a focus interface component or a sub-component.

In other embodiments, the user focus selection input includes a slider component value set, for example corresponding to a plurality of slider interface components. Additionally or alternatively, in some embodiments, the user focus selection input includes a group-based communication factor associated with each received slider component value. For example, a user focus selection input may include a slider component value set including one or more slider component values and the group-based communication type associated with each of the slider component values, such as when one slider interface component is provided for each factor value in a set of group-based communication types.

In some embodiments, a slider interface component is presented for each group-based communication type, such that a user may set a factor-based focus threshold for each group-based communication type. The group-based communication system may receive a user focus selection input including a slider component value set where each slider component value in the slider component value set is associated with a particular group-based communication type. In other embodiments, the slider interface components are associated with another group-based communication factor, and thus each corresponding slider component values in the slider component value set is similarly associated with a different group-based communication factor. For example, in some embodiments a slider interface component and corresponding slider component value is associated with a group-based communication sender, group-based communication role, group-based communication channel, or the like.

In some embodiments, a slider interface component is presented that corresponds to adjusting a set focus threshold for a set of group-based communications associated with certain group-based communication factors. For example a first slider interface component may be associated with adjusting a set focus threshold for group-based direct communications and/or group-based multi-user communications, while a second slider interface component may be associated with adjusting a set focus threshold for group-based channel communications and group-based tagged communications. In other embodiments, grouped-based communications may be grouped based on input by the user. For example, a group-based user may create a group of group-based communications having certain group-based communication factors (e.g., all communications sent in a user selected set of channels, all communications sent by a user selected set of senders, all communications sent with a user selected set of topics). One or more slider interface components may be presented for the group-based user to manage corresponding group-based focus threshold(s) based on the created of group-based communications grouped based on certain group-based communication factors.

In some embodiments, the user focus selection input includes a focus mode activation/deactivation, indicating that a group-based user has activated/deactivated focus mode. The group-based communication system may identify, retrieve, or otherwise determine one or more corresponding focus threshold(s) in response to activation/deactivation. For example, in an example embodiment, a group-based communication system uses a focus thresholding model to identify a focus threshold, where the focus thresholding model comprises a machine learning or algorithmic model for identifying one or more focus thresholds based on a group-based communication user's interaction with the group-based communication system.

At block 904, the apparatus 200 includes means such as communications module 208, processor 202, group-based management module 210, and/or the like, to receive a group-based communication configured for rendering to the group-based communication interface. The group-based communication may include, or otherwise be associated with, various group-based communication factors, such as a group identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 904, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set.

At block 906, the apparatus 200 includes means, such as group-based management module 210, communications module 208, processor 202, and/or the like, determine a current time is within a proximate time frame associated with an identified focus event. In some embodiments, the apparatus is configured to identify one or more focus events. For example, in some embodiments, the apparatus 200 may communicate with one or more validated external resources via one or more application programming interfaces (APIs) to identify one or more focus events. A group-based communication system may identify validated external resource(s) by retrieving one or more external resource identifiers stored in a group-based communication repository associated with the group-based user account accessing the group-based communication system.

The apparatus may retrieve an external resource user identifier, for example from a group-based communication repository, and transmit the external resource user identifier to the validated external resource. In some embodiments, the apparatus receives an external user data object in response, where the external user data object includes one or more focus events associated with a particular group-based communication user account linked to the external resource user identifier. In other embodiments, the apparatus receives a single-user or multi-user external email corpus including information associated with one or more focus events, and parse the single-user or multi-user external email corpus to identify the one or more focus events. For example, the group-based communication system embodied by apparatus 200 may communicate with one or more validated external resources, such as a validated external email, calendar, or scheduling resource, to identify one or more scheduled meetings, events, or the like, associated with a particular group-based communication user account. The focus event may include information that enables the group-based communication system to identify other group-based communication system user accounts linked with the focus event (e.g., other meeting or event participants).

In some embodiments, the group-based communication system may retrieve an external resource user identifier that includes, or is associated with, an external resource access token to facilitate communication with a validated external resource, for example via an API. The external resource access token may uniquely identify the group-based communication system, and permission granted to the group-based communication system. In some embodiments, the external resource access token is associated with a group-based communication user and/or group-based communication user account, such that the user may access information associated with the group-based communication user, and stored or managed by the validated external resource.

Each focus event may be include or be associated with a proximate time frame. Some focus events may be associated with a start time and an end time, such that the proximate time frame is between the start time and the end time for the focus event. Other focus events may be associated with a preparation time frame, such that the proximate time frame for the focus event may be extended based on the preparation time frame. The apparatus may then identify a current time, and identify a relevant focus event by determining the current time is within a proximate time frame for the relevant focus event.

At block 908, the apparatus 200 includes means such as focus management module 212, processor 202, and/or the like, to generate a focus value for the group-based communication based on the identified focus event. In some embodiments, the apparatus is configured to generate the focus value using a focus value generation model, such as a machine learning model. The apparatus 200 may generate the focus value based on information included in, or otherwise associated with, the group-based communication. For example, the focus value may be based on one or more group-based communication factors associated with the group-based communication (e.g., the group-based communication type, group-based communication sender, and/or channel identifier associated with the group-based communication). Additionally or alternatively, the apparatus 200 may generate the focus value based on prior and/or future interaction data, for example information associated with a user's prior interactions with the group-based communication sender (e.g., how often the users interact, whether the user often ignores or does not respond to group-based communications from the group-based communication sender, whether the user engages with the group-based communication sender in multiple contexts, and the like), the user's prior interactions with communications in the group identifier or channel identifier (e.g., whether the user ignores or does not respond to group-based communications within the group-based communication interface, or ignores/does not interact with group-based communications in the group-based communication channel associated with the group-based communication), future interaction data (e.g., whether the group-based communication sender is scheduled in a meeting with the group-based communication user account accessing the group-based communication system within a predetermined period of time from the current time/date), and the like.

In some embodiments, the apparatus 200 identifies group-based communication system user accounts, group-based communication subjects, group-based communication roles, and the like, associated with the identified focus event. The apparatus generates the focus value using this identified information, such that if the received group-based communication is associated with a group-based communication system user account, group-based communication subject, group-based communication role, or other group-based information that is also associated with the identified focus event, the generated focus value will be higher. For example, a group-based communication to a selected group-based user from other group-based users that the selected group-based user has a meeting with may be generated with a higher focus value. The generated focus value may also be higher as the current time is closer to an identified focus event start time. For example, a group-based communication to a selected group-based user from other group-based users that the selected group-based user has a meeting with may be irrelevant (and thus not affect the generated focus value) if the meeting is a week away, but may greatly increase the generated focus value if the meeting is an hour or less from the current time. In some embodiments, the apparatus may train or access a trained focus value generation model that generates the focus value based on the identified focus event.

In other embodiments, a focus event may be identified and utilized to generate a focus value for a group-based communication channel. For example, a received, identified, or otherwise determined communication channel may be associated with an upcoming focus event. In some embodiments, for example, the group-based communication channel may be intended to facilitate transmission of group-based communications associated with the focus event. In an example embodiment, for example, the group-based communication interface may include a group-based communication channel named "Meetings Channel," and accessible to a set of group-based user accounts. The group-based communication system may identify a focus event, for example by communicating with a validated external resource to retrieve a validated user data object including, or otherwise associated with, a focus event such as a meeting. The group-based communication system may determine the focus event is associated with the set of group-based user accounts. The group-based communication system may identify the group-based communication channel is associated with the focus event, for example by parsing (1) metadata associated with the group-based communication channel (e.g., channel name, group-based user accounts having access to the group-based communication channel, and the like) and/or (2) the group-based communications within the group-based communication channel to determine whether the group-based communication channel is associated with the focus event. If the focus event is scheduled for a start time that begins soon (e.g., within a predefined time threshold) the group-based communication system may generate a higher focus value associated with the group-based communication channel.

At block 910, the apparatus 200 includes means, such as focus management module 212, processor 202, and/or the like, to identify a focus threshold for the group-based communication. In some embodiments, the focus threshold is identified based on at least the user focus selection input. In some embodiments, the user focus selection input includes a single interface component value associated with adjusting a corresponding focus interface component. For example, the user focus selection input may include a slider component value associated with a slider position of a slider interface component, a dial component value associated with a dial position of a dial interface component, a drop-down value associated with a drop-down selection of a drop-down interface component, or the like. In some embodiments, the apparatus identifies a single set focus threshold based on the received user focus selection input, such that each group-based communication must satisfy the set focus threshold.

In other embodiments, the focus threshold is a set focus threshold identified based on one or more group-based communication factors associated with the group-based communication received at block 904. The group-based communication system may, for example based on the user focus selection input and/or stored user generated group-based communication channel sets, identify an interface component value included in the user focus selection input associated with the group-based communication. For example, in some embodiments, the group-based communication system identifies a factor value associated with the received group-based communication, and a corresponding interface component value from the user focus selection input (for example, where the factor value is a key in a key-value pair). The apparatus may identify the set focus threshold using the corresponding interface component value, for example using a focus thresholding model or an algorithmic model for determining a set focus threshold.

In other embodiments, the focus threshold is a factor-based focus threshold identified based on a group-based communication factor associated with the group-based communication received at block 904. The user focus selection input may include a plurality of interface component values, each corresponding to a factor value for a given group-based communication factor, where each interface component value corresponds to a corresponding component in a focus interface component rendered to a group-based communication interface. For example, in a particular embodiment, the group-based communication interface includes a slider interface component for each group-based communication channel. The group-based user may set each slider interface component for each group-based communication channel, and the group-based communication system may receive a user focus selection input including a slider component value associated with each group-based communication channel or group-based communication channel identifier. The group-based communication system may identify a factor-based focus threshold based on the group-based communication channel (or group-based communication channel identifier) associated the group-based communication received at block 904 using the corresponding slider component value associated with the group-based communication channel (or group-based communication channel identifier) included in the user focus selection received at block 902.

At block 912, the apparatus includes means, such as focus management module 212, processor 202, and/or the like, to compare the focus value and the focus threshold to determine if the focus value satisfies the focus threshold. In some embodiments, the focus value satisfies the focus threshold if the focus value exceeds the focus threshold. In other embodiments, the focus value satisfies the focus threshold if the focus value is equal to or exceeds the focus threshold. In other embodiments still, the focus value satisfies the focus threshold if the focus value is below the focus threshold. In other embodiments, the focus value satisfies the focus threshold if the focus value is below or equal to the focus threshold.

At block 914, the apparatus 200 includes means, such as input/output module 206, communications module 208, processor 202, and/or the like, to cause rendering of the group-based communication interface based on the determination of whether the focus value satisfies the focus threshold. In some embodiments, the apparatus causes a client device to render the group-based communication interface including the group-based communication when the focus value satisfies the focus threshold, and does not render the group-based communication when the focus value does not satisfy the focus threshold. In some embodiments, the group-based user may have an unimportant group-based communication (e.g., group-based communication not having a focus value that satisfies a corresponding focus threshold) withheld from rendering so as to not distract the group-based user. In other embodiments, the apparatus causes a client device to render the group-based communication interface including the group-based communication, and including focused notification information associated with the group-based communication when the focus value satisfies the focus threshold, and not when the focus value does not satisfy the focus threshold. In some embodiments, the group-based communication interface includes all group-based communications, but only includes focused notification information to draw the attention of the group-based user to the group-based communication when the group-based communication is determined important (e.g., having a focus value that satisfies a corresponding focus threshold).

In some embodiments, the apparatus causes rendering of the group-based communication interface by configuring and/or transmitting a group-based rendering request to a client device, causing the client device to render the group-based communication interface. In some embodiments, the group-based rendering request may include no group-based communication interface information if the group-based communication was determined unimportant (e.g., if the focus value did not satisfy the focus threshold). In some embodiments, the group-based rendering request may include the group-based communication, or equivalent information, and additional information for facilitating appropriate rendering of the group-based communication. For example, in some embodiments, the group-based rendering request includes focused notification information generated by the apparatus embodying the group-based communication system. In some embodiments, the group-based rendering request includes an importance flag that indicates whether the group-based communication is important, for example based on whether the focus value was determined to satisfy the corresponding focus threshold.

FIG. 10 illustrates an example process for managing a group-based communication and causing rendering to a group-based communication interface using a focus value generation model, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 1002, the apparatus 200 includes means, such as processor 202, communications module 208, focus management module 212, and/or the like, to receive a user focus selection input associated with the group-based communication interface. The apparatus 200 may receive the user focus selection input in response to engagement with a focus interface component rendered to the group-based communication interface. The user focus selection input may represent a desired focus level for the user, such as a focus level specifically set by the user or determined by the group-based communication system, the client device, or a third-party system.

In some embodiments, the user focus selection input includes a slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input.

In other embodiments, the user focus selection input includes a slider component value set, for example corresponding to a plurality of slider interface components. Additionally or alternatively, in some embodiments, the user focus selection input includes a group-based communication factor associated with each received slider component value. For example, a user focus selection input may include a slider component value set including one or more slider component values and the group-based communication type associated with each of the slider component values, such as when one slider interface component is provided for a set of group-based communication types.

In some embodiments, a slider interface component is presented for each group-based communication type, such that a user may set an independent factor-based focus threshold for each group-based communication type. The group-based communication system may receive a user focus selection input including a slider component value set where each slider component value in the slider component value set is associated with a particular group-based communication type. In other embodiments, the slider interface components are associated with another group-based communication factor, and thus each corresponding slider component values in the slider component value set is similarly associated with a different group-based communication factor. For example, in some embodiments a slider interface component and corresponding slider component value is associated with a group-based communication sender, group-based communication role, group-based communication channel, or the like.

In some embodiments, a slider interface component is presented that corresponds to adjusting a set focus threshold for a set of group-based communications associated with certain group-based communication factors. For example a first slider interface component may be associated with adjusting a set focus threshold for group-based direct communications and group-based multi-user communications, while a second slider interface component may be associated with adjusting a set focus threshold for group-based channel communications and group-based tagged communications. In other embodiments, grouped-based communications may be grouped based on input by the user. For example, a group-based user may create a set of group-based communication factor values that should be applied to a particular set focus threshold (e.g., all communications having a channel identifier within a user selected set of channel identifiers, all communications having a communication sender identifier within a user selected set of senders, all communications sent having a communication topic within a user selected set of topics). One or more slider interface components may be presented for the group-based user to manage corresponding group-based focus threshold(s) based on the created of group-based communications grouped based on certain group-based communication factors.

In some embodiments, the user focus selection input includes a focus mode activation/deactivation, indicating that a group-based user has activated/deactivated focus mode. The group-based communication system may identify, retrieve, or otherwise determine one or more corresponding focus threshold(s) in response to activation/deactivation. For example, in an example embodiment, a group-based communication system uses a focus thresholding model to identify a focus threshold, where the focus thresholding model comprises a machine learning or algorithmic model for identifying one or more focus thresholds based on a group-based communication user's interaction with the group-based communication system.

At block 1004, the apparatus 200 includes means such as communications module 208, processor 202, group-based management module 210, and/or the like, to receive a group-based communication configured for rendering to the group-based communication interface. The group-based communication may include various group-based communication factors, such as a group identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 1004, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set.

At block 1006, the apparatus 200 includes means, such as focus management module 212, processor 202, and/or the like, to identify a focus value generation model. In some embodiments, the apparatus 200 is configured to identify a pre-determined focus value generation model, for example where the group-based communication system is configured to utilize a pre-determined focus value generation model configured to generate a focus value for every group-based communication. In other embodiments, the apparatus 200 is configured to identify a focus value generation model based on the received group-based communication and/or user focus selection input. In one embodiment, the apparatus 200 may identify a focus value generation model based on a particular group-based communication factor for a group-based communication, for example a focus value generation model may be identified based on a group-based communication type associated with the group-based communication.

The focus value generation model is trained to generate a focus value for the received group-based communication. In some embodiments, the focus value generation model is a trained machine learning model. The focus value generation model may be trained by the group-based communication system using prior interaction data for the group-based communication system user account accessing the group-based communication. In other embodiments, the focus value generation model is trained by a third-party system, and accessed and/or received by the group-based communication system.

In some embodiments, a focus value generation model is configured to generate a focus value for a group-based communication channel. For example, a focus value generation model may generate a low focus value for a first group-based communication channel determined personal or social (e.g., is intended for communications regarding a "book of the month" club), and generate a high focus value for a second group-based communication channel determined work-related (e.g., is intended for communications regarding a project the user is working on). One or more focus value generation model(s) may generate focus values for group-based communication channels based on various information related to the group-based communication channel, and/or information related to the group-based communication. For example, the focus value generation model may generate a focus value based on (1) group-based communication system user accounts with access to and/or that communicate within the group-based communication channel, (2) group-based communication system roles for group-based communication system user accounts with access to and/or that communicate within the group-based communication channel, (3) group-based communications transmitted within the group-based communication channel, (4) a topic determined associated with the group-based communication channel, (5) prior interaction data for a group-based communication system user account, and the like. In some embodiments, one focus value generation model is configured to generate focus values for both group-based communications and group-based communication channels. In other embodiments, a first focus value generation model is configured to generate focus values for group-based communications, and a second focus value generation model is configured to generate focus values for group-based communication channels.

At block 1008, the apparatus 200 includes means, such as focus management module 212, processor 202, and/or the like, to generate a focus value for the group-based communication using the focus value generation model. The focus value generation model may be embodied using various machine learning implementations, and/or various algorithmic implementations. In some embodiments, the focus value generation model may be trained to generate a focus value for a group-based communication utilizing only the group-based communication as input. In some embodiments, the focus value generation model is trained by a training system associated with or controlled by the group-based communication system, or trained by a third-party system. In other embodiments, the group-based communication system embodied by apparatus 200 includes means to train the focus value generation model. The output of the focus value generation model may estimate an importance of the group-based communication.

In some embodiments, the focus value generation model is a machine learning model trained to generate the focus value for the group-based communication based on one or more group-based communication factors associated with the group-based communication and/or prior interaction data. The focus value generation model may analyze prior interactions for the group-based user receiving the group-based communication, for example interactions between the receiving group-based user and the group-based communication sender, or between the receiving group-based user and the group-based communication channel associated with the group-based communication. In a specific example, the group-based communication received may be from a group-based communication sender that the receiving user rarely interacts with, and thus the focus value generation model may generate a low focus value. Alternatively, the focus value generation model may be trained to determine that, based on prior interaction data, the received group-based communication is associated with a group-based communication channel the receiving user often interacts with, and thus the focus value generation model may generate a high focus value.

Additionally or alternatively, the focus value generation model may identify and/or analyze upcoming focus events, such that group-based communications that are determined to be associated with upcoming focus events are generated with higher focus values (e.g., group-based communications from a group-based communication sender with which a selected group-based user has a focus event with in a hour are determined more important than if the group-based communication sender had sent the same group-based communication without the focus event scheduled).

Additionally or alternatively, the focus value generation model may analyze a group-based user's activity during a particular time, date, day of week, or the like, to generate the focus value. For example, if a particular group-based communication user account regularly accesses the group-based communication system to and interacts with group-based communications from a particular group-based communication sender during a particular time of day/day of week, the focus value generation model may generate a higher focus value for group-based communications from the group-based communication sender. In another example, if a group-based user regularly communicates within or engages with a particular group-based communication channel within a particular time of day/day of week, the focus value generation model may generate a higher focus value for group-based communications associated with that particular group-based communication channel.

Additionally or alternatively, the focus value generation model may prioritize (and thus generate a higher focus value) for group-based communications transmitted from a group-based communication sender that is associated with the group-based user account accessing the group-based communication system in one or more validated external resources. For example, in some embodiments, a focus value generation model may identify a group-based user account associated with a client device accessing the group-based communication system (e.g., a client device that transmitted the user focus selection input received at block 1002). The focus value generation model may identify one or more validated external resource associated with the group-based user account associated with the client device accessing the group-based communication system. Additionally, the focus value generation model may identify various sender account validated external resources associated with the group-based communication sender of the received group-based communication. The focus value generation model may, in a particular embodiment, generate a higher focus value when the various sender account validated external resources associated with the group-based communication sender are similar to the various validated external resources associated with the group-based user account accessing the group-based communication system.

Alternatively, in some embodiments, the group-based communication system may communicate with a validated external resource to determine if the group-based user account accessing the group-based communication system is associated with the group-based communication sender via the validated external resource. For example, the group-based communication system may identify that the group-based user account accessing the group-based communication system and the group-based communication sender are each associated with a particular validated external resource (for example, each has an external resource identifier for the validated external resource associated with their group-based user account). The group-based communication system may communicate with the validated external resource to receive a first validated user data object for the group-based communication sender, and a second validated user data object for the group-based user account accessing the group-based communication system. The group-based communication system may then parse the first and second validated user data objects to determine if the two group-based user accounts interact via the validated external resource. The focus value generation model may consider the interactions between the group-based user account accessing the group-based communication system and the group-based communication sender, and generate a higher focus value when the two group-based user accounts interact more via one or more validated external resources (for example, via a validated external resource).

It should be appreciated that a focus value generation model may generate a focus value for a group-based communication based on various parameters. An example focus value generation model may analyze each of the above relationships, as well as information associated with other group-based communication factors associated with the group-based communication but not described above (e.g., a group-based communication sender role, or a group-based communication receiver role associated with the group-based communication system user account accessing the group-based communication system via a particular client device, or the like), or other prior interaction data regarding a group-based user's interactions with the group-based communication system or group-based communication interface, and the like. For example, the focus value generation model may be trained to determine a relationship between the group-based communication sender role and a group-based communication receiver role (e.g., a role associated with the group-based communication system user account accessing the group-based communication via the client device), and generate a focus value based at least on the determined relationship (e.g., group-based communication is from a superior and thus is likely important, group-based communication is from the same role working on the same projects and thus is likely important, and the like). The focus value generation models are described above as examples, and are not intended to limit the scope and spirit of the disclosure herein.

In some embodiments, the generated focus value is associated with a focus value minimum and/or focus value maximum. For example, in some embodiments, a focus value is a numerical value between a focus minimum value is 0.0 and a focus maximum value of 10.0. In some embodiments, a higher focus value indicates the group-based communication is considered more important.

At block 1010, the apparatus 200 includes means, such as focus management module 212, processor 202, and/or the like, to identify a focus threshold for the group-based communication. In some embodiments, the focus threshold is identified based on at least the user focus selection input. In some embodiments, the user focus selection input includes a single interface component value associated with adjusting a corresponding focus interface component. For example, the user focus selection input may include a slider component value associated with a slider position of a slider interface component, a dial component value associated with a dial position of a dial interface component, a drop-down value associated with a drop-down selection of a drop-down interface component, or the like associated with another kind of multi-value interface component. In some embodiments, the apparatus identifies a single set focus threshold based on the received user focus selection input, such that each group-based communication must satisfy the set focus threshold.

In other embodiments, the focus threshold is a set focus threshold identified based on one or more group-based communication factors associated with the group-based communication received at block 1004. In some embodiments, the set focus threshold is identified as a pre-determined focus threshold applied to all group-based communications, regardless of group-based communication factors associated with the group-based communication. The group-based communication system may, for example based on the user focus selection input and/or stored sets of factor values, identify or extract a multi-value interface component value included in the user focus selection input associated with the group-based communication. The apparatus may identify the set focus threshold using the corresponding interface component value, for example using a focus thresholding model, an algorithmic model or transformation.

In other embodiments, the focus threshold is a factor-based focus threshold identified based on a group-based communication factor associated with the group-based communication received at block 1004. The user focus selection input may include a plurality of multi-value interface component values, each multi-value interface component value corresponding to a factor value for a given group-based communication factor, and where each interface component value corresponds to a corresponding component in a focus interface component rendered to a group-based communication interface. For example, in a particular embodiment, the group-based communication interface includes a slider interface component for each group-based communication channel. The group-based user may set each slider interface component for each group-based communication channel, and the group-based communication system may receive a user focus selection input including a slider component value associated with each group-based communication channel or group-based communication channel identifier. The group-based communication system may identify a factor-based focus threshold based on the group-based communication channel (or group-based communication channel identifier) associated the group-based communication received at block 1004 using the corresponding slider component value associated with the group-based communication channel (or group-based communication channel identifier) included in the user focus selection received at block 1002.

In some embodiments, the focus threshold for a group-based communication is identified associated with a group-based communication channel associated with the group-based communication. For example, a group-based communication system may identify that the group-based communication is associated with a particular group-based communication channel (e.g., a social group-based communication channel), and identify an appropriate focus threshold for the particular group-based communication channel.

At block 1012, the apparatus includes means, such as focus management module 212, processor 202, and/or the like, to compare the focus value and the focus threshold to determine if the focus value satisfies the focus threshold. In some embodiments, the focus value satisfies the focus threshold if the focus value exceeds the focus threshold. In other embodiments, the focus value satisfies the focus threshold if the focus value is equal to or exceeds the focus threshold. In other embodiments still, the focus value satisfies the focus threshold if the focus value is below the focus threshold. In other embodiments, the focus value satisfies the focus threshold if the focus value is below or equal to the focus threshold.

At block 1014, the apparatus 200 includes means, such as input/output module 206, communications module 208, processor 202, and/or the like, to cause rendering of the group-based communication interface based on the determination of whether the focus value satisfies the focus threshold. In some embodiments, the apparatus causes a client device to render the group-based communication interface including the group-based communication when the focus value satisfies the focus threshold, and does not render the group-based communication when the focus value does not satisfy the focus threshold. In some embodiments, the group-based user may have an unimportant group-based communication (e.g., group-based communication not having a focus value that satisfies a corresponding focus threshold) withheld from rendering so as to not distract the group-based user. In other embodiments, the apparatus causes a client device to render the group-based communication interface including the group-based communication, and including focused notification information associated with the group-based communication when the focus value satisfies the focus threshold, and not when the focus value does not satisfy the focus threshold. In some embodiments, the group-based communication interface includes all group-based communications, but only includes focused notification information to draw the attention of the group-based user to the group-based communication when the group-based communication is determined important (e.g., having a focus value that satisfies a corresponding focus threshold).

In some embodiments, the apparatus causes rendering of the group-based communication interface by configuring and/or transmitting a group-based rendering request to a client device, causing the client device to render the group-based communication interface. In some embodiments, the group-based rendering request may include no group-based communication interface information if the group-based communication was determined unimportant (e.g., if the focus value did not satisfy the focus threshold). In some embodiments, the group-based rendering request may include the group-based communication, or equivalent information, and additional information for facilitating appropriate rendering of the group-based communication. For example, in some embodiments, the group-based rendering request includes focused notification information generated by the apparatus embodying the group-based communication system. In some embodiments, the group-based rendering request includes an importance flag that indicates whether the group-based communication is important, for example based on whether the focus value was determined to satisfy the corresponding focus threshold.

FIG. 11 illustrates an example detailed process for managing a group-based communication and causing updated rendering of the group-based communication to a group-based communication interface based on a factor-based focus threshold, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 1102, the apparatus 200 includes means, such as processor 202, communications module 208 focus management module 212, and/or the like, to receive a user focus selection input associated with the group-based communication interface. The apparatus 200 may receive the user focus selection input in response to engagement with a focus interface component rendered to the group-based communication interface. The user focus selection input may represent a desired focus level for the user, such as a focus level specifically set by the user or determined by the group-based communication system, the client device, or a third-party system.

In other embodiments, the user focus selection input includes a multi-value interface component set, such as a slider component value set, corresponding to a plurality of slider interface components. Additionally or alternatively, in some embodiments, the user focus selection input includes a group-based communication factor value associated with each received multi-value interface component value, for example each slider component value, such that a received multi-value interface component value may be extracted based on a particular group-based communication factor value.

In some embodiments, a slider interface component is presented for each factor value for group-based communication type, such that a user may set a factor-based focus threshold associated with each group-based communication type. The group-based communication system may receive a user focus selection input including a slider component value set where each slider component value in the slider component value set is associated with a particular factor value for group-based communication type. In other embodiments, the slider interface components are associated with another group-based communication factor, and thus each corresponding slider component values in the slider component value set is similarly associated with a unique factor value for the group-based communication factor. For example, in some embodiments a slider interface component and corresponding slider component value is associated with a particular factor value for a group-based communication sender, group-based communication channel, group-based communication role, group-based communication channel, or the like.

In an example embodiment, a group-based user interface includes a plurality of slider interface components, where each of the plurality of slider interface components is associated with a particular factor value of a given group-based communication factor. For example, each slider interface component may be associated with a particular factor value of a group-based communication type (e.g., a first slider for group-based direct communications, a second slider for group-based channel communications, a third slider for group-based tagged communications, and the like).

In another example, each slider interface component may be associated with a particular factor value for a group-based communication sender (e.g., a first slider interface component for group-based communications from GroupBasedUserA, a second slider interface component for group-based communications from GroupBasedUserB, a third slider interface component for group-based communications from GroupBasedUserC, and the like).

In yet another example, each slider interface component may be associated with a particular value for a group-based communication sender role (e.g., a first slider interface component for group-based communications having a group-based communication sender role of Engineer, a second slider interface component for group-based communications having a group-based communication sender role of Executive, a third slider interface component for group-based communications having a group-based communication sender role of Lawyer, and the like).

It should be appreciated that a myriad of factor values may be provided for a given group-based communication factor, and thus a group-based user interface may include a myriad of corresponding slider interface components (or other focus interface components). The received user focus selection input may include a slider component value set having a slider component value associated with each slider interface component that represents each factor value for a given group-based communication factor, or other component value set for other focus interface components.

At block 1104, the apparatus 200 includes means such as communications module 208, processor 202, group-based management module 210, and/or the like, to receive a group-based communication configured for rendering to the group-based communication interface. The group-based communication may include various group-based communication factors, such as a group identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 1104, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set.

At block 1106, the apparatus 200 includes means, such as focus management module 212, processor 202, and/or the like, to generate a focus value for the group-based communication. In some embodiments, the apparatus is configured to generate the focus value using a focus value generation model, such as a machine learning model. The apparatus 200 may generate the focus value based on information included in, or otherwise associated with, the group-based communication. For example, the focus value may be based on one or more group-based communication factors associated with the group-based communication. Additionally or alternatively, the apparatus 200 may generate the focus value based on prior and/or future interaction data, for example information associated with a user's prior interactions with the communication sender (e.g., how often the users interact, whether the user often ignores or does not respond to communications from the group-based communication sender, whether the user engages with the group-based communication sender in multiple groups or group-based communication channels, and the like), the user's prior interactions with communications in the group-identifier (e.g., whether the user ignores or does not respond to communications within the group/group-based communication channel associated with the group-based communication), future interaction data (e.g., whether the group-based communication sender and the group-based user are scheduled in a meeting within a predetermined period of time from the current time/date), and the like.

At block 1108, the apparatus 200 includes means, such as focus management module 212, processor 202, and/or the like, to identify a factor value for a group-based communication factor associated with the group-based communication. A group-based communication may include, or otherwise be associated with, various group-based communication factors. For example, a received group-based communication may include a group-based communication type, group-based communication sender or group-based communication sender identifier, a group-based communication subject or group-based communication topic, a group-based communication channel identifier, a group-based role associated with the group-based communication sender, and the like. In some embodiments, the group-based communication includes various group-based communication factors in key-valued pairs, such that an identifier for a group-based communication factor represents the key in the pair and the corresponding factor value represents the value in the pair. The apparatus 200 may be configured to extract one or more of these group-based communication factors from the group-based communication.

In some embodiments, the apparatus 200 includes means, such as focus management module 212, processor 202, and/or the like, to determine the applicable group-based communication factor. In some embodiments, for example, a group-based communication system embodied by the apparatus may pre-determine the group-based communication factor, for example a pre-determined factor to cause rendering of the corresponding multi-value interface component(s) in the focus interface component of the group-based communication interface. In other embodiments, the apparatus may identify a group-based communication factor using the user focus selection input. For example, the user focus selection input may include a group-based communication factor (or corresponding identifier) that the multi-value interface component values are associated with. Alternatively, the apparatus may determine the group-based communication factor based on the group-based communication factor values included in the user focus selection input and associated with various multi-value interface component values.

At block 1110, the apparatus 200 includes means, such as focus management module 212, processor 202, and/or the like, to identify a factor-based focus threshold based on the user focus selection input and the factor value for the group-based communication factor. In some embodiments, the factor-based focus threshold is identified based on at least the user focus selection input and the group-based communication factor value for the group-based communication factor identified at block 1108. In some embodiments, the apparatus extracts a particular multi-value interface component value from the user focus selection input from the user focus selection input based on the factor value for the group-based communication identified at block 1108. For example, the user focus selection input may include various multi-value interface component values in a multi-value interface component value set, each multi-value interface component associated with a particular factor value for a group-based communication factor such that a particular multi-value interface component value may be extracted based on the factor value identified at block 1108.

In some embodiments, the apparatus extracts a single multi-value interface component value associated with a user's adjustment of a multi-value interface component that is applicable to all group-based communications regardless of factor value for any given group-based communication factor. In some embodiments, the single multi-value interface component value may be received based on user engagement with a single multi-value interface component rendered to the group-based communication interface. The apparatus may then utilize the retrieved, extracted, or otherwise determined multi-value interface component value in identifying the factor-based focus threshold, for example using one or more algorithmic models or focus thresholding models.

In an example embodiment, the apparatus identifies a plurality of factor-based focus thresholds based on the user focus selection input, where each of the plurality of factor-based focus thresholds is associated with a particular factor value for the group-based communication factor of group-based communication type (e.g., a first factor-based focus threshold associated with group-based direct communications, a second factor-based focus threshold associated with group-based channel communications, a third factor-based focus threshold associated with group-based multi-user communications, and the like).

In other embodiments, a factor-based focus threshold is identified for a different group-based communication factor. For example, in some embodiments, a factor-based focus threshold is identified associated with a particular factor value for the group-based communication factor of group-based communication sender (e.g., a first factor-based focus threshold identified associated with a first group-based communication sender such as GroupBasedUserA, a second factor-based focus threshold identified associated with a second group-based communication sender such as GroupBasedUserB, a third factor-based focus threshold identified associated with a third group-based communication sender such as GroupBasedUserC, and the like). In other embodiments, a factor-based focus threshold is identified associated with a group-based communication sender role of the group-based communication (e.g., a first factor-based focus threshold identified associated with a first group-based communication sender role such as an Engineer, a second factor-based focus threshold identified associated with a second group-based communication sender role such as an Executive, a third factor-based focus threshold identified associated with a third group-based communication sender role such as a Lawyer, and the like).

The above examples of group-based communication factors, and corresponding factor values, are meant to provide examples and not to limit the scope and spirit of the present disclosure. It should be appreciated that in other embodiments, other group-based communication factors may be associated with a focus interface component including one or more multi-value interface components, and are not limited to the group-based communication factors described above. It should also be appreciated that in other embodiments, group-based communication factors may include factor values different from or additional to the factor values discussed above, and are not limited to the factor values described above.

In some embodiments, the user focus selection input includes a focus threshold set including various focus thresholds, where each focus threshold in the focus threshold set is associated with one or more factor values for a group-based communication factor (e.g., group-based communication types). The apparatus 200 may identify the appropriate factor-based focus threshold associated with the factor value for the group-based communication factor identified at block 1108.

In other embodiments, the user focus selection input indicates a newly activated mode, and/or activation of a new mode. The apparatus 200 may determine, generate, and/or retrieve a factor-based focus threshold set associated with a focus mode, where the apparatus 200 includes different factor-based focus threshold sets for each mode (e.g., a first factor-based focus threshold set associated with an exploratory mode, and a second factor-based focus threshold set associated with a focused mode). The apparatus 200 may then identify a factor-based focus threshold associated with the group-based communication factor from the determined/retrieved factor-based focus threshold set corresponding to the newly activated mode.

At decision block 1112, the apparatus 200 includes means, such as focus management module 212, processor 202, and/or the like, to determine if the focus value satisfies the factor-based focus threshold. In some embodiments, the apparatus determines if the focus value satisfies the factor-based focus threshold by comparing the focus value and the factor-based focus threshold. In some embodiments, the focus value satisfies the focus threshold if the focus value exceeds the focus threshold. In other embodiments, the focus value satisfies the focus threshold if the focus value is equal to or exceeds the focus threshold. In other embodiments still, the focus value satisfies the focus threshold if the focus value is below the focus threshold. In other embodiments, the focus value satisfies the focus threshold if the focus value is below or equal to the focus threshold.

If the focus value does satisfy the factor-based focus threshold at decision block 1112, flow continues to block 1114. At block 1114, the apparatus 200 includes means, such as input/output module 206, communications module 208, processor 202, and/or the like, to cause rendering of the group-based communication interface including the group-based communication. In some embodiments, the apparatus configures and/or transmits a group-based rendering request to a client device, causing the client device to render the group-based communication interface including the group-based communication. In some embodiments, the group-based rendering request includes the group-based communication, or equivalent information. In some embodiments, the group-based communication is flagged, or otherwise marked, as important and transmitted to the client device, such that the client device may determine how to render the group-based communication.

In some embodiments, the group-based communication interface includes at least a content panel. The content panel may be configured to include rendered group-based communications. In some embodiments, when the focus value for the group-based communication satisfies the factor-based focus threshold, the content panel of the group-based communication interface may be rendered including the group-based communication.

Returning to decision block 1112, if the focus value does not satisfy the factor-based focus threshold, flow continues to block 1116. At optional block 1116, the apparatus 200 includes means, such as input/output module 206, communications module 208, group-based management module 210, processor 202, and/or the like, to cause rendering of the group-based communication interface without the group-based communication. In some embodiments, the group-based communication system embodied by apparatus 200 does not update the group-based communication interface at all, such that the user is not distracted by an incoming group-based communication, or associated notification information, when the group-based communication is determined to be unimportant. In other embodiments, the apparatus configures and/or transmits a group-based rendering request to a client device that indicates that the group-based communication should not be rendered. For example, the group-based rendering request may not include the group-based communication. Alternatively, for example, the group-based rendering request may include the group-based communication flagged as unimportant, such that the client device is caused not to render the group-based communication. In some embodiments, where the group-based communication interface includes at least a content panel, the content panel may be rendered without the group-based communication.

At block 1118, the apparatus 200 includes means, such as focus management module 212, processor 202, and/or the like, to store the group-based communication in a queued group-based communication set. The queued group-based communication set may include other group-based communications that were deemed unimportant (e.g., having a focus value that does not satisfy a corresponding factor-based focus threshold), and thus were not rendered to the user via the group-based communication interface. In some embodiments, the group-based communication system embodied by apparatus 200 is configured to store the queued group-based communications set in a permanent storage, database, or the like, such that queued group-based communications in the set may be rendered to a user during a subsequent authenticated session.

At block 1120, the apparatus 200 includes means, such as communications module 208, focus management module 212, processor 202, and/or the like, to receive a removal user focus selection input. The removal user focus selection input may be associated with a lower focus level, such that at least one queued group-based communication in the queued group-based communication set now satisfies a corresponding focus threshold (e.g., a factor-based focus threshold). In some embodiments, the removal user focus selection input indicates that focus mode has been deactivated. For example, the removal user focus selection input may include a multi-value interface component value that is below a deactivation point, such that focused mode is disabled and queued group-based communications are rendered. In other embodiments, the removal user selection input indicates that another mode, such as an exploratory mode, associated with a lesser focus value was activated. In other embodiments, the removal user focus selection input includes one or more multi-value interface component values associated with one or more multi-value focus interface components, for example a slider component value associated with a single slider interface component or a slider component value set associated with a plurality of slider interface components.

At block 1122, the apparatus 200 includes means, such as input/output module 206, communications module 208, processor 202, and/or the like, to cause updated rendering of the group-based communication interface to include at least the group-based communication from the queued group-based communications set. In some embodiments, the apparatus 200 may first determine that the focus value for the group-based communication now satisfies a corresponding focus threshold, such as a factor-based threshold, based on the removal user focus selection input. The apparatus may configure and/or transmit a group-based rendering request now including the group-based communication, or equivalent information. In some embodiments, the apparatus may flag or otherwise mark the group-based communication as important (e.g., satisfying an application focus threshold based on the removal user focus selection input) such that the client device may render the group-based communication as appropriate. In other embodiments, the apparatus may transmit a rendering request configured to cause the client device to retrieve the group-based communication, or corresponding information, from cached memory on the client device for rendering (e.g., group-based communication information stored at optional block 1116, for example).

In some embodiments, the group-based communication interface includes at least a content panel and a side panel. The group-based communication of the queued group-based communications set may be rendered to the content panel of the group-based communication interface. Additionally, other group-based communications of the queued group-based communications set may be rendered to the content panel of the group-based communication interface.

FIG. 12 illustrates an example detailed process for managing a group-based communication and causing updated rendering of focused communication notification information associated with a group-based communication to a group-based communication interface based on a factor-based focus threshold, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 1202, the apparatus 200 includes means, such as processor 202, communications module 208 focus management module 212, and/or the like, to receive a user focus selection input associated with the group-based communication interface. The apparatus 200 may receive the user focus selection input in response to engagement with a focus interface component rendered to the group-based communication interface. The user focus selection input may represent a desired focus level for the user, such as a focus level specifically set by the user or determined by the group-based communication system, the client device, or a third-party system.

In other embodiments, the user focus selection input includes a multi-value interface component set, such as a slider component value set, corresponding to a plurality of slider interface components. Additionally or alternatively, in some embodiments, the user focus selection input includes a group-based communication factor value associated with each received multi-value interface component value, for example each slider component value, such that a received multi-value interface component value may be extracted based on a particular group-based communication factor value.

In some embodiments, a slider interface component is presented for each group-based communication factor value for group-based communication type, such that a user may set a factor-based focus threshold associated with each group-based communication factor value for group-based communication type. The group-based communication system may receive a user focus selection input including a slider component value set where each slider component value in the slider component value set is associated with a particular factor value for group-based communication type. In other embodiments, the slider interface components are associated with another group-based communication factor, and thus each corresponding slider component values in the slider component value set is similarly associated with a unique factor value for the group-based communication factor. For example, in some embodiments a slider interface component and corresponding slider component value is associated with a particular factor value for a group-based communication sender, group-based communication channel, group-based communication role, group-based communication channel, or the like.

In an example embodiment, a group-based user interface includes a plurality of slider interface components, where each of the plurality of slider interface components is associated with a particular factor value of a given group-based communication factor. For example, each slider interface component may be associated with a particular value of a group-based communication type (e.g., a first slider for group-based direct communications, a second slider for group-based channel communications, a third slider for group-based tagged communications, and the like).

In another example, each slider interface component may be associated with a particular factor value for a group-based communication sender (e.g., a first slider interface component for group-based communications from GroupBasedUserA, a second slider interface component for group-based communications from GroupBasedUserB, a third slider interface component for group-based communications from GroupBasedUserC, and the like).

In yet another example, each slider interface component may be associated with a particular value for a group-based communication sender role (e.g., a first slider interface component for group-based communications having a group-based communication sender role of Engineer, a second slider interface component for group-based communications having a group-based communication sender role of Executive, a third slider interface component for group-based communications having a group-based communication sender role of Lawyer, and the like).

It should be appreciated that a myriad of values may be provided for a given group-based communication factor, and thus a group-based user interface may include a myriad of corresponding slider interface components (or other focus interface components). The received user focus selection input may include a slider component value set having a slider component value associated with each slider interface component that represents each factor value for a given group-based communication factor, or other component value set for other focus interface components.

At block 1204, the apparatus 200 includes means such as communications module 208, processor 202, group-based management module 210, and/or the like, to receive a group-based communication configured for rendering to the group-based communication interface. The group-based communication may include various group-based communication factors, such as a group identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 1204, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set.

At block 1206, the apparatus 200 includes means, such as focus management module 212, processor 202, and/or the like, to generate a focus value for the group-based communication. In some embodiments, the apparatus is configured to generate the focus value using a focus value generation model, such as a machine learning model. The apparatus 200 may generate the focus value based on information included in, or otherwise associated with, the group-based communication. For example, the focus value may be based on one or more group-based communication factors associated with the group-based communication. Additionally or alternatively, the apparatus 200 may generate the focus value based on prior and/or future interaction data, for example information associated with a user's prior interactions with the communication sender (e.g., how often the users interact, whether the user often ignores or does not respond to communications from the group-based communication sender, whether the user engages with the group-based communication sender in multiple groups or group-based communication channels, and the like), the user's prior interactions with communications in the group-identifier (e.g., whether the user ignores or does not respond to communications within the group/group-based communication channel associated with the group-based communication), future interaction data (e.g., whether the group-based communication sender and the group-based user are scheduled in a meeting within a predetermined period of time from the current time/date), and the like.

At block 1208, the apparatus 200 includes means, such as focus management module 212, processor 202, and/or the like, to identify a factor value for a group-based communication factor associated with the group-based communication. A group-based communication may include, or otherwise be associated with, various group-based communication factors. For example, a received group-based communication may include a group-based communication type, group-based communication sender identifier, a group-based communication subject or group-based communication topic, a group-based communication channel identifier, a group-based role associated with the group-based communication sender, and the like. In some embodiments, the group-based communication includes various group-based communication factors in key-valued pairs, such that an identifier for a group-based communication factor represents the key in the pair and the corresponding factor value represents the value in the pair. The apparatus 200 may be configured to extract one or more of these group-based communication factors from the group-based communication.

In some embodiments, the apparatus 200 includes means, such as focus management module 212, processor 202, and/or the like, to determine the applicable group-based communication factor. In some embodiments, for example, a group-based communication system embodied by the apparatus may pre-determine the group-based communication factor, for example a pre-determined factor to cause rendering of the corresponding multi-value interface component(s) in the focus interface component of the group-based communication interface. In other embodiments, the apparatus may identify a group-based communication factor using the user focus selection input. For example, the user focus selection input may include a group-based communication factor (or corresponding identifier) that the multi-value interface component values are associated with. Alternatively, the apparatus may determine the group-based communication factor based on the group-based communication factor values included in the user focus selection input and associated with various multi-value interface component values.

At block 1210, the apparatus 200 includes means, such as focus management module 212, processor 202, and/or the like, to identify a factor-based focus threshold based on the user focus selection input and the identified factor value for the group-based communication type. In some embodiments, the factor-based focus threshold is identified based on at least the user focus selection input and the group-based communication factor value for the group-based communication factor identified at block 1208. In some embodiments, the apparatus extracts a particular multi-value interface component value from the user focus selection input from the user focus selection input based on the factor value for the group-based communication identified at block 1208. For example, the user focus selection input may include various multi-value interface component values in a multi-value interface component value set, each multi-value interface component associated with a particular factor value for a group-based communication factor such that a particular multi-value interface component value may be extracted based on the factor value identified at block 1208.

In some embodiments, the apparatus extracts a single multi-value interface component value associated with a user's adjustment of a multi-value interface component that is applicable to all group-based communications regardless of factor value for any given group-based communication factor. In some embodiments, the single multi-value interface component value may be received based on user engagement with a single multi-value interface component rendered to the group-based communication interface. The apparatus may then utilize the retrieved, extracted, or otherwise determined multi-value interface component value in identifying the factor-based focus threshold, for example using one or more algorithmic models or focus thresholding models.

In an example embodiment, the apparatus identifies a plurality of factor-based focus thresholds based on the user focus selection input, where each of the plurality of factor-based focus thresholds is associated with a particular factor value for the group-based communication factor of group-based communication type (e.g., a first factor-based focus threshold associated with group-based direct communications, a second factor-based focus threshold associated with group-based channel communication, a third factor-based focus threshold associated with group-based multi-user communication, and the like).

In other embodiments, a factor-based focus threshold is identified for a different group-based communication factor. For example, in some embodiments, a factor-based focus threshold is identified associated with a particular factor value for the group-based communication factor of group-based communication sender (e.g., a first factor-based focus threshold identified associated with a first group-based communication sender such as GroupBasedUserA, a second factor-based focus threshold identified associated with a second group-based communication sender such as GroupBasedUserB, a third factor-based focus threshold identified associated with a third group-based communication sender such as GroupBasedUserC, and the like). In other embodiments, a factor-based focus threshold is identified associated with a group-based communication sender role of the group-based communication (e.g., a first factor-based focus threshold identified associated with a first group-based communication sender role such as an Engineer, a second factor-based focus threshold identified associated with a second group-based communication sender role such as an Executive, a third factor-based focus threshold identified associated with a third group-based communication sender role such as a Lawyer, and the like).

The above examples of group-based communication factors, and corresponding factor values, are meant to provide examples and not to limit the scope and spirit of the present disclosure. It should be appreciated that in other embodiments, other group-based communication factors may be associated with a focus interface component including one or more multi-value interface components, and are not limited to the group-based communication factors described above. It should also be appreciated that in other embodiments, group-based communication factors may include factor values different from or additional to the factor values discussed above, and are not limited to the factor values described above.

In some embodiments, the user focus selection input includes a focus threshold set including various focus thresholds, where each focus threshold in the focus threshold set is associated with one or more factor values for a given group-based communication factor. The apparatus 200 may identify the appropriate factor-based focus threshold associated with the factor value identified at block 1208.

In other embodiments, the user focus selection input indicates a newly activated mode, and/or activation of a new mode. The apparatus 200 may determine, generate, and/or retrieve a factor-based focus threshold set associated with a focus mode, where the apparatus 200 includes different factor-based focus threshold sets for each mode (e.g., a first factor-based focus threshold set associated with an exploratory mode, and a second factor-based focus threshold set associated with a focused mode). The apparatus 200 may then identify a factor-based focus threshold associated with the factor value from the determined/retrieved factor-based focus threshold set corresponding to the newly activated mode.

If, at decision block 1212, the focus value satisfies the factor-based focus threshold, flow continues to block 1214. At block 1214, the apparatus 200 includes means, such as input/output module 206, communications module 208, processor 202, and/or the like, to cause rendering of the group-based communication interface including (1) the group-based communication and (2) focused communication notification information associated with the group-based communication. In some embodiments, the apparatus 200 includes means to generate a focused communication notification to be rendered to the group-based communication interface. The focused communication notification may include, but is not limited to, a notification badge (e.g., a notification badge indicating the number of important group-based communications received for a particular group-based communication channel, or the like), a notification message (e.g., a desktop notification, a push notification, or the like), a notification popup window, and/or the like.

In some embodiments, the group-based communication interface includes at least a side panel and a content panel. The side panel and/or content panel may be configured for rendering focus communication notification information associated with the group-based communication (e.g., in the form of a badge notification or other notification). In some embodiments, when the focus value for the group-based communication satisfies the factor-based focus threshold, the side panel and/or content panel of the group-based communication interface may be rendered including the focused communication notification information.

In some embodiments, the apparatus configures and/or transmits a group-based rendering request to a client device, causing the client device to render the group-based communication interface including (1) the group-based communication and (2) focused communication notification information associated with the group-based communication. In some embodiments, the group-based rendering request includes at least the group-based communication and focused notification information generated by the apparatus. In other embodiments, the group-based communication request includes the group-based communication including a flag indicating the group-based communication is important (e.g., satisfied a corresponding set focus threshold), which causes the client device to render corresponding focused notification information based on the group-based communication.

Returning to decision block 1212, if the focus value does not satisfy the factor-based focus threshold, flow continues to block 1216. At block 1216, the apparatus 200 includes means, such as input/output module 206, communications module 208, processor 202, and/or the like, to cause rendering of the group-based communication interface including (1) the group-based communication without focused communication notification information associated with the group-based communication.

In some embodiments, the group-based communication interface includes at least a side panel and a content panel. The side panel and/or content panel may be configured for rendering focus communication notification information associated with the group-based communication (e.g., in the form of a badge notification or other notification). In some embodiments, when the focus value for the group-based communication does not satisfy the factor-based focus threshold, the side panel and/or content panel of the group-based communication interface may be rendered without including the focused communication notification information.

In some embodiments, the apparatus configures and/or transmits a group-based rendering request to a client device, causing the client device to render the group-based communication interface including (1) the group-based communication without focused communication notification information associated with the group-based communication. In some embodiments, the apparatus does not generate focused notification information for the group-based communication because the group-based communication is determined unimportant (e.g., does not satisfy a corresponding set focus threshold). In other embodiments, the group-based communication request includes the group-based communication including a flag indicating the group-based communication is unimportant (e.g., does not satisfy a corresponding set focus threshold), which causes the client device to just the group-based communication.

FIG. 13 illustrates an example detailed process for managing a group-based communication and causing updated rendering of a group-based communication to a group-based communication interface based on a set focus threshold, for example performed by a group-based communication system embodied by apparatus 200. Specifically, FIG. 13 illustrates an example process for causing rendering of a configured group-based communication interface, where the group-based communication interface includes a group-based communication if the focus value for the group-based communication satisfies a set focus threshold. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 1302, the apparatus 200 includes means, such as processor 202, communications module 208, focus management module 212, and/or the like, to receive a user focus selection input associated with the group-based communication interface. The apparatus 200 may receive the user focus selection input in response to engagement with a focus interface component rendered to the group-based communication interface. The user focus selection input may represent a desired focus level for the user, such as a focus level specifically set by the user or determined by the group-based communication system, the client device, or a third-party system.

In some embodiments, the user focus selection input includes a multi-value interface component value associated with a multi-value interface component, for example slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input. It should be appreciated that in other embodiments, a group-based communication interface may include another multi-value interface component, such that the user focus selection input is received in response to engagement with the multi-value interface component and includes at least a multi-value interface component value associated with the multi-value interface component.

In some embodiments, the user focus selection input includes a multi-value focus input component that is associated with a particular group of group-based communications, which may be grouped by various group-based communication factors. In an example embodiment, a single multi-value interface component value is received, for example in response to engagement with a single multi-value interface component rendered to the group-based communication interface.

At block 1304, the apparatus 200 includes means such as communications module 208, processor 202, group-based management module 210, and/or the like, to receive a group-based communication configured for rendering to the group-based communication interface. The group-based communication may include various group-based communication factors, such as a group identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 1304, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set.

At block 1306, the apparatus 200 includes means, such as focus management module 212, processor 202, and/or the like, to generate a focus value for the group-based communication. In some embodiments, the apparatus is configured to generate the focus value using a focus value generation model, such as a machine learning model. The apparatus 200 may generate the focus value based on information included in, or otherwise associated with, the group-based communication. For example, the focus value may be based on one or more group-based communication factors associated with the group-based communication. Additionally or alternatively, the apparatus 200 may generate the focus value based on prior and/or future interaction data, for example information associated with a user's prior interactions with the communication sender (e.g., how often the users interact, whether the user often ignores or does not respond to communications from the group-based communication sender, whether the user engages with the group-based communication sender in multiple groups or group-based communication channels, and the like), the user's prior interactions with communications in the group-identifier (e.g., whether the user ignores or does not respond to communications within the group/group-based communication channel associated with the group-based communication), future interaction data (e.g., whether the group-based communication sender and the group-based user are scheduled in a meeting within a predetermined period of time from the current time/date), and the like.

At block 1308, the apparatus 200 includes means, such as focus management module 212, processor 202, and/or the like, to identify a set focus threshold based on the user focus selection input. In some embodiments, the set focus threshold is a single focus threshold applied to all group-based communications, where all group-based communications are grouped regardless of group-based communication factors (such as group-based communication type). In some embodiments, the set focus threshold is identified based on the user focus selection input received at block 1302. For example, the user focus selection input may include a slider component value representing a single position of a slider interface component associated with a set focus threshold for all group-based communications. In some embodiments, a set focus threshold is identified using the slider component value using a mathematical formula, algorithmic model, or the like, to identify or generate the set focus threshold using a multi-value interface component value. In other embodiments, a threshold lookup table may be utilized such that each slider component value received is attributed with a corresponding set focus threshold in the lookup table.

In other embodiments, the apparatus 200 may identify a set focus threshold based on a focus mode included in, or represented by, the user focus selection input. In an example embodiment, the user focus selection input may include a focus mode activation that indicates the user activated focus mode (for example, in response to engagement with a focus mode button component configured for toggling between an "exploratory mode" and a "focused mode"). The apparatus 200 may identify a stored set focus threshold associated with focus mode, for example stored in a datastore associated with the particular group-based user accessing the group-based communication system during an authenticated session. In other embodiments, the user focus selection input may include a mode selection identifier that uniquely represents a focus mode selected by the user. The apparatus 200 may identify a stored set focus threshold associated with the mode identified by the mode selection identifier.

In some embodiments, the apparatus 200 identifies a set focus threshold using one or more focus thresholding model(s). For example, a focus thresholding model may generate a set focus threshold based on one or more selected from a group including a time, a day of week, a date, a focus event set, and the like, as described above.

At decision block 1310, the apparatus 200 includes means, such as focus management module 212, processor 202, and/or the like, to determine if the focus value satisfies the set focus threshold. In some embodiments, the apparatus determines if the focus value satisfies the set focus threshold by comparing the focus value and the set focus threshold. In some embodiments, the focus value satisfies the set focus threshold if the focus value exceeds the set focus threshold. In other embodiments, the focus value satisfies the set focus threshold if the focus value is equal to or exceeds the set focus threshold. In other embodiments still, the focus value satisfies the set focus threshold if the focus value is below the set focus threshold. In other embodiments, the focus value satisfies the set focus threshold if the focus value is below or equal to the set focus threshold.

If the focus value does satisfy the factor-based focus threshold at decision block 1310, flow continues to block 1312. At block 1312, the apparatus 200 includes means, such as input/output module 206, communications module 208, processor 202, and/or the like, to cause rendering of the group-based communication interface including the group-based communication. In some embodiments, the apparatus configures and/or transmits a group-based rendering request to a client device, causing the client device to render the group-based communication interface including the group-based communication. In some embodiments, the group-based rendering request includes the group-based communication, or equivalent information. In some embodiments, the group-based communication is flagged, or otherwise marked, as important and transmitted to the client device, such that the client device may determine how to render the group-based communication.

In some embodiments, the group-based communication interface includes at least a content panel and a side panel. The content panel may be configured to include rendered group-based communications. In some embodiments, when the focus value for the group-based communication satisfies the set focus threshold, the content panel of the group-based communication interface may be rendered including the group-based communication.

Returning to decision block 1310, if the focus value does not satisfy the factor-based focus threshold, flow continues to block 1314 At optional block 1314, the apparatus 200 includes means, such as input/output module 206, communications module 208, group-based management module 210, processor 202, and/or the like, to cause rendering of the group-based communication interface without the group-based communication. In some embodiments, the group-based communication system embodied by apparatus 200 does not update the group-based communication interface at all, such that the user is not distracted by an incoming group-based communication, or associated notification information, when the group-based communication is determined to be unimportant. In other embodiments, the apparatus configures and/or transmits a group-based rendering request to a client device that indicates that the group-based communication should not be rendered. For example, the group-based rendering request may not include the group-based communication. Alternatively, for example, the group-based rendering request may include the group-based communication flagged as unimportant, such that the client device is caused not to render the group-based communication.

In some embodiments, the group-based communication interface includes at least a content panel and a side panel. The content panel may be configured to include rendered group-based communications. In some embodiments, when the focus value for the group-based communication does not satisfy the set focus threshold, the content panel of the group-based communication interface may be rendered without including the group-based communication.

At block 1316, the apparatus 200 includes means, such as focus management module 212, processor 202, and/or the like, to store the group-based communication in a queued group-based communication set. The queued group-based communication set may include other group-based communications that were deemed unimportant (e.g., having a focus value that does not satisfy a corresponding factor-based focus threshold), and thus were not rendered to the user via the group-based communication interface. In some embodiments, the group-based communication system embodied by apparatus 200 is configured to store the queued group-based communications set in a permanent storage, database, or the like, such that queued group-based communications in the set may be rendered to a user during a subsequent authenticated session.

At block 1318, the apparatus 200 includes means, such as communications module 208, focus management module 212, processor 202, and/or the like, to receive an removal user focus selection input. The removal user focus selection input may be associated with a lower focus level, such that at least one queued group-based communication in the queued group-based communication set now satisfies a corresponding focus threshold (e.g., a set focus threshold). In some embodiments, the removal user focus selection input indicates that focus mode has been deactivated. For example, the removal user focus selection input may include a multi-value interface component value that is below a deactivation point, such that focused mode is disabled and queued group-based communications are rendered. In other embodiments, the updated user selection input indicates that another mode, such as an exploratory mode, associated with a lesser focus value was activated. In other embodiments, the removal user focus selection input includes one or more multi-value interface component values associated with a multi-value interface component of a focus interface component, for example a slider component value associated with a single slider interface component or a slider component value set associated with a plurality of slider interface components.

At block 1320, the apparatus 200 includes means, such as input/output module 206, communications module 208, processor 202, and/or the like, to cause updated rendering of the group-based communication interface to include at least the group-based communication from the queued group-based communications set. In some embodiments, the apparatus 200 may first determine that the focus value for the group-based communication now satisfies a corresponding focus threshold, such as a factor-based threshold, based on the removal user focus selection input. The apparatus may configure and/or transmit a group-based rendering request now including the group-based communication, or equivalent information. In some embodiments, the apparatus may flag or otherwise mark the group-based communication as important (e.g., satisfying an application focus threshold based on the removal user focus selection input) such that the client device may render the group-based communication as appropriate. In other embodiments, the apparatus may transmit a rendering request configured to cause the client device to retrieve the group-based communication, or corresponding information, from cached memory on the client device for rendering (e.g., group-based communication information stored at optional block 1314, for example).

FIG. 14 illustrates an example detailed process for managing a group-based communication and causing updated rendering of focused communication notification information associated with a group-based communication to a group-based communication interface based on a set focus threshold, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 1402, the apparatus 200 includes means, such as processor 202, communications module 208, focus management module 212, and/or the like, to receive a user focus selection input associated with the group-based communication interface. The apparatus 200 may receive the user focus selection input in response to engagement with a focus interface component rendered to the group-based communication interface. The user focus selection input may represent a desired focus level for the user, such as a focus level specifically set by the user or determined by the group-based communication system, the client device, or a third-party system.

In some embodiments, the user focus selection input includes a multi-value interface component value associated with a multi-value interface component, for example slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input. It should be appreciated that in other embodiments, a group-based communication interface may include another multi-value interface component, such that the user focus selection input is received in response to engagement with the multi-value interface component and includes at least a multi-value interface component value associated with the multi-value interface component.

In some embodiments, the user focus selection input includes a multi-value focus input component that is associated with a particular group of group-based communications, which may be grouped by various group-based communication factors. In an example embodiment, a single multi-value interface component value is received, for example in response to engagement with a single multi-value interface component rendered to the group-based communication interface.

At block 1404, the apparatus 200 includes means such as communications module 208, processor 202, group-based management module 210, and/or the like, to receive a group-based communication configured for rendering to the group-based communication interface. The group-based communication may include various group-based communication factors, such as a group identifier, a group-based communication sender or sender identifier, a group-based communication type, a group-based communication subject, and the like. In some embodiments, the apparatus receives the group-based communication from a client device of the group-based communication sender that transmitted the communication. In other embodiments, the apparatus receives the group-based communication from one or more storages, databases, datastores, or the like configured to store group-based communications.

In some embodiments, at block 1404, the apparatus 200 receives a group-based communications set including the group-based communication. The group-based communications set may include other group-based communications for processing. In some embodiments, the group-based communication system performs the operations disclosed herein for some or all of the group-based communications received in the group-based communications set.

At block 1406, the apparatus 200 includes means, such as focus management module 212, processor 202, and/or the like, to generate a focus value for the group-based communication. In some embodiments, the apparatus is configured to generate the focus value using a focus value generation model, such as a machine learning model. The apparatus 200 may generate the focus value based on information included in, or otherwise associated with, the group-based communication. For example, the focus value may be based on one or more group-based communication factors associated with the group-based communication. Additionally or alternatively, the apparatus 200 may generate the focus value based on prior and/or future interaction data, for example information associated with a user's prior interactions with the communication sender (e.g., how often the users interact, whether the user often ignores or does not respond to communications from the group-based communication sender, whether the user engages with the group-based communication sender in multiple groups or group-based communication channels, and the like), the user's prior interactions with communications in the group-identifier (e.g., whether the user ignores or does not respond to communications within the group/group-based communication channel associated with the group-based communication), future interaction data (e.g., whether the group-based communication sender and the group-based user are scheduled in a meeting within a predetermined period of time from the current time/date), and the like.

At block 1408, the apparatus 200 includes means, such as focus management module 212, processor 202, and/or the like, to identify a set focus threshold based on the user focus selection input. In some embodiments, the set focus threshold is a single focus threshold applied to all group-based communications, where all group-based communications are grouped regardless of group-based communication factors (such as group-based communication type). In some embodiments, the set focus threshold is identified based on the user focus selection input received at block 1402. For example, the user focus selection input may include a slider component value representing a single position of a slider interface component associated with a set focus threshold for all group-based communications. In some embodiments, a set focus threshold is identified using the slider component value using a mathematical formula, algorithmic model, or the like, to identify or generate the set focus threshold using a multi-value interface component value. In other embodiments, a threshold lookup table may be utilized such that each slider component value received is attributed with a corresponding set focus threshold in the lookup table.

In other embodiments, the apparatus 200 may identify a set focus threshold based on a focus mode set included in, or represented by, the user focus selection input. In an example embodiment, the user focus selection input may include a focus mode activation that indicates the user activated focus mode (for example, in response to engagement with a focus mode button component configured for toggling between an "exploratory mode" and a "focused mode"). The apparatus 200 may identify a stored set focus threshold associated with focus mode, for example stored in a datastore associated with the particular group-based user accessing the group-based communication system during an authenticated session. In other embodiments, the user focus selection input may include a mode selection identifier that uniquely represents a focus mode selected by the user. The apparatus 200 may identify a stored set focus threshold associated with the mode identified by the mode selection identifier.

In some embodiments, the apparatus 200 identifies a set focus threshold using one or more focus thresholding model(s). For example, a focus thresholding model may generate a set focus threshold based on one or more selected from a group including a time, a day of week, a date, a focus event set, and the like, as described above.

At decision block 1410, the apparatus 200 includes means, such as focus management module 212, processor 202, and/or the like, to determine if the focus value satisfies the set focus threshold. In some embodiments, the apparatus determines if the focus value satisfies the set focus threshold by comparing the focus value and the set focus threshold. In some embodiments, the focus value satisfies the set focus threshold if the focus value exceeds the set focus threshold. In other embodiments, the focus value satisfies the set focus threshold if the focus value is equal to or exceeds the set focus threshold. In other embodiments still, the focus value satisfies the set focus threshold if the focus value is below the set focus threshold. In other embodiments, the focus value satisfies the set focus threshold if the focus value is below or equal to the set focus threshold.

At decision block 1410, if the focus value satisfies the set focus threshold, flow continues to block 1412. At block 1412, the apparatus 200 includes means, such as input/output module 206, communications module 208, processor 202, and/or the like, to cause rendering of the group-based communication interface including (1) the group-based communication and (2) focused communication notification information associated with the group-based communication. In some embodiments, the apparatus 200 includes means to generate a focused communication notification to be rendered to the group-based communication interface. The focused communication notification may include, but is not limited to, a notification badge (e.g., a notification badge indicating the number of important group-based communications received for a particular group-based communication channel, or the like), a notification message (e.g., a desktop notification, a push notification, or the like, including information associated with the group-based communication), a notification popup window, and/or the like.

In some embodiments, the apparatus configures and/or transmits a group-based rendering request to a client device, causing the client device to render the group-based communication interface including (1) the group-based communication and (2) focused communication notification information associated with the group-based communication. In some embodiments, the group-based rendering request includes at least the group-based communication and focused notification information generated by the apparatus. In other embodiments, the group-based communication request includes the group-based communication including a flag indicating the group-based communication is important (e.g., satisfied a corresponding set focus threshold), which causes the client device to render corresponding focused notification information based on the group-based communication.

Returning to decision block 1410, if the focus value does not satisfy the factor-based focus threshold, flow continues to block 1414. At block 1414, the apparatus 200 includes means, such as input/output module 206, communications module 208, processor 202, and/or the like, to cause rendering of the group-based communication interface including (1) the group-based communication without focused communication notification information associated with the group-based communication.

In some embodiments, the apparatus configures and/or transmits a group-based rendering request to a client device, causing the client device to render the group-based communication interface including (1) the group-based communication without focused communication notification information associated with the group-based communication. In some embodiments, the apparatus does not generate focused notification information for the group-based communication because the group-based communication is determined unimportant (e.g., does not satisfy a corresponding set focus threshold). In other embodiments, the group-based communication request includes the group-based communication including a flag indicating the group-based communication is unimportant (e.g., does not satisfy a corresponding set focus threshold), which causes the client device to just the group-based communication.

FIG. 15 illustrates an example detailed process for managing a group-based communication channel, and causing rendering to a group-based communication interface, for example performed by a group-based communication system embodied by apparatus 200. The operations may be performed during an authenticated session associated with a particular group-based user account accessing the group-based communication system. Specifically, a user may access the group-based communication system via a particular client device after authenticating via the client device and beginning the authenticated session associated with the particular group-based user account. In some embodiments, in the operations illustrated, the group-based communication system retrieves, receives, or otherwise identifies information associated with the group-based user account accessing the group-based communication system via the client device, for example to customize the group-based communication interface rendered to the client device based on information associated with the group-based user account accessing the group-based communication system.

At block 1502, the apparatus 200 includes means, such as processor 202, communications module 208, focus management module 212, and/or the like, that is configured to receive a user focus selection input associated with the group-based communication interface. The apparatus 200 may receive the user focus selection input in response to user engagement with a focus interface component rendered to the group-based communication interface. The user focus selection input may represent a desired focus level for the user, such as a focus level specifically set by the user or determined by the group-based communication system, the client device, or a third-party system.

In some embodiments, the user focus selection input includes a slider component value associated with a slider interface component or a dial component value associated with a dial interface component. For example, a slider component value may represent a value between 0.0 and 1.0, where 0.0 is the value when the slider is at the bottom of the slider interface component, and the value is 1.0 when the slider is at the top of the slider interface component. A user may set a slider component position, for example by engaging with the slider interface component, to cause transmission of the user focus selection input.

In other embodiments, the user focus selection input includes a slider component value set, for example corresponding to a plurality of slider interface components. Additionally or alternatively, in some embodiments, the user focus selection input includes a group-based communication channel associated with each received slider component value. For example, a user focus selection input may include a slider component value set including one or more slider component values and the group-based communication channel associated with each of the slider component values. The user focus selection input may include a group identifier and/or channel identifier for each group-based communication channel, and a corresponding multi-value interface component value associated with the factor value in a key-value pair.

In some embodiments, a slider interface component is presented for each group-based communication type, such that a user may transmit a user focus selection input for use in identifying and/or setting a focus threshold for each group-based communication channel. The group-based communication system may receive a user focus selection input including a slider component value set where each slider component value in the slider component value set is associated with a particular group-based communication channel. In other embodiments, the slider interface components are associated with each of these group-based communication types generally (e.g., a first slider for group-based public communication channels, a second slider for group-based private communication channels, a third slider for group-based communication multi-user direct channels, and a fourth slider for group-based communication single-user direct channels).

In some embodiments, a slider interface component is rendered for adjusting a set focus threshold for a set of group-based communications grouped based on certain sets of group-based communication channels. In some embodiments, a set focus threshold is associated with a set including all group-based communication channels, such that each group-based communication channel must satisfy the same set focus threshold. In some embodiments, the group-based communication system may generate or otherwise identify a set of group-based communication channels that includes all the group-based communication channels for a given group-based communication interface, which may be performed automatically. In other embodiments, group-based communication channels are combined into sets by the user or by the group-based communication system. For example a first slider interface component may be associated with adjusting a set focus threshold associated with a user-created set of group-based communication channels that the user or group-based communication system identified as work-related (which may include group-based communication public channels, private channels, single-user direct channels, multi-user direct channels, and/or a combination thereof), while a second slider interface component may be associated with adjusting a second set focus threshold associated with a second user-created set of group-based communication channels that the user or group-based communication system identified as social/personal (which may include group-based communication public channels, private channels, single-user direct channels, multi-user direct channels, and/or a combination thereof). In some embodiments, the group-based communication system is configured to configure, generate, and/or otherwise cause rendering of an interface to a client device where a user may select group-based communication channels to form a particular group-based communication channel set associated with a particular group-based communication interface.

In some embodiments, the user focus selection input includes a focus mode activation/deactivation indication, which represents that the user has activated/deactivated focus mode. The group-based communication system may identify, retrieve, or otherwise determine one or more corresponding focus threshold(s) in response to activation/deactivation. For example, in an example embodiment, a group-based communication system uses a focus thresholding model to identify a focus threshold, where the focus thresholding model comprises a machine learning or algorithmic model for identifying one or more focus thresholds based on a group-based communication user's interaction with the group-based communication system.

At block 1504, the apparatus 200 includes means such as communications module 208, processor 202, group-based management module 210, and/or the like, to identify, receive, or otherwise determine a group-based communication channel associated with the group-based communication interface. The group-based communication interface may be associated with various group-based communication channels, which the group-based communication system may identify one at a time. In some embodiments, a group-based communication system retrieves identifies the group-based communication channel by querying for group-based communication channels associated with the group-based communication interface. For example, in some embodiments a group-based communication channel includes one or more identifiers for uniquely identifying the channel within the associated group-based communication interface, such that the group-based communication system may identify a group-based communication channel associated with the group-based communication interface via the identifiers.

In some embodiments, at block 1504, the apparatus 200 receives a set of group-based communication channels, which may include all group-based communication channels for a particular group-based communication interface or a subset thereof. In some embodiments, the group-based communication system performs the operations disclosed herein for some or all of the group-based communication system channels received in the set of group-based communication channels. For example, an example group-based communication system may generate a set of focused group-based communication channels including only group-based communication channels that the group-based communication system determines important, and cause rendering of the group-based communication interface based on the set of focused group-based communication channels.

At block 1506, the apparatus 200 includes means such as focus management module 212, processor 202, and/or the like, to generate a focus value for the group-based communication channel. In some embodiments, the apparatus is configured to generate the focus value using a focus value generation model. The apparatus 200 may generate the focus value based on information included in, or otherwise associated with, the group-based communication channel. For example, the focus value may be based on the various group-based communications within the group-based communication channel. In other embodiments, the focus value may be based on the group-based communication user accounts associated with the group-based communication channel (e.g., users permissioned to access the channel, users permissioned to communication within the channel, group-based roles of the users within the channel, or the like). Additionally or alternatively, the apparatus 200 may generate the focus value based on prior, for example information associated with a user's prior interactions with the group-based communication channel (e.g., how often the user interacts within the channel), with other users in the group-based communication channel (e.g., how often the users interact, whether the user often ignores or does not respond to group-based communications from other users with access to the group-based communication channel, whether the user engages with other users having access to the group-based communication channel in other group-based communication channels/groups, and the like), and the like.

Additionally or alternatively, in some embodiments, the focus value is based on at least location data associated with a client device to which the group-based communication interface is to be rendered. For example, in some embodiments, location data associated with the client device may be received at an earlier step (for example, at block 802A along with the user focus selection input or as part of the user focus selection input). Additionally or alternatively, the group-based communication system may store location data with the client device, for example in a database such as the group-based communication repository 106, and retrieve the location data upon receiving the user focus selection input. The location data may include, but is not limited to, GPS data, address data, or the like associated with the client device.

The location data may be utilized to identify group-based communication channels likely to be important to the group-based user account accessing the group-based communication system based on the location data. For example, in some embodiments, the location data may indicate the client device is accessing the group-based communication system from a particular GPS location, address, region, zip code, country, state, or the like. The group-based communication system may retrieve stored location data associated with various other group-based user accounts in the group-based communication interface, for example the group-based communication system may retrieve stored location data from the group-based communication repository 106. Based on the stored location data retrieved by the group-based communication system, the group-based communication system may determine one or more proximate group-based user accounts that are considered proximate to the location data received from the client device accessing the group-based communication system. For example, the retrieved location data may indicate that another group-based user account accessed (or usually accesses) the group-based communication system from a nearby location (e.g., other group-based user accounts associated with stored location data that is within a threshold distance from the location data associated with the client device accessing the group-based communication system). Based on the stored location data, the group-based communication system may generate a higher focus value for group-based communication channels that are associated with the proximate group-based user accounts (e.g., group-based communication channels that one or more proximate group-based user accounts is permissioned to access, group-based communication channels that one or more proximate group-based user accounts actively transmit group-based communications within, and the like).

A focus value generation model may be configured to generate a focus value for the group-based communication channel based on one or more of the above parameters. For example, in some embodiments, a focus value generation model may be trained based on prior interaction data associated with the group-based user account accessing the group-based communication system. The prior interaction data may include logs of the user account's accessing the group-based communication channel, group-based communications within the channel, interactions with other group-based user accounts in the channel, or the like.

In some embodiments, the apparatus may generate the focus value, for example utilizing a focus value generation model, based on future interaction data. For example, the apparatus 200 may identify an upcoming focus event, such as a meeting, calendar event, scheduled time off, or the like. The focus event may be associated with one or more group-based communication channels. For example, the apparatus may identify group-based user accounts associated with the focus event (e.g., other users in an upcoming meeting), and generate higher focus values for group-based communication channels accessible by the group-based user accounts associated with the focus event.

In other embodiments, the focus event may be associated with a start time and an end time that the user will be unavailable. The apparatus may identify group-based communication channels associated with projects and/or deadlines that must be addressed before the focus event. For example, the apparatus may parse metadata associated with the group-based communication channel, and/or parse group-based communications transmitted within the group-based communication channel, to determine the group-based communication channel is associated with a deadline that must be addressed before the focus event, and generate a higher focus value for the group-based communication channel. For example, a group-based user account may have a vacation scheduled at a future date, which they have scheduled on an electronic calendar via a validated external resource. The group-based communication system may communicate with the validated external resource to obtain a validated user data object associated with the group-based user account, for example using one or more authentication tokens stored by the group-based communication system. The validated user data object include information for identifying an upcoming focus event, the focus event having a start time and an end time. The group-based communication system may receive a group-based communication channel, for example by receiving a group-based communication channel set for a particular group-based communication interface, and parse metadata associated with the group-based communication channel and/or parse group-based communications transmitted within the group-based communication channel to determine whether the group-based communication channel is associated with a particular deadline. For example, if group-based communications within the group-based communication channel include deadline dates, the group-based communication may determine the group-based communication channel is associated with that deadline date by parsing the group-based communication. If the deadline date is before an upcoming focus event, the group-based communication system may then generate a higher focus value for the group-based communication channel as the focus event start time draws near.

At block 1508, the apparatus 200 includes means, such as focus management module 212, processor 202, and/or the like, to identify a focus threshold for the group-based communication channel. In some embodiments, the focus threshold is identified based on at least the user focus selection input. In some embodiments, the user focus selection input includes a single interface component value associated with a corresponding focus interface component. For example, the user focus selection input may include a slider component value associated with a slider position of a slider interface component, a dial component value associated with a dial position of a dial interface component, a drop-down value associated with a drop-down selection of a drop-down interface component, or the like.

In some embodiments, the focus threshold is a set focus threshold. The set focus threshold may be associated with every group-based communication channel for a particular group-based communication interface, such that the focus value for a given group-based communication channel must satisfy the set focus threshold. In other embodiments, the set focus threshold is associated with a set of group-based communication channels generated, selected, or otherwise created by the user or by the group-based communication system. For example, a user may create a set of group-based communication channels that are intended for social communications, and a second set of group-based communication channels that are intended for work-related communications. Each created set of group-based communication channels may be associated with a multi-value interface component in a plurality of multi-value interface component, which may a group-based communication system may cause to be rendered as part of a focus interface component of a group-based communication interface. The user focus selection input may be received in response to user engagement with the focus interface component, and may include a multi-value interface component value set that includes a plurality of the multi-value interface component values, each multi-value interface component value associated with a set of group-based communication channels and corresponding with a particular set focus threshold.

In other embodiments, the focus threshold is a factor-based focus threshold identified based on a group-based communication channel factor associated with the group-based communication channel. The user focus selection input may include a multi-value interface component value corresponding to various factor values for a particular factor associated with a group-based communication channel (e.g., a group-based communication channel type, permissions associated with the group-based communication channel, and the like). Each multi-value interface component value corresponds to a corresponding multi-value interface component in a focus interface component rendered to a group-based communication interface. For example, in a particular embodiment, the group-based communication system renders a group-based communication interface including a slider interface component for each group-based communication channel associated with the group-based communication interface. The user may set a slider position within each slider interface component, corresponding to the user's desired focus level for each group-based communication channel. The group-based communication system may receive a user focus selection input including a slider component value associated with each group-based communication channel. The user focus selection interface may be received after a user releases the slider, or at a pre-determined time instance (e.g., every 0.5 seconds). The group-based communication system may identify a focus threshold based on the received slider component value(s), such that each factor-based focus threshold is associated with a corresponding multi-value interface component.

At decision block 1510, the apparatus includes means, such as focus management module 212, processor 202, and/or the like, to determine if the focus value satisfies the focus threshold. The apparatus 200 may compare the focus value and the focus threshold to determine if the focus value satisfies the focus threshold. In some embodiments, the focus value satisfies the focus threshold if the focus value exceeds the focus threshold. In other embodiments, the focus value satisfies the focus threshold if the focus value is equal to or exceeds the focus threshold. In other embodiments still, the focus value satisfies the focus threshold if the focus value is below the focus threshold. In other embodiments, the focus value satisfies the focus threshold if the focus value is below or equal to the focus threshold.

At decision block 1510, if the focus value satisfies the focus threshold, flow continues to block 1512. At block 1512, the apparatus 200 includes means, such as input/output module 206, communications module 208, processor 202, and/or the like, to cause rendering of the group-based communication interface including the group-based communication channel. In some embodiments, the apparatus 200 includes means to generate a group-based rendering request that includes the group-based communication channel (or equivalent information) for rendering. In some embodiments, the group-based communication system causes the group-based communication channel to be rendered using a focus mode interface effect, such that the important group-based communication channel is visually distinct from unimportant group-based communication channels.

In some embodiments, the group-based communication interface includes at least a side panel and a content panel. The side panel may be configured to include one or more rendered group-based communication channels. In some embodiments, when the focus value for the group-based communication satisfies the focus threshold associated with the group-based communication channel, the side panel of the group-based communication interface may be rendered including the group-based communication channel.

Returning to decision block 1510, if the focus value does not satisfy the factor-based focus threshold, flow continues to block 1514. At block 1514, the apparatus 200 includes means, such as input/output module 206, communications module 208, processor 202, and/or the like, to cause rendering of the group-based communication interface without the group-based communication channel. In some embodiments, the group-based communication system embodied by the apparatus transmits a group-based rendering request to cause the group-based communication interface to be rendered with the unimportant group-based communication channel hidden. The group-based communication channel may be totally hidden and/or inaccessible to the user until the user changes their focus level (e.g., by engaging with the focus interface component) or the group-based communication channel otherwise satisfies its corresponding focus threshold.

In some embodiments, the group-based communication interface includes at least a side panel and a content panel. The side panel may be configured to include one or more rendered group-based communication channels. In some embodiments, when the focus value for the group-based communication does not satisfy the focus threshold associated with the group-based communication channel, the side panel of the group-based communication interface may be rendered without including the group-based communication channel.

In other embodiments, an unimportant group-based communication channel is rendered with a visual effect indicating the group-based communication channel is unimportant. For example, the group-based communication system embodied by the apparatus may include means to cause rendering of the group-based communication channel with a greyed-out, blocked-out, or other visual effect, such that the unimportant group-based communication channel is substantially hidden from the user but still visible. Unimportant group-based communication channels may be rendered such that they are visually distinct from important group-based communication channels. Additionally or alternatively, the group-based communication system may cause the unimportant group-based communication channels to be inaccessible to the user (e.g., the user cannot access the group-based communications associated with the unimportant group-based communication channel) to limit further limit possible distractions.

It should be appreciated that while the operations above with respect to FIGS. 8B-14 are described with respect to a single received group-based communication, the operations may be performed for one or more group-based communications, and/or multiple group-based communications in a group-based communications set. For example, in some embodiments, a group-based communication system receives and/or identifies a group-based communications set, and performs some or all of the operations in one of the FIGS. 8A/B-15 for each group-based communication in the group-based communication set. The group-based communication system may determine a focused communications set based on a group-based communications set, and configure a group-based communication interface to include the focused communications set and/or focused notification information for each group-based communication in the focused communications set. For example, in some embodiments, the group-based communication system configures a group-based communication interface to only include group-based communications from a group-based communication set that have a focus value that exceeds an associated focus threshold (for example, an set focus threshold or a factor-based threshold). In other embodiments, the group-based communication system configures a group-based communication interface to include all group-based communications, such that all group-based communications are rendered in their appropriate environment group-based communication channel, but focused communication notification information is only included for group-based communications having a focus value that exceeds a corresponding focus threshold (for example, an set focus threshold or a factor-based threshold) Similarly, the operations described above with respect to FIGS. 8A and 15 may be performed with respect to multiple group-based communication channels.

Embodiments of the present invention may configure a group-based communication interface based on a group-based communication set already received for a given user, and/or newly received group-based communications. In some embodiment, the group-based communication system adjusts a group-based communication interface upon engagement with a focus interface component, and subsequently continues to render information associated with received group-based communications determined important.

In some embodiments, a group-based communication system causes rendering of a specific group-based communication interface to reduce the current set of group-based communications, so the user may immediately focus on important group-based communications and/or communication notifications. As a user remains in a focused mode, the group-based communication interface then remains focused, as the group-based communication system only updates the group-based communication interface to reflect only information associated with important group-based communications.

Embodiments of the subject matter described herein can be implemented in a computing system that comprises a back-end component, e.g., as an information/data server, or that comprises a middleware component, e.g., an application server, or that comprises a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of rendering information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination(s). Moreover, although features may be described above as acting in certain combinations and even initially claimed as such, one or more features from a claimed combination can in some cases be excised from the combination, and the claimed combination may be directed to a sub-combination or variation of a sub-combination(s).

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A group-based communication system configured to manage group-based communications for rendering to a group-based communication interface, the group-based communication system comprising at least one processor and at least one memory, the at least one memory with computer-coded instructions therein, wherein computer-coded instructions are configured to, in execution with the at least one processor, cause the group-based communication system to:
    receive a user focus selection input associated with the group-based communication interface in response to user engagement with at least one multi-value interface component;
    receive a group-based communication configured for rendering to the group-based communication interface;
    generate a focus value for the group-based communication;
    identify a focus threshold for the group-based communication based on the user focus selection input;
    compare the focus value and the focus threshold to determine if the focus value satisfies the focus threshold; and
    cause rendering of the group-based communication interface based on the determination of whether the focus value satisfies the focus threshold.

2. The group-based communication system of claim 1, wherein the computer-coded instructions are further configured to cause the group-based communication system to:
    receive a group-based communication set, wherein the group-based communication is a first group-based communication in the group-based communication set; and
    for at least a second group-based communication in the group-based communication set:
        generate a second focus value for the second group-based communication;
        identify a second focus threshold for the second group-based communication;
        compare the second focus value and the second focus threshold to determine if the second focus value satisfies the second focus threshold; and
        cause rendering of the group-based communication interface based on the determination of whether the second focus value satisfies the second focus threshold.

3. The group-based communication system of claim 1, wherein the computer-coded instructions further cause the group-based communication system to:
    receive a second group-based communication configured for rendering to the group-based communication interface;
    generate a second focus value for the second group-based communication;
    identify a second focus threshold for the second group-based communication based on the user focus selection input;
    compare the second focus value and the second focus threshold to determine if the second focus value satisfies the second focus threshold; and
    cause updated rendering of the group-based communication interface based on the determination of whether the second focus value satisfies the second focus threshold.

4. The group-based communication system of claim 1, wherein the computer-coded instructions further cause the group-based communication system to:
    receive an updated user focus selection input associated with the group-based communication interface;
    receive a second group-based communication configured for rendering to the group-based communication interface;
    generate a second focus value for the second group-based communication;
    identify a second focus threshold for the second group-based communication based on the updated user focus selection input;
    compare the second focus value and the second focus threshold to determine if the second focus value satisfies the second focus threshold; and
    cause updated rendering of the group-based communication interface based on the determination of whether the focus value satisfies the focus threshold.

5. The group-based communication system of claim 1, wherein the computer-coded instructions are configured to cause identifying the focus threshold based on at least one selected from a group comprising a time of day, a day of week, a date, and a focus event set.

6. The group-based communication system of claim 1, wherein the focus threshold comprises a set focus threshold based on the user focus selection input.

7. The group-based communication system of claim 1, wherein the focus threshold comprises a factor-based focus threshold based on the user focus selection input.

8. The group-based communication system of claim 1, wherein the group-based communication interface comprises a side panel and a content panel, and wherein the computer-coded instructions are further configured to cause rendering of the group-based communication interface by:
    in a circumstance where the focus value satisfies the focus threshold, cause rendering of the group-based communication to the content panel of the group-based communication interface; and in a circumstance where the focus value does not satisfy the focus threshold, storing the group-based communication in a queued group-based communications set and causing rendering of the content panel of the group-based communication interface without the group-based communication.

9. The group-based communication system of claim 8, wherein the computer-coded instructions are further configured to cause the group-based communication system to:
receive a removal user focus selection input; and
cause rendering of the queued group-based communications set to the content panel of the group-based communication interface in response to receiving the removal user focus selection input.

10. The group-based communication system of claim 1, wherein the computer-coded instructions are further configured to cause the group-based communication system to:
in a circumstance where the focus value satisfies the focus threshold, cause rendering of the group-based communication interface to comprise (1) the group-based communication and (2) focused communication notification information associated with the group-based communication; and
in a circumstance where the focus value does not satisfy the focus threshold, cause rendering of the group-based communication interface to comprise the group-based communication without focused communication notification information associated with the group-based communication.

11. The group-based communication system of claim 1, wherein the at least one multi-value interface component comprises a slider interface component.

12. The group-based communication system of claim 1, wherein the at least one multi-value interface component comprises a plurality of slider interface components.

13. The group-based communication system of claim 1, wherein the computer-coded instructions are further configured to cause the group-based communication system to generate the focus value for the group-based communication based on at least one selected from a group comprising a group-based communication sender, a group-based communication sender role, a group-based communication channel identifier, and a group-based communication type.

14. The group-based communication system of claim 1, wherein the computer-coded instructions are further configured to cause the group-based communication system to:
determine a focus mode interface effect associated with the group-based communication interface; and
cause rendering of the group-based communication interface using the focus mode interface effect.

15. The group-based communication system of claim 1, wherein the computer-coded instructions are further configured to cause the group-based communication system to:
identify a near-threshold range;
determine at least one near-threshold group-based communication based on the near-threshold range and the user focus selection input; and
cause a client device to cache near-threshold communication information associated with the at least one near-threshold group-based communication.

16. The group-based communication system of claim 1, wherein the computer-coded instructions are further configured to cause the group-based communication system to:
determine a current time is within a proximate time frame associated with an identified focus event; and
generate the focus value for the group-based communication based on the focus event.

17. The group-based communication system of claim 1, wherein the computer-coded instructions are further configured to cause the group-based communication system to:
identify a focus value generation model; and
generate the focus value for the group-based communication using the focus value generation model.

18. The group-based communication system of claim 17, wherein the computer-coded instructions further cause the group-based communication system to:
identify prior interaction data;
train the focus value generation model based on the prior interaction data; and
generate the focus value for the group-based communication using the trained focus value generation model.

19. A computer-implemented method for managing group-based communications for rendering to a group-based communication interface, the method comprising:
receiving a user focus selection input associated with the group-based communication interface in response to user engagement with at least one multi-value interface component;
receiving a group-based communication configured for rendering to the group-based communication interface;
generating a focus value for the group-based communication;
identifying a focus threshold for the group-based communication based on the user focus selection input;
comparing the focus value and the focus threshold to determine if the focus value satisfies the focus threshold; and
causing rendering of the group-based communication interface based on the determination of whether the focus value satisfies the focus threshold.

20. A computer program product to manage group-based communications for rendering to a group-based communication interface, the computer program product comprising a non-transitory computer readable storage medium having computer program instructions stored therein, the computer program instructions configured to, when executed by a processor, cause the processor to:
receive a user focus selection input associated with the group-based communication interface in response to user engagement with at least one multi-value interface component;
receive a group-based communication configured for rendering to the group-based communication interface;
generate a focus value for the group-based communication;
identify a focus threshold for the group-based communication based on the user focus selection input;
compare the focus value and the focus threshold to determine if the focus value satisfies the focus threshold; and
cause rendering of the group-based communication interface based on the determination of whether the focus value satisfies the focus threshold.

* * * * *